US012505744B2

(12) United States Patent
Takino et al.

(10) Patent No.: US 12,505,744 B2
(45) Date of Patent: Dec. 23, 2025

(54) INFORMATION PROCESSING DEVICE, INFORMATION PROCESSING METHOD, AND PROGRAM

(71) Applicant: Sony Semiconductor Solutions Corporation, Kanagawa (JP)

(72) Inventors: Chiaki Takino, Kanagawa (JP); Kazuhiro Yamanaka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 174 days.

(21) Appl. No.: 18/570,872

(22) PCT Filed: Feb. 21, 2022

(86) PCT No.: PCT/JP2022/006849
§ 371 (c)(1),
(2) Date: Dec. 15, 2023

(87) PCT Pub. No.: WO2023/007785
PCT Pub. Date: Feb. 2, 2023

(65) Prior Publication Data
US 2024/0290204 A1     Aug. 29, 2024

(30) Foreign Application Priority Data

Jul. 27, 2021   (JP) ................................ 2021-122734

(51) Int. Cl.
*G08G 1/14*           (2006.01)
*B60K 35/28*        (2024.01)
(Continued)

(52) U.S. Cl.
CPC ............. *G08G 1/143* (2013.01); *B60K 35/28* (2024.01); *B60W 30/06* (2013.01); *B60W 50/14* (2013.01);
(Continued)

(58) Field of Classification Search
CPC ........ G08G 1/143; G08G 1/146; G06V 10/82; G06V 20/586; G06V 10/26;
(Continued)

(56) References Cited

U.S. PATENT DOCUMENTS 7,930,078 B2 *  4/2011  Sugiura ..................... B60R 1/28
                                                        701/36
9,643,601 B2 *  5/2017  Morimoto ................ G08G 1/14
(Continued)

FOREIGN PATENT DOCUMENTS

CN     112270311 A  *  1/2021  ............. G06V 20/58
JP     2004114977 A  *  4/2004  ............. B60Q 9/007
(Continued)

OTHER PUBLICATIONS

International Search Report (PCT/ISA/210), International Application No. PCT/JP2022/006849, dated Mar. 29, 2022.

*Primary Examiner* — Chico A Foxx
(74) *Attorney, Agent, or Firm* — Michael Best & Friedrich LLP

(57) ABSTRACT

Parking region analysis for display of available and potentially available parking regions is disclosed. In one example, a parking region analyzer accesses a camera-captured image and analyzes whether or not a vehicle is able to be parked. A display controller generates parking possibility identification graphic data on the basis of the analysis and superimposes and displays the data on the camera-captured image.

20 Claims, 39 Drawing Sheets

(51) Int. Cl.
*B60W 30/06* (2006.01)
*B60W 50/14* (2020.01)
*G06V 10/26* (2022.01)
*G06V 10/82* (2022.01)
*G06V 20/58* (2022.01)

(52) U.S. Cl.
CPC .............. *G06V 10/26* (2022.01); *G06V 10/82* (2022.01); *G06V 20/586* (2022.01); *G08G 1/146* (2013.01); *B60K 2360/176* (2024.01); *B60K 2360/188* (2024.01); *B60W 2050/146* (2013.01); *B60W 2420/403* (2013.01); *G06V 2201/08* (2022.01)

(58) Field of Classification Search
CPC ............... G06V 2201/08; B60K 35/28; B60K 2360/176; B60K 2360/188; B60W 30/06; B60W 50/14; B60W 2050/146; B60W 2420/403
See application file for complete search history.

(56) References Cited

U.S. PATENT DOCUMENTS

| | | | |
|---|---|---|---|
| 10,553,116 B2* | 2/2020 | Yi | G06V 20/58 |
| 12,254,701 B2* | 3/2025 | Miyamoto | G06V 20/58 |
| 2013/0004021 A1* | 1/2013 | Nagaoka | G06T 5/94 |
| | | | 382/103 |
| 2016/0207526 A1* | 7/2016 | Franz | G08G 1/168 |
| 2020/0005055 A1* | 1/2020 | Cunha | G08G 1/14 |
| 2020/0104613 A1* | 4/2020 | Hirai | G06V 20/586 |
| 2024/0193962 A1* | 6/2024 | Xing | G06V 10/225 |

FOREIGN PATENT DOCUMENTS

| | | |
|---|---|---|
| JP | 2016197314 A | 11/2016 |
| JP | 2017222309 A | 12/2017 |
| JP | 2020057081 A | 4/2020 |
| WO | 2017068701 A1 | 4/2017 |

* cited by examiner

FIG. 2
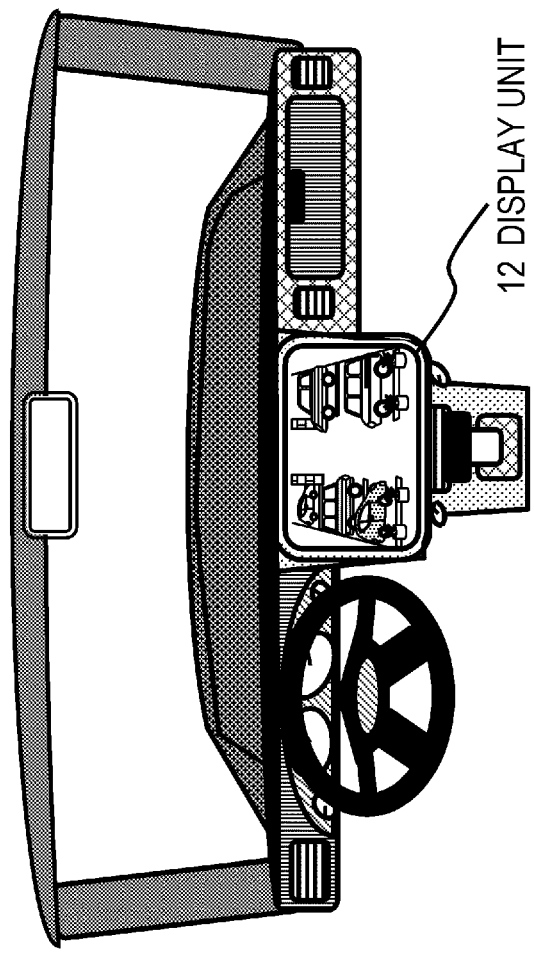
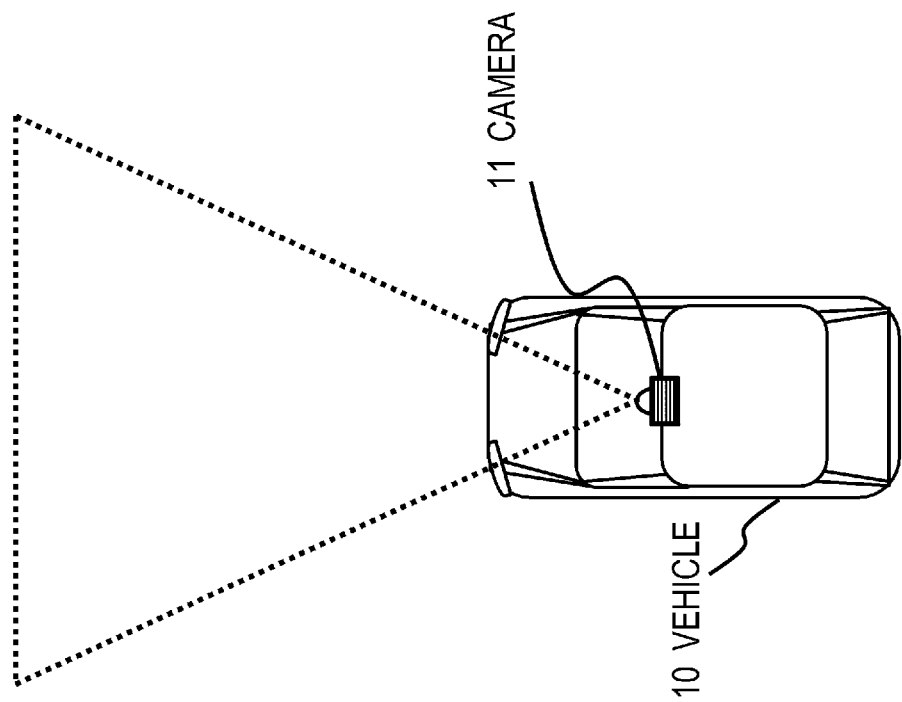

FIG. 23
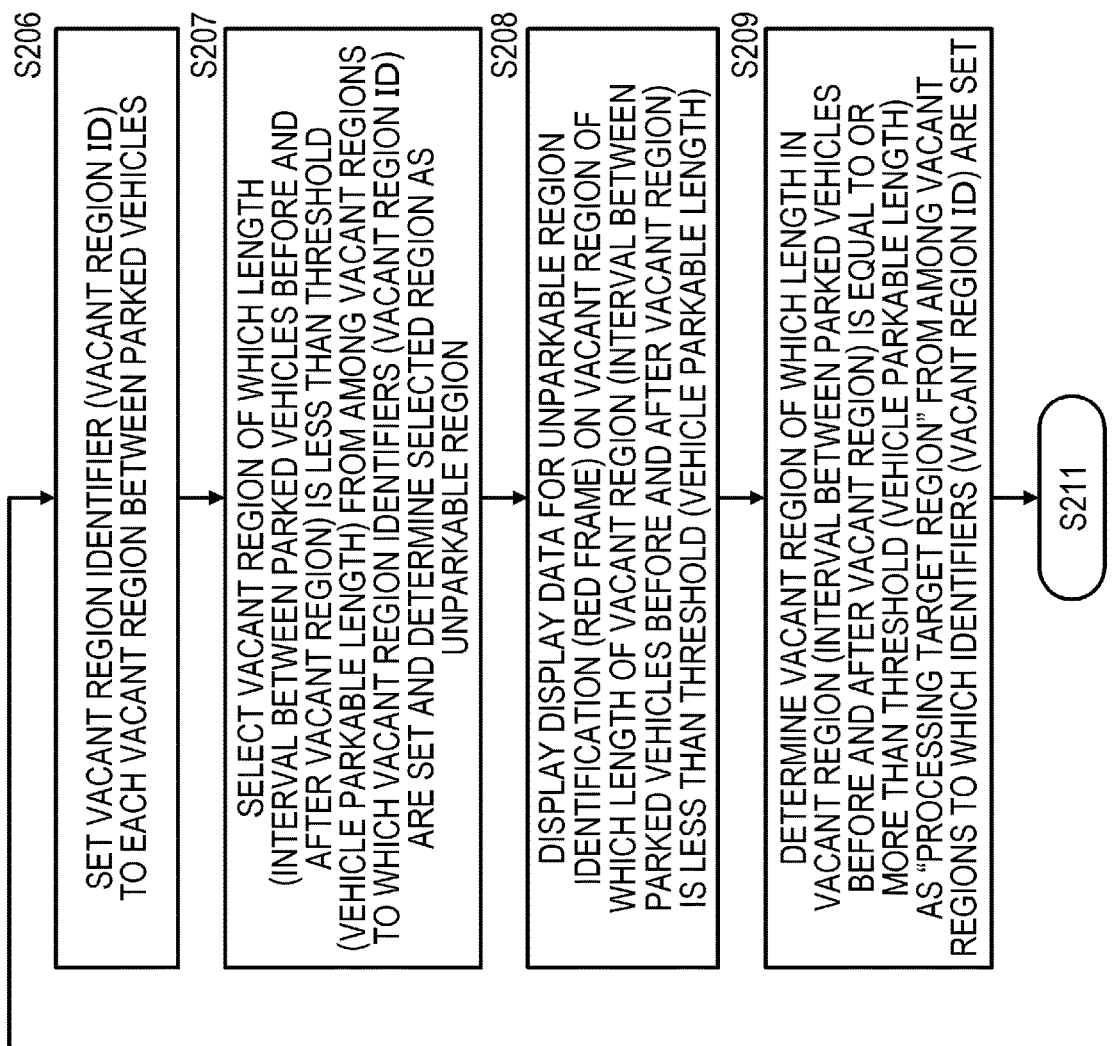
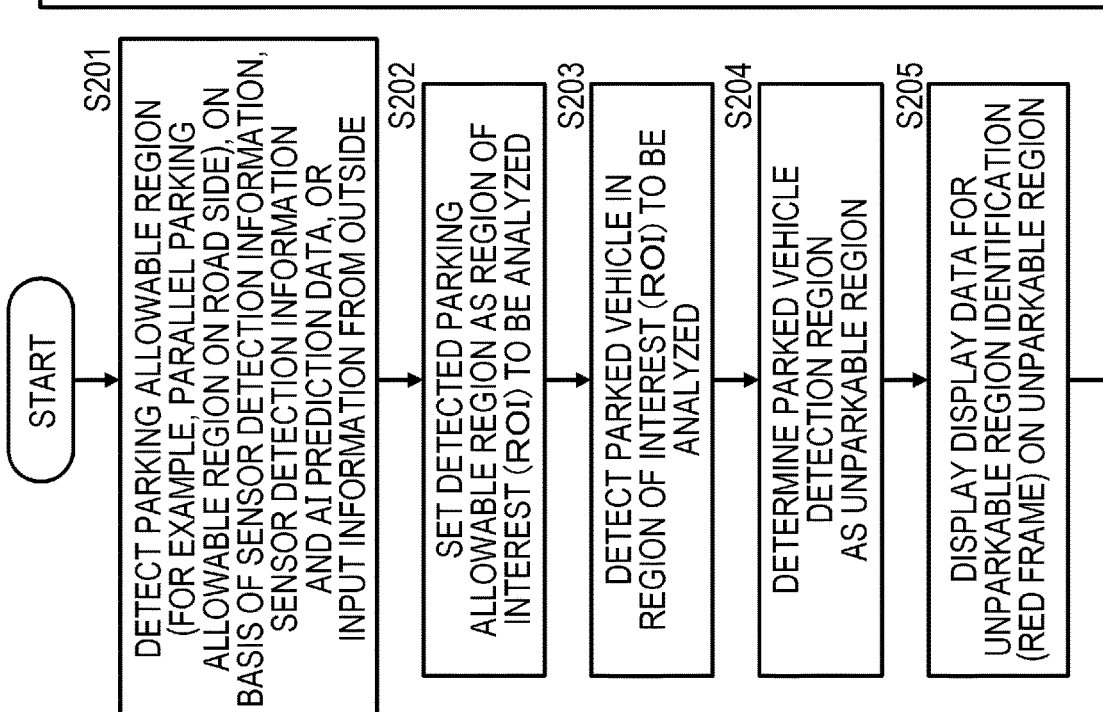

INFORMATION PROCESSING DEVICE, INFORMATION PROCESSING METHOD, AND PROGRAM

TECHNICAL FIELD

The present disclosure relates to an information processing device, an information processing method, and a program. Specifically, for example, the present disclosure relates to an information processing device, an information processing method, and a program that generate display data used to present a parkable region for a vehicle in a parking lot to a user who is a vehicle driver in an easy-to-understand manner.

BACKGROUND ART

For example, in many parking lots in shopping centers, amusement parks, sightseeing spots, other places in a town, or the like, a large number of vehicles can park in many cases.

A user who is a driver of the vehicle searches the parking lot for a vacant space where the driver can park the vehicle and parks the vehicle. In this case, the user travels the vehicle in the parking lot, visually checks around, and searches for a vacant space.

Such processing for checking a parkable space needs time, and in addition, there is a problem in that, if the vehicle travels in the narrow parking lot, a contact accident with another vehicle or person is likely to occur.

The related art that discloses a configuration for detecting a parkable region in a parking lot is, for example, Patent Document 1 (WO2017/068701 A1).

Patent Document 1 discloses a configuration that images a parked vehicle next to a parking section region that is a parking possibility determination target using a camera mounted on a vehicle, in a double-parking-type parking lot and determines that the parking possibility determination target region is a vacant space if a side surface portion of the next parked vehicle with a length equal to or more than a threshold is imaged in a captured image.

However, for this disclosed method, it is essential that conditions that the parking lot is a double-parking-type parking lot, a parked vehicle exists next to the parking possibility determination section region are satisfied. Therefore, for example, there is a problem in that it is not possible to apply this method to a parking lot in which a clear parking section region is not defined, a parallel parking region, or the like and available conditions are strictly limited.

CITATION LIST

Patent Document

Patent Document 1: WO 2017/068701 A1

SUMMARY OF THE INVENTION

Problems to be Solved by the Invention

The present disclosure has been made in view of the above problems, for example, and an object of the present disclosure is to provide an information processing device, an information processing method, and a program that are applicable to various parking lot types such as double parking or parallel parking and enable to present not only parking availability but also vacancy possibility information to a user who is a vehicle driver.

Solutions to Problems

A first aspect of the present disclosure is an information processing device including
a parking region analysis unit that analyzes a captured image of a camera mounted on a vehicle and analyzes whether or not the vehicle is able to be parked in section region unit, and
a display control unit that generates parking possibility identification graphic data in section region unit, on the basis of an analysis result of the parking region analysis unit and superimposes and displays the parking possibility identification graphic data on the captured image of the camera or a combined image generated on the basis of the captured image, in which
the parking region analysis unit
calculates a ratio an occlusion region that cannot be confirmed from the captured image of the camera with respect to a total section region area, for a section region where a parked vehicle is not detected from the captured image of the camera, and
executes determination processing for determining which one of a parkable region or a possibly available region the section region is according to a value of the calculated ratio, and
the display control unit
superimposes and displays graphic data different between the parkable region and the possibly available region, according to a result of the determination processing.

Moreover, a second aspect of the present disclosure is an information processing method executed by an information processing device, including
a parking region analysis step for analyzing a captured image of a camera mounted on a vehicle and analyzing whether or not the vehicle is able to be parked in section region unit, by a parking region analysis unit; and
a display control step for generating parking possibility identification graphic data in section region unit, on the basis of an analysis result of the parking region analysis unit and superimposing and displaying the data on the captured image of the camera or a combined image generated on the basis of the captured image, by a display control unit, in which
the parking region analysis unit, in the parking region analysis step,
calculates a ratio of an occlusion region that cannot be confirmed from the captured image of the camera with respect to a total section region area, for a section region where a parked vehicle is not detected from the captured image of the camera, and
executes determination processing for determining which one of a parkable region or a possibly available region the section region is according to a value of the calculated ratio, and
the display control unit, in the display control step,
superimposes and displays graphic data different between the parkable region and the possibly available region, according to a result of the determination processing.

Moreover, a third aspect of the present disclosure is a program for causing an information processing device to execute information processing including:
for causing a parking region analysis unit to execute a parking region analysis step for analyzing a captured image of a camera mounted on a vehicle and analyzing whether or not the vehicle is able to be parked in section region unit; and causing a display control unit to execute a display control step for generating parking possibility identification graphic data in section region unit, on the basis of an analysis result of the parking region analysis unit and superimposing and displaying the data on the captured image of the camera or a combined image generated on the basis of the captured image, in which the parking region analysis unit, in the parking region analysis step, executes processing for calculating a ratio of an occlusion region that cannot be confirmed from the captured image of the camera with respect to a total section region area, for a section region where a parked vehicle is not detected from the captured image of the camera, and executes determination processing for determining which one of a parkable region or a possibly available region the section region is according to a value of the calculated ratio, and the display control unit, in the display control step, executes processing for superimposing and displaying graphic data different between the parkable region and the possibly available region, according to a result of the determination processing.

Note that the program of the present disclosure is, for example, a program that can be provided by a storage medium or a communication medium that provides the program in a computer-readable format, to an information processing device, an image processing device, or a computer system capable of executing the program codes. By providing such a program in a computer-readable format, processing corresponding to the program is realized on the information processing device or the computer system.

Other purposes, features, and advantages of the present disclosure would be obvious by the detailed description based on the embodiments of the present invention as described later and the attached drawings. Note that a system described herein is a logical set configuration of a plurality of devices, and is not limited to a system in which devices with respective configurations are in the same housing.

According to the configuration of the embodiment of the present disclosure, a configuration is implemented that determines a parkable region or a possibly available region, according to a ratio of an occlusion region in a parking section region and executes different identification display processing according to the determination result.

Specifically, for example, a parking region analysis unit that analyzes a camera-captured image and analyzes whether or not the vehicle can park in section region unit, and a display control unit that generates parking possibility identification graphic data in section region unit on the basis of the analysis result and superimposes and displays the data on the camera-captured image are included. The parking region analysis unit calculates the ratio of the occlusion region with respect to the total section region area, for a section region where a parked vehicle is not detected from the camera-captured image and determines which one of the parkable region or the possibly available region the section region is, according to the calculated ratio, and the display control unit superimposes different graphic data for each region to be displayed.

With this configuration, a configuration is implemented that determines the parkable region or the possibly available region, according to the ratio of the occlusion region in the parking section region and executes different identification display processing according to the determination result.

Note that the effects described herein are merely examples and are not limited, and additional effects may also be provided.

BRIEF DESCRIPTION OF DRAWINGS

FIG. 2 is a diagram for explaining a configuration example of the vehicle.

FIG. 23 is a diagram illustrating a flowchart for explaining the processing sequence of the processing executed by the information processing device according to the present disclosure.

MODE FOR CARRYING OUT THE INVENTION

Hereinafter, an information processing device, an information processing method, and a program according to the present disclosure will be described in detail with reference to the drawings. Note that the description will be made according to the following items.

1. General Processing of Vehicle Parking Processing in Parking Lot and Problems Thereof
2. Regarding Processing for Generating Three Types of Region Identification Data Including Parkable Region, Unparkable Region, And Possibly Available Region And Presenting Data to User, According to Present Disclosure
3. (First Embodiment) Details of Processing Executed by Information Processing Device According to Present Disclosure
4. (Second Embodiment) Regarding Processing Example in a Case of Parallel Parking of Which Parking Section Region Is Not Defined
5. Regarding Display Data Update Processing
6. Regarding Automated Driving Processing in a Case Where Vehicle Is Automated Driving Vehicle
7. Regarding Configuration Example of Information Processing Device According to Present Disclosure
8. Regarding Hardware Configuration Example of Information Processing Device According to Present Disclosure
9. Regarding Configuration Example of Vehicle
10. Summary of Configuration of Present Disclosure 1. General Processing of Vehicle Parking Processing in Parking Lot and Problems Thereof First, general processing of vehicle parking processing in a parking lot and problems thereof will be described.

A general vehicle travel example in a case where a vehicle is parked in a parking lot will be described with reference to FIG. 1 and subsequent drawings.

Figure 1:
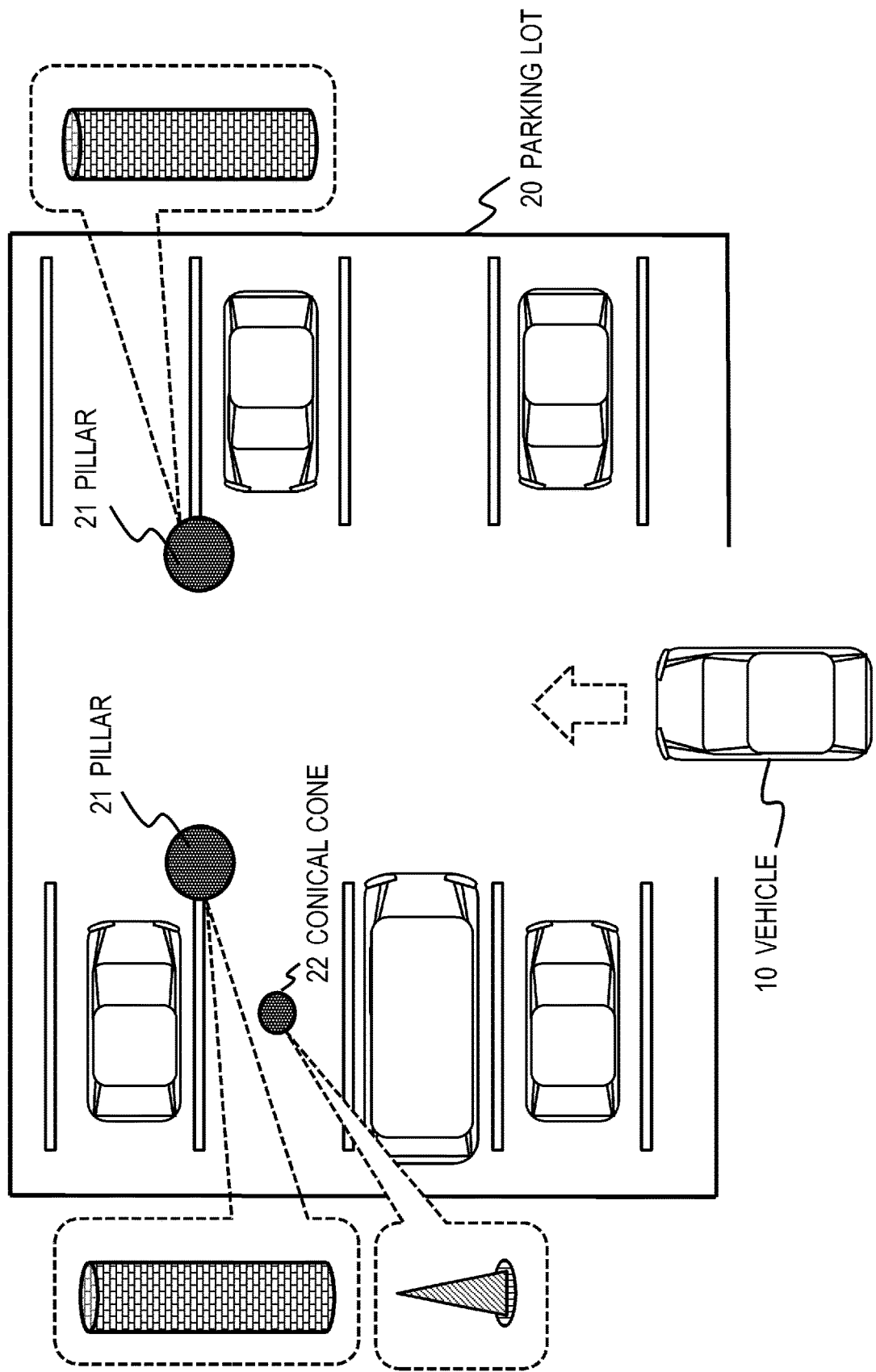
FIG. 1 is a diagram for explaining an example of a configuration of a parking lot and a vehicle to be parked.

In FIG. 1, a vehicle 10 and a parking lot 20 are illustrated. The vehicle 10 enters the parking lot 20 from an entrance of the parking lot 20 and is about to search for a vacant space to park.

In a state in FIG. 1, a user who is a driver of the vehicle 10 enters the parking lot from the entrance of the parking lot 20 while looking forward of the vehicle.

For example, since an entrance of a store is on the far side (upper side in FIG. 1) of the parking lot, the user who is the driver of the vehicle 10 thinks to park the vehicle 10 on the far side (upper side in FIG. 1) of the parking lot as possible.

However, since the field of view of the driver is blocked by a parked vehicle that has already parked in the parking lot, a pillar 21, or the like, it is difficult to determine which part of a parking section region is vacant at the time of entrance.

Furthermore, although a second parking region from the upper left end of the parking section illustrated in FIG. 1 is vacant, it is not possible to use the region because a conical cone 22 is placed.

However, the user who is the driver of the vehicle 10 cannot visually confirm the conical cone 22 at the time of entrance.

Note that, as illustrated in FIG. 2, in a case where the vehicle 10 is a vehicle including a camera 11, an image captured by the camera 11 is displayed on a display unit 12 in the vehicle 10. The user who is the driver can observe the entire parking lot by viewing this display data.

Figure 3:
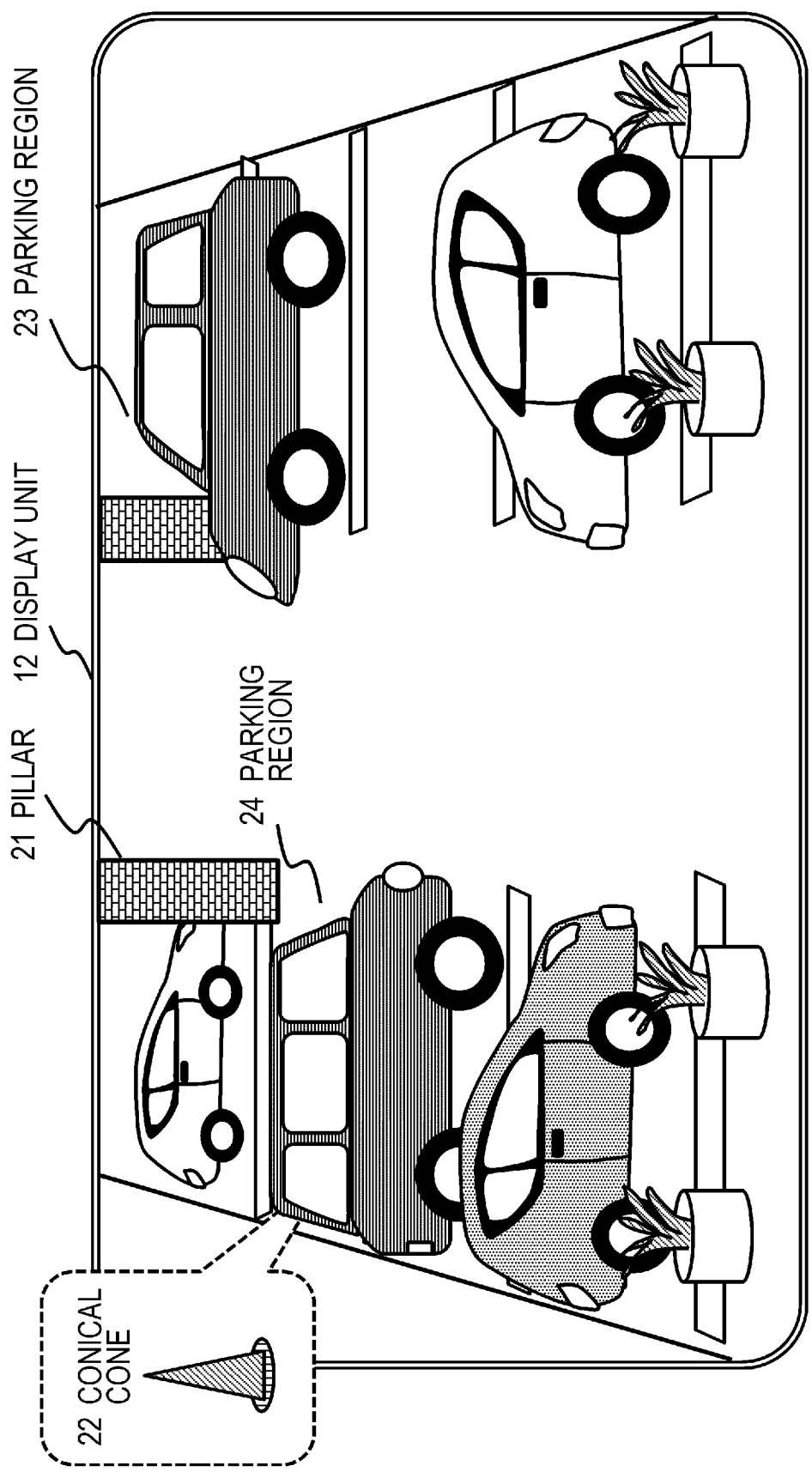
FIG. 3 is a diagram for explaining an example of the parking lot.

An example of the captured image displayed on the display unit 12 is illustrated in FIG. 3.

For example, a camera-captured image as illustrated in FIG. 3 is displayed on the display unit 12. However, even when viewing this display image, for example, a right-back parking region 23 in the parking lot is behind a parked vehicle on the front side, and it is not possible for the driver to clearly determine whether or not the vehicle can be parked.

Furthermore, a second parking region 24 from the back on the left side of the parking lot is also behind the parked vehicle on the front side, it is not possible for the driver to clearly determine whether or not the vehicle can be parked. Although the conical cone 22 is placed in this parking region 24, the conical cone 22 is not imaged in a captured image of the camera 11. Therefore, it is not possible for the driver to completely confirm the conical cone 22.

2. Regarding Processing for Generating Three Types of Region Identification Data Including Parkable Region, Unparkable Region, And Possibly Available Region And Presenting Data to User, According to Present Disclosure Next, processing for generating three types of region identification data including a parkable region, an unparkable region, and a possibly available region and presenting the data to the user, according to the present disclosure will be described.

Figure 4:
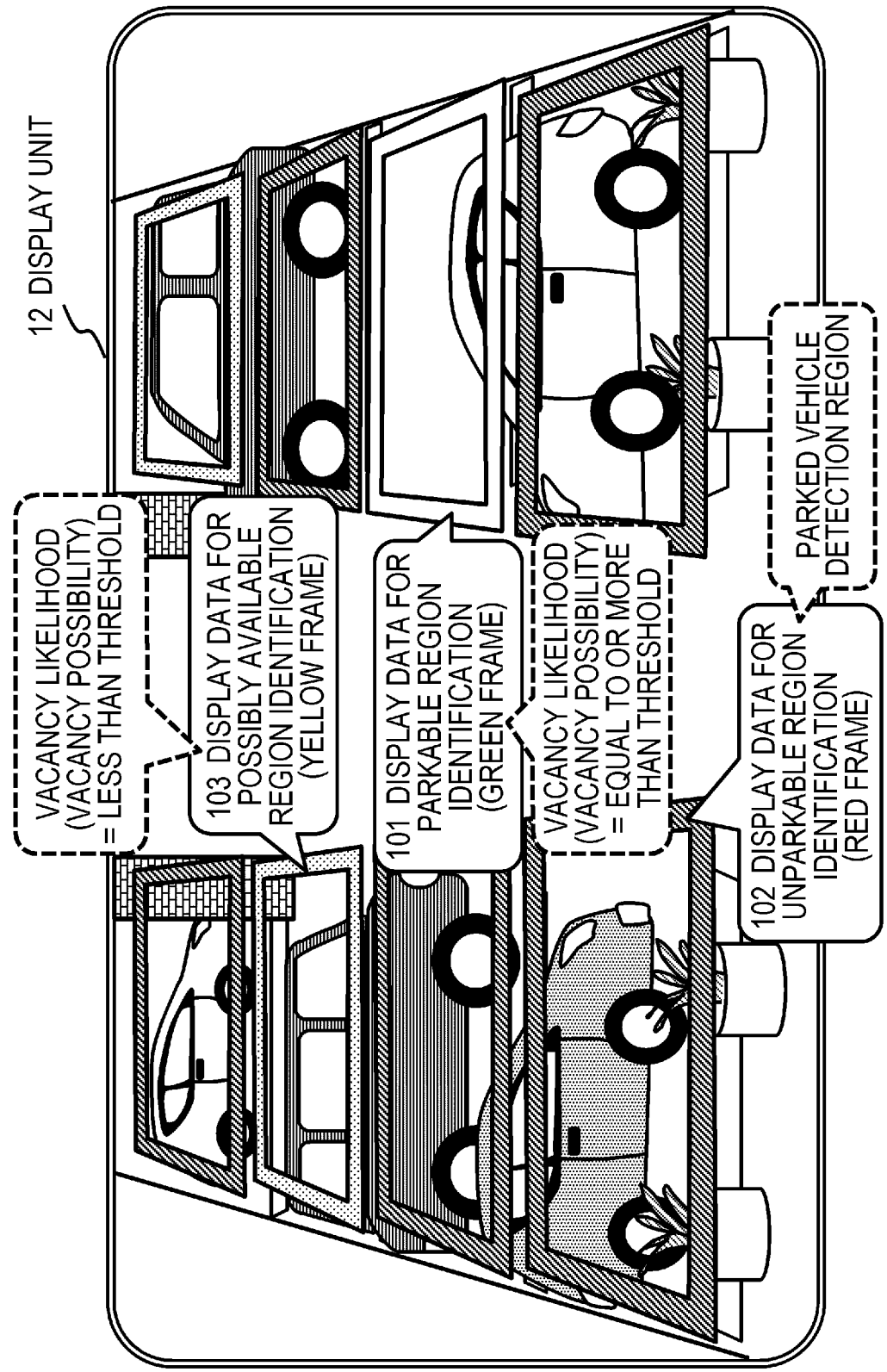
FIG. 4 is a diagram for explaining a specific example of display data generated by an information processing device according to the present disclosure.

FIG. 4 is a diagram illustrating an example of display data displayed on the display unit 12 of the vehicle 10 by the processing according to the present disclosure.

The display data illustrated in FIG. 4 is display data in which any one of three types of parking possibility identification graphic data (color frame) is superimposed on each parking section region in the captured image of the camera 11 described above with reference to FIG. 3 and is displayed.

There are the following three types of parking possibility identification graphic data (color frame) to be superimposed and displayed.

(1) Display data for parkable region identification (green frame) 101
(2) Display data for unparkable region identification (red frame) 102
(3) Display data for possibly available region identification (yellow frame) 103

Note that the colors of green, red, and yellow are merely examples, and a color combination other than these may be used.

"(1) The display data for parkable region identification (green frame) 101" is superimposed and displayed on a parking section region in which a parked vehicle is not detected as an analysis result of the captured image by the camera 11 mounted on the vehicle 10 and a vacancy likelihood (vacancy possibility) is equal to or more than a prescribed threshold.

"(2) The display data for unparkable region identification (red frame) 102" is superimposed and displayed on a parking section region in which a parked vehicle is detected as the analysis result of the captured image by the camera 11 mounted on the vehicle 10.

"(3) The display data for possibly available region identification (yellow frame) 103" is superimposed and displayed on a parking section region in which a parked vehicle is not detected as the analysis result of the captured image by the camera 11 mounted on the vehicle 10 and the vacancy likelihood (vacancy possibility) is less than the prescribed threshold.

The vacancy likelihood (vacancy possibility) is an index value indicating a possibility that a parking section region is vacant and parking is possible. Details of processing for calculating the vacancy likelihood (vacancy possibility) will be described later.

Note that, although the diagram illustrated in FIG. 4 is illustrated as a monochrome image in the drawing, an image displayed on the display unit 12 of the vehicle 10 is a color image, and the display data for region identification (green frame, red frame, and yellow frame) is displayed as high-luminance color data. Therefore, the user (driver) can immediately determine three states (parking is possible, parking is not possible, may be available) of each parking region.

Figure 5:
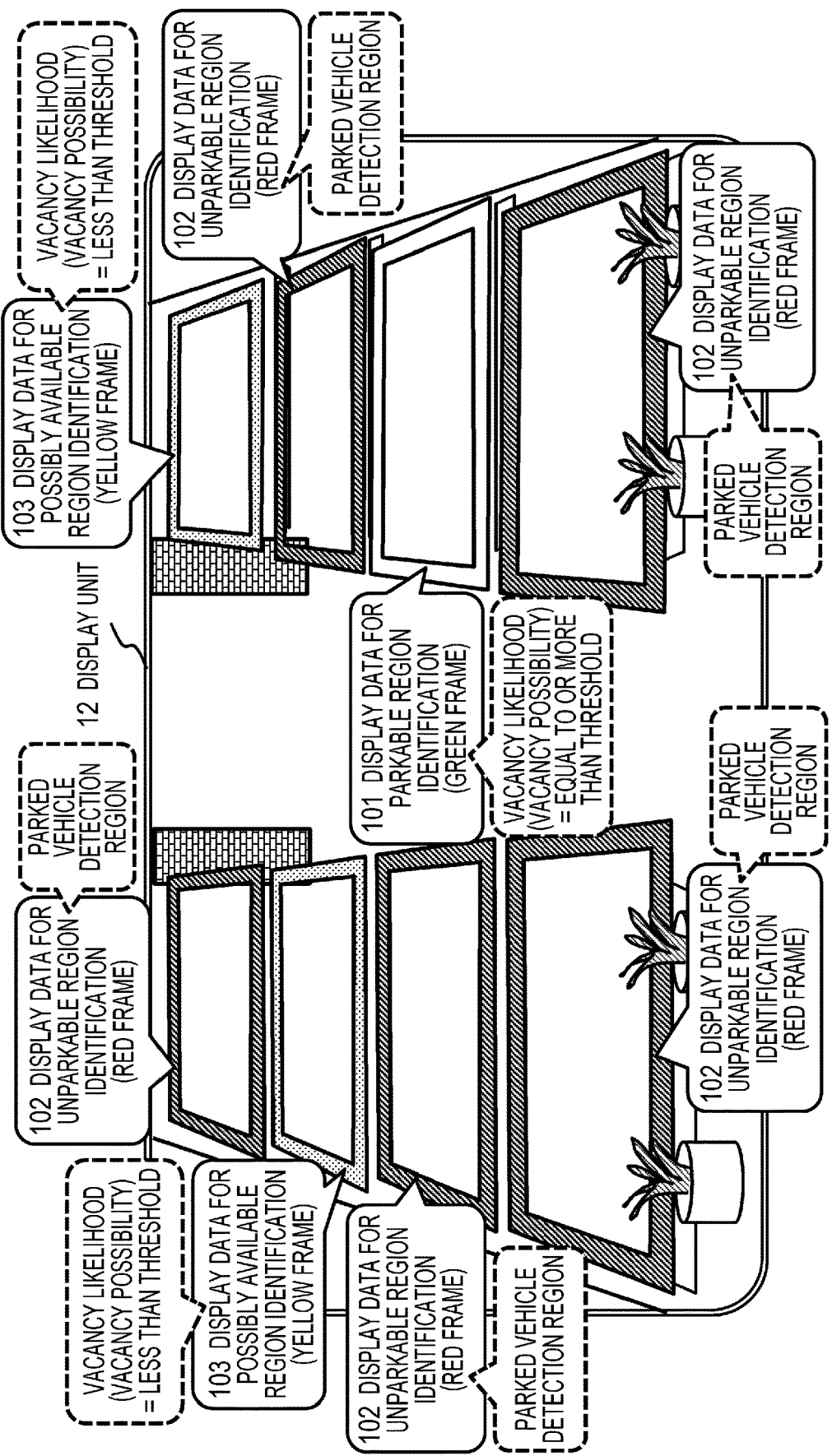
FIG. 5 is a diagram for explaining a specific example of the display data generated by the information processing device according to the present disclosure.

Since the monochrome image illustrated in FIG. 4 is hard to understand, a data example in which a background vehicle is omitted is illustrated in FIG. 5.

As illustrated in FIG. 5, the following three types of parking possibility identification graphic data (color frame) is displayed for each parking section region.

(1) Display data for parkable region identification (green frame) 101
(2) Display data for unparkable region identification (red frame) 102
(3) Display data for possibly available region identification (yellow frame) 103

The user (driver) can immediately determine whether each parking region is a parkable region, an unparkable region, or a possibly available region, on the basis of the parking possibility identification graphic data (color frame) superimposed and displayed on each parking section region.

Note that the examples illustrated in FIGS. 4 and 5 are examples using an image captured by the camera 11 that captures an image on the front side of the vehicle 10 illustrated in FIG. 2, as the display data displayed on the display unit 12.

The display data displayed on the display unit 12 is not limited to the captured image by such a front imaging camera and can be various types of data.

Figure 6:
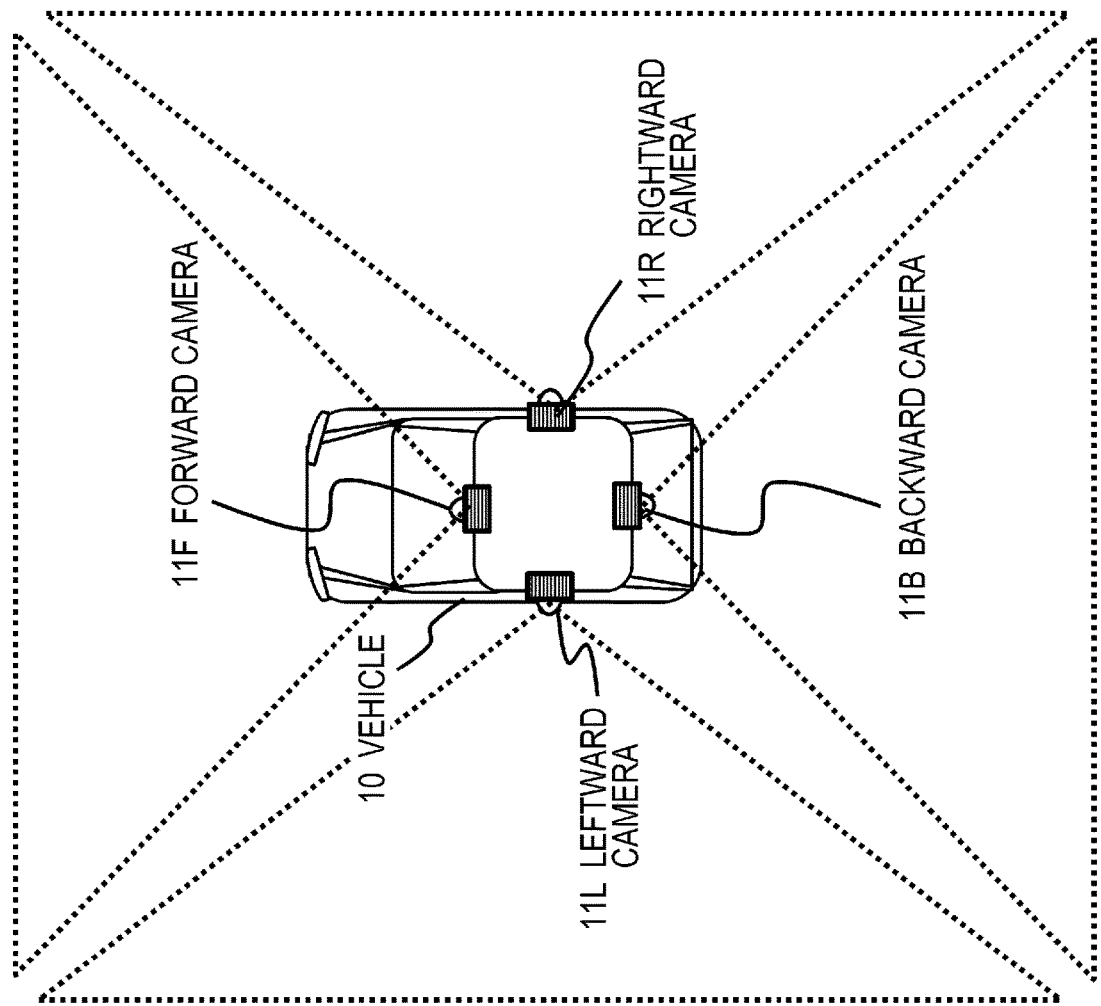
FIG. 6 is a diagram for explaining an example of a camera configuration of the vehicle.

For example, as illustrated in FIG. 6, a plurality of cameras for imaging front, rear, left, and right sides is mounted on the vehicle 10, and an image observed from above, that is, a bird's-eye view may be generated and displayed by combining the images captured by these cameras.

The vehicle 10 illustrated in FIG. 6 includes the following four cameras.

(a) Forward camera 11F that captures an image on the front side of the vehicle 10,
(b) Backward camera 11B that captures an image on the rear side of the vehicle 10,
(c) Leftward camera 11L that captures an image on the left side of the vehicle 10, and
(d) Rightward camera 11R that captures an image on the right side of the vehicle 10.

By combining captured images of the cameras that capture images in the four directions including front, rear, left, and right of the vehicle 10, it is possible to generate the image observed from above the vehicle 10, that is, the bird's-eye view.

Figure 7:
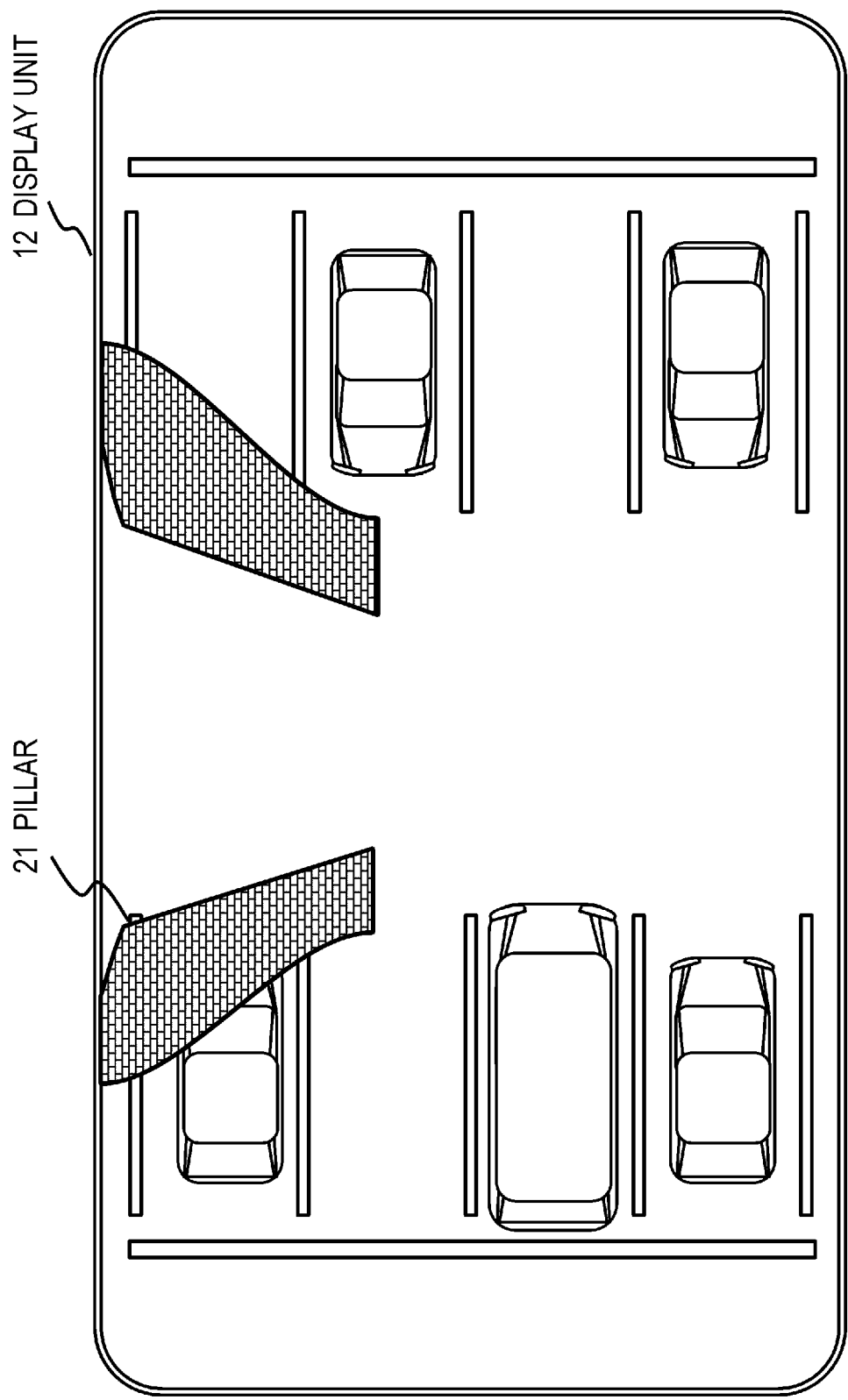
FIG. 7 is a diagram for explaining a specific example of a bird's-eye view generated on the basis of a camera-captured image of the vehicle.

An image displayed on the display unit 12 of the vehicle 10 by such processing is illustrated in FIG. 7.

Display data illustrated in FIG. 7 is an example of display data including a bird's-eye view generated by combining the four captured images of the cameras 11F, 11L, 11B, and 11R that capture the images in the four directions including front, rear, left, and right of the vehicle 10 described with reference to FIG. 6.

Note that, although the pillar 21 appears distorted, this is a distortion generated by processing for combining a plurality of images. Furthermore, the conical cone 22 that should originally exist is not displayed. This is because the conical cone 22 is, for example, behind a vehicle parked in a front parking region and is not imaged by any one of the four cameras.

In this way, a distortion of a subject or the like is generated in the display data (bird's-eye view) generated by the processing for combining the plurality of images, and it is difficult for the driver (user) to immediately determine the state (parkable, unparkable, and possibly available) of each parking region.

Figure 8:
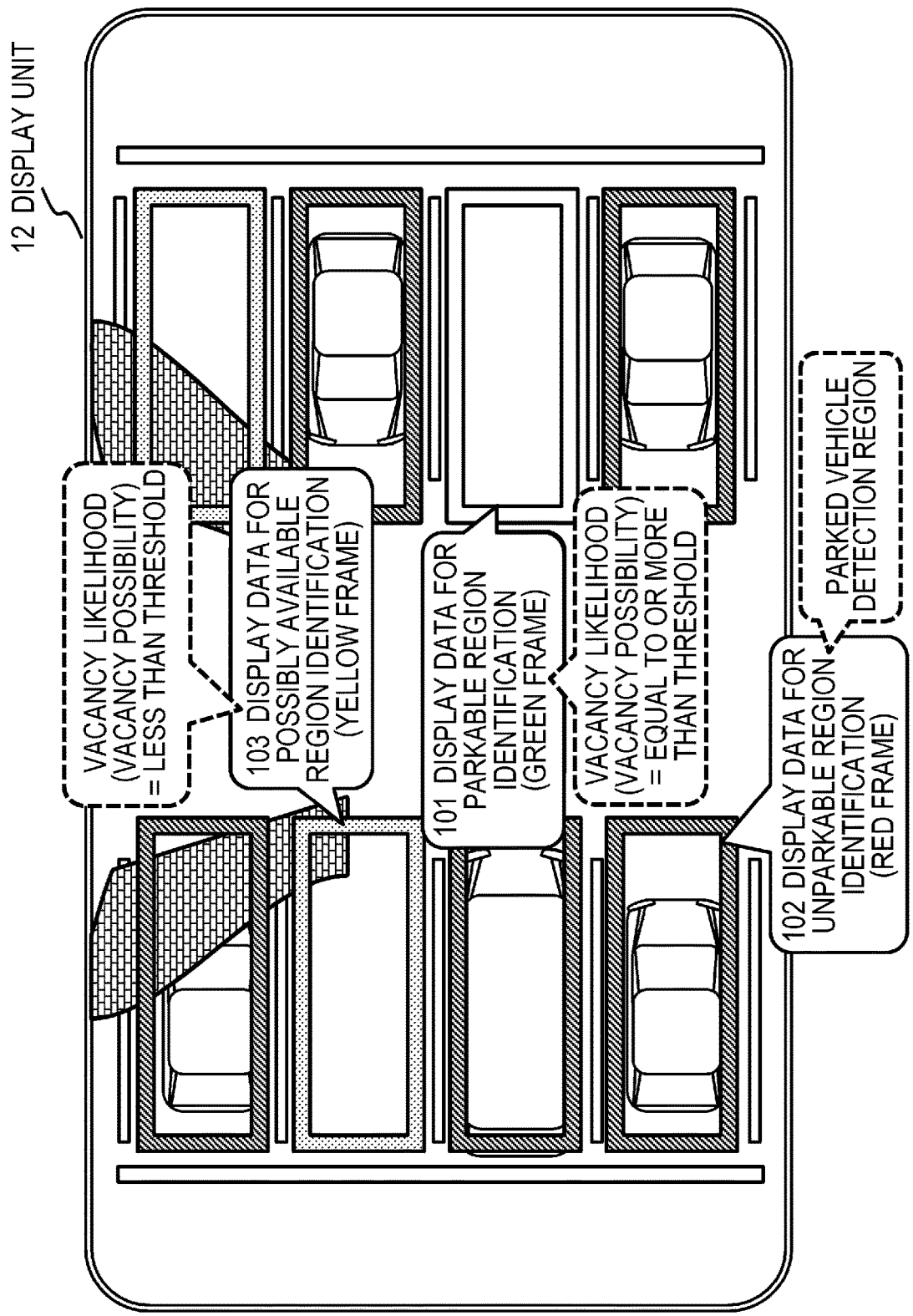
FIG. 8 is a diagram for explaining a specific example of the display data generated by the information processing device according to the present disclosure.

FIG. 8 is an example of display data in which the parking possibility identification graphic data (color frame) generated by the processing according to the present disclosure is superimposed on the display data (bird's-eye view) generated by the processing for combining the plurality of images.

There are the following three types of parking possibility identification graphic data (color frame).

(1) Display data for parkable region identification (green frame) 101
(2) Display data for unparkable region identification (red frame) 102
(3) Display data for possibly available region identification (yellow frame) 103

Note that the colors of green, red, and yellow are merely examples, and a color combination other than these may be used.

The parking possibility identification graphic data (1) to (3) (color frame) has meanings similar to those described with reference to FIGS. 4 and 5 above.

That is, "(1) The display data for parkable region identification (green frame) 101" is superimposed and displayed on the parking section region in which a parked vehicle is not detected as the analysis result of the captured image by the camera 11 mounted on the vehicle 10 and the vacancy likelihood (vacancy possibility) is equal to or more than a prescribed threshold.

"(2) The display data for unparkable region identification (red frame) 102" is superimposed and displayed on a parking section region in which a parked vehicle is detected as the analysis result of the captured image by the camera 11 mounted on the vehicle 10.

"(3) The display data for possibly available region identification (yellow frame) 103" is superimposed and displayed on a parking section region in which a parked vehicle is not detected as the analysis result of the captured image by the camera 11 mounted on the vehicle 10 and the vacancy likelihood (vacancy possibility) is less than the prescribed threshold.

Note that, although the diagram illustrated in FIG. 8 is illustrated as a monochrome image in the drawing, an image displayed on the display unit 12 of the vehicle 10 is a color image, and the display data for region identification (green frame, red frame, and yellow frame) is displayed as high-luminance color data. Therefore, the user (driver) can immediately determine three states (parking is possible, parking is not possible, may be available) of each parking region. A data example in which a background vehicle is omitted is illustrated in FIG. 9.

Figure 9:
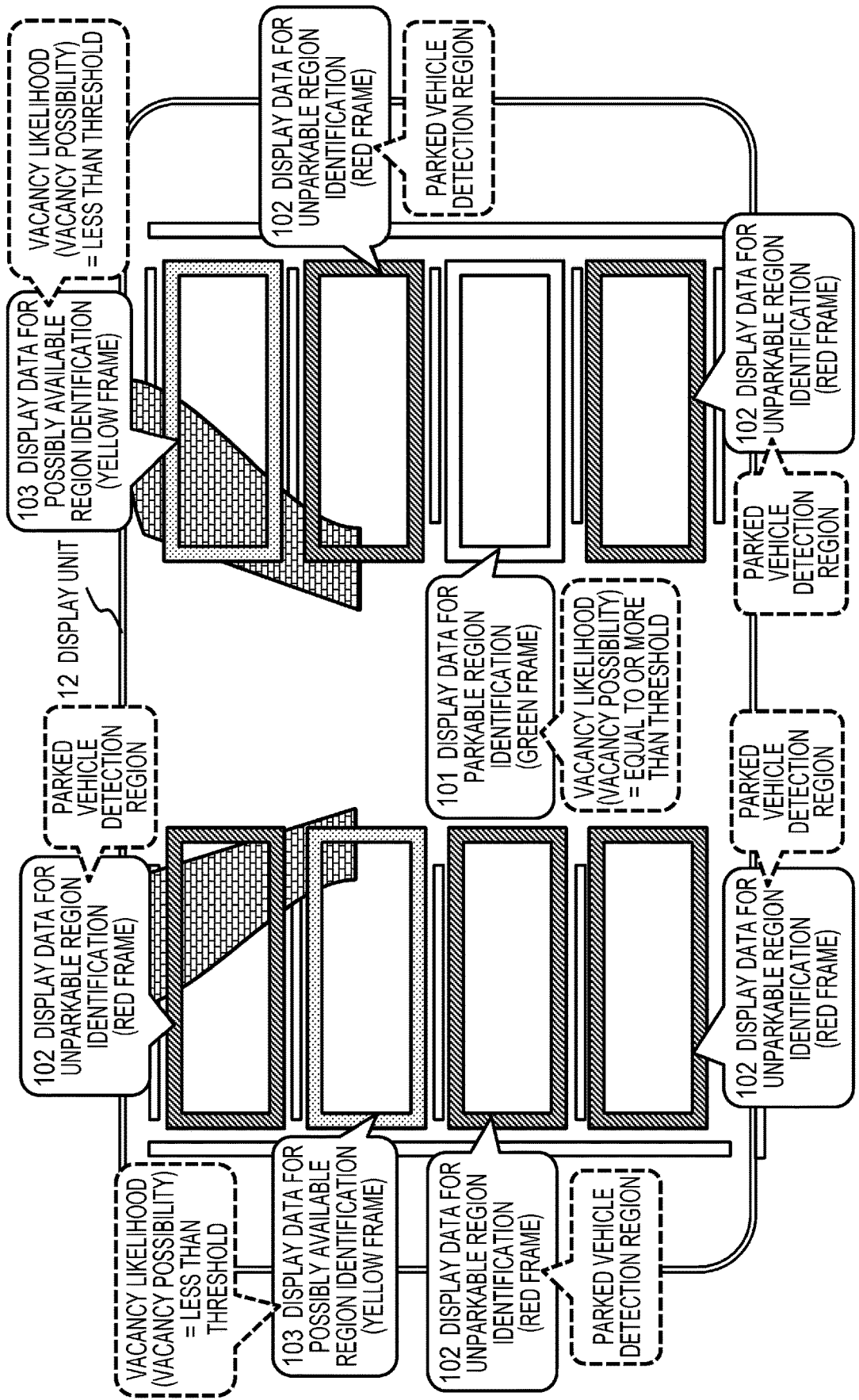
FIG. 9 is a diagram for explaining a specific example of the display data generated by the information processing device according to the present disclosure.

As illustrated in FIG. 9, the following three types of parking possibility identification graphic data (color frame) is displayed for each parking section region.

(1) Display data for parkable region identification (green frame) 101
(2) Display data for unparkable region identification (red frame) 102
(3) Display data for possibly available region identification (yellow frame) 103

The user (driver) can immediately determine whether each parking region is a parkable region, an unparkable region, or a possibly available region, on the basis of the parking possibility identification graphic data (color frame) superimposed and displayed on each parking section region.

3. (First Embodiment) Details of Processing Executed by Information Processing Device According to Present Disclosure Next, details of processing executed by an information processing device according to a first embodiment of the present disclosure will be described.

Note that the information processing device according to the present disclosure is an information processing device mounted on a vehicle 10.

The information processing device inputs a captured image of a camera mounted on a vehicle, generates display data on a display unit, executes processing for analyzing the captured image, determines parking possibility of each parking section region or the like, and executes processing for generating parking possibility identification graphic data (color frame) for each parking section region and superimposing the parking possibility identification graphic data on a parking lot image displayed on the display unit to be displayed.

A sequence of the processing executed by the information processing device according to the present disclosure will be described with reference to the flowchart illustrated in FIG. 10.

Figure 10:
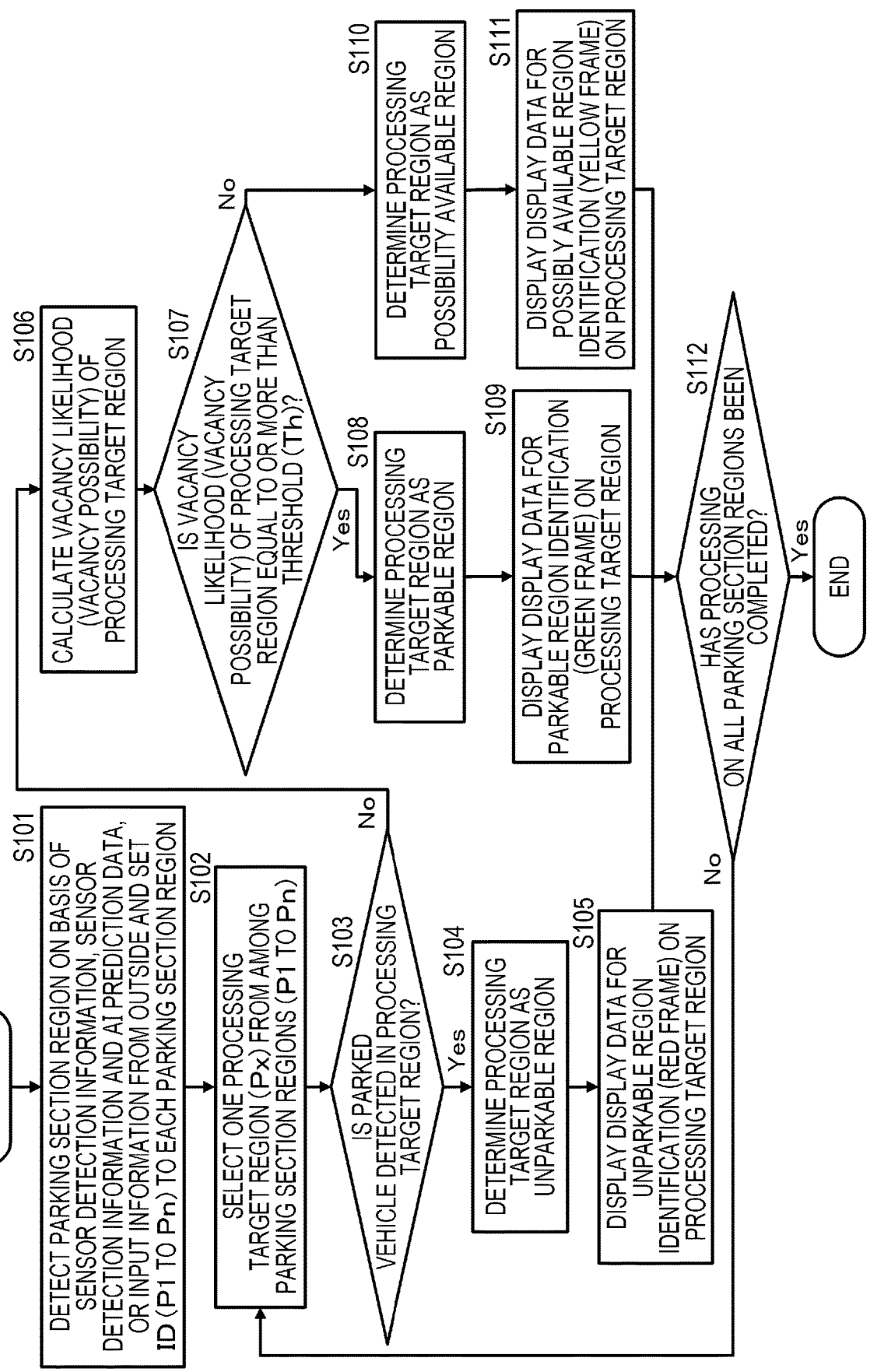
FIG. 10 is a diagram illustrating a flowchart for explaining a processing sequence of processing executed by the information processing device according to the present disclosure.

Note that the flowchart illustrated in FIG. 10 is executed under control of a data processing unit of the information processing device according to the present disclosure. The information processing device according to the present disclosure includes, for example, the data processing unit that has a program execution function such as a CPU, and the data processing unit executes processing according to a flow illustrated in FIG. 10, in accordance with a program stored in a storage unit in the information processing device.

Hereinafter, processing of each step in the flowchart illustrated in FIG. 10 will be described.

(Step S101)

First, in step S101, the data processing unit of the information processing device mounted on the vehicle 10 detects a parking section region, on the basis of sensor detection information such as a captured image of a camera, the sensor detection information and AI prediction data, or input information from outside and sets a parking section region identifier (ID) to the detected parking section region.

The captured image of the camera is, for example, a captured image of a camera 11 that captures an image on the front of the vehicle 10 described with reference to FIG. 2 or captured images of all of the following four cameras (a) a forward camera 11F that captures an image on the front side of the vehicle 10,
(b) a backward camera 11B that captures an image on the rear side of the vehicle 10,
(c) a leftward camera 11L that captures an image on the left side of the vehicle 10, and
(d) a rightward camera 11R that captures an image on the right side of the vehicle 10 described with reference to FIG. 6,
or a plurality of cameras, or a combined image (bird's-eye view) generated on the basis of the plurality of captured images.

In step S101, the parking section region is detected from at least one or more camera-captured images, and the parking section region identifier (ID) is set to the detected parking section region.

Alternatively, the parking section region may be estimated using not only the camera-captured image but also the AI prediction data.

For example, the processing for estimating the parking section region may be executed by using an AI predictor generated by a learning algorithm using a convolutional neural network (CNN), which is a convolutional neural network, and determining a parking section region in a region that is not clearly imaged by the camera.

Alternatively, the processing for detecting the parking section region may be executed using the input information from outside, for example, parking lot information provided from a parking lot information providing server.

In this way, in step S101, the parking section region is detected, on the basis of the sensor detection information such as the captured image of the camera, the sensor detection information and the AI prediction data, or the input information from outside, and the parking section region identifier (ID) is set to the detected parking section region.

Figure 11:
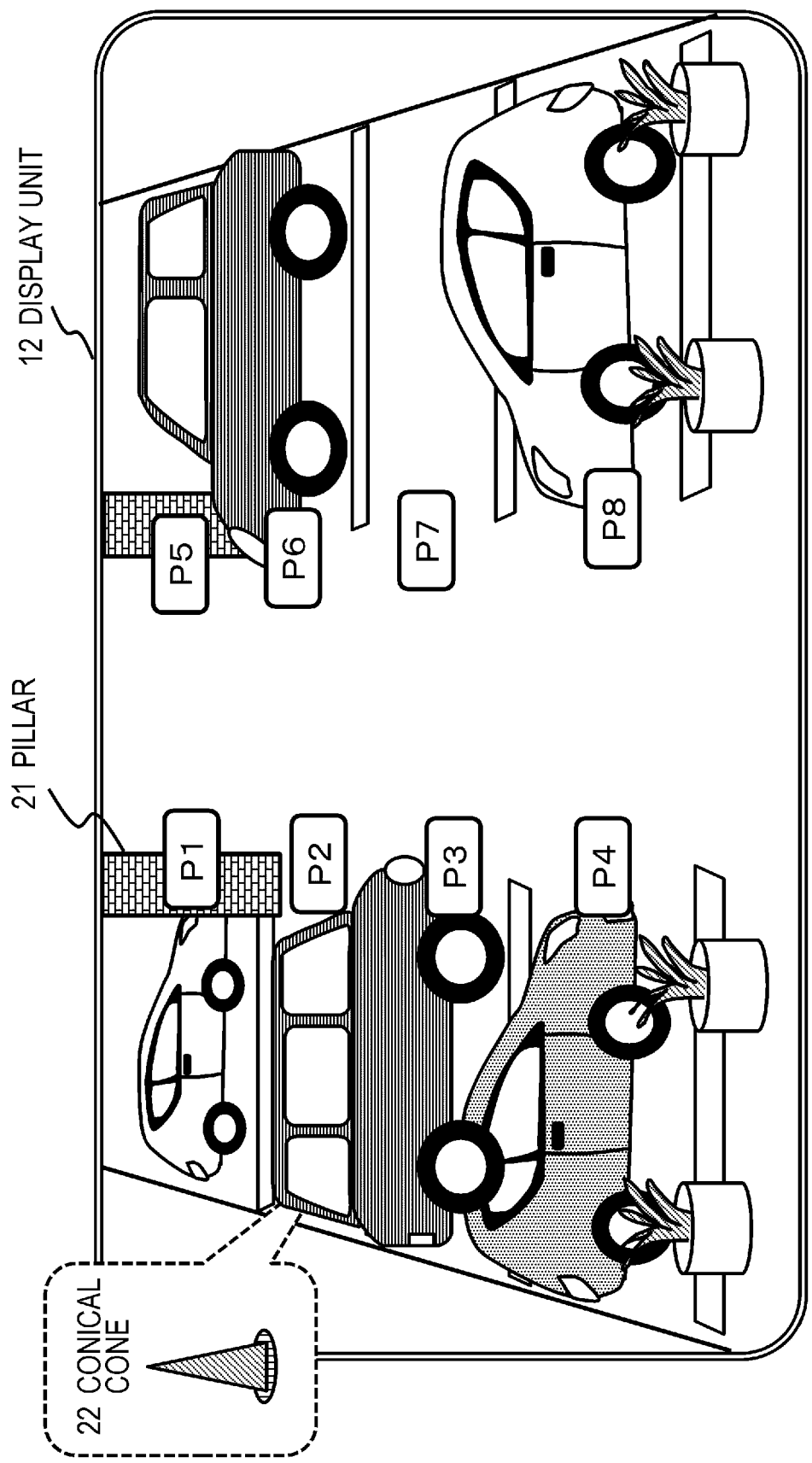
FIG. 11 is a diagram for explaining a specific example of the processing executed by the information processing device according to the present disclosure.

A setting example of the parking section region identifier (ID)) to the detected parking section region is illustrated in FIG. 11.

The example illustrated in FIG. 11 is a diagram illustrating a setting example of parking section region identifiers (ID) to eight parking section regions detected from the parking lot where double parking is performed as described above with reference to FIG. 1.

This is an example in which eight parking section region identifiers (ID=P1 to P8) are set to parking section regions from an upper left parking section region to a lower right parking section region.

(Step S102)

Next, in step S102, the data processing unit of the information processing device mounted on the vehicle 10 selects one processing target region (Px) from among the parking section regions (P1 to Pn) detected in step S101.

For example, in the example illustrated in FIG. 11 in which the eight parking section region identifiers (ID=P1 to P8) are set, the parking section regions are sequentially selected from P1 as processing target regions.

(Step S103)

Next, in step S103, the data processing unit of the information processing device determines whether or not a parked vehicle is detected in the processing target region (Px).

This determination processing is executed on the basis of the captured image of the camera mounted on the vehicle 10.

In a case where the parked vehicle is detected in the processing target region (Px), the procedure proceeds to step S104.

On the other hand, in a case where the parked vehicle is not detected in the processing target region (Px), the procedure proceeds to step S106.

(Step S104)

Next, processing in steps S104 and S105 are executed in a case where it is determined in step S103 that the parked vehicle is detected in the processing target region (Px).

In this case, in step S104, the data processing unit of the information processing device determines the processing target region (Px) as an unparkable region.

(Step S105)

Next, in step S105, the data processing unit of the information processing device displays display data for unparkable region identification (red frame) on the processing target region (Px), determined as the unparkable region in step S104.

This processing corresponds to, for example, processing for displaying the display data for unparkable region identification (red frame), for example, on a parking section region in which a parked vehicle exists in the parking lot image illustrated in FIGS. 4 and 8, for example, a parking section region at an upper left end, a parking section region at a lower left end, or the like.

Note that, for example, the parking section region at the upper left end in the parking lot image illustrated in FIGS. 4 and 8 is a region where the parked vehicle is detected by the camera 11 of the vehicle 10.

Figure 12:
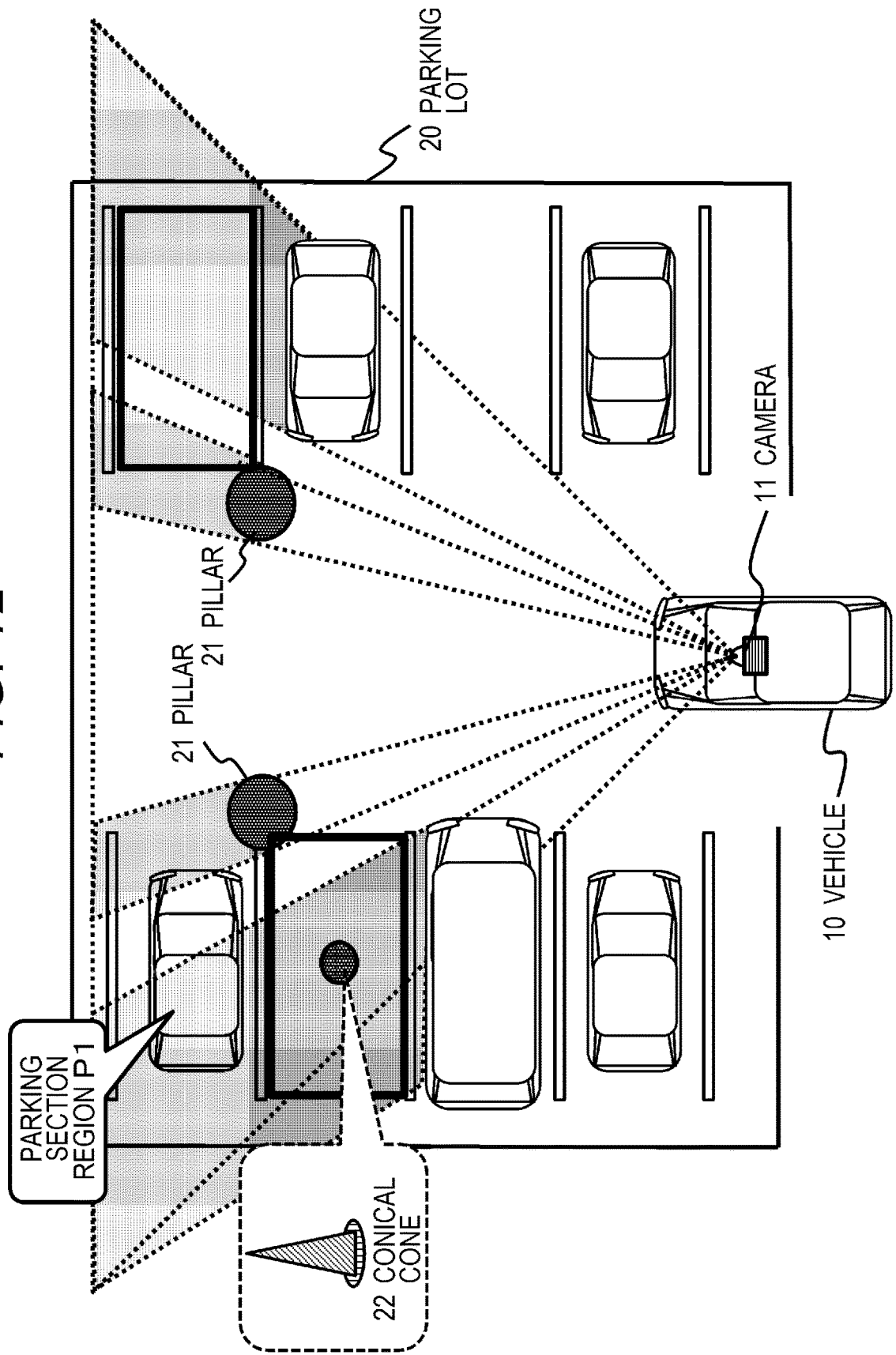
FIG. 12 is a diagram for explaining a specific example of the processing executed by the information processing device according to the present disclosure.

FIG. 12 is a diagram illustrating a parked vehicle detection state by the camera 11 of the vehicle 10.

As illustrated in FIG. 12, although a part of a vehicle parked in the parking section region P1 (gray portion in the drawing) is hidden by a parked vehicle or a pillar 21 on the front side, a part of the vehicle can be imaged by the camera 11.

In this way, in the processing according to the present disclosure, if even a part of the parked vehicle is confirmed in the parking section region, the parking section region is determined as an unparkable region, and the display data for unparkable region identification (red frame) is displayed.

(Step S106)

Next, processing in steps S106 to S111 is executed in a case where it is determined in step S103 that the parked vehicle is not detected in the processing target region (Px).

In this case, in step S106, the data processing unit of the information processing device executes processing for calculating a vacancy likelihood (vacancy possibility) of the processing target region (Px).

As described above, the vacancy likelihood (vacancy possibility) is an index value indicating a possibility that the parking section region is vacant.

A specific example of the processing for calculating the vacancy likelihood (vacancy possibility) executed by the data processing unit of the information processing device according to the present disclosure will be described with reference to FIG. 13 and the subsequent drawings.

As described above, the processing in steps S106 to S111 is executed in a case where it is determined in step S103 that the parked vehicle is not detected in the processing target region (Px).

As an example of the processing target region (Px) in which the parked vehicle is not detected, a processing example in a case of the parking section regions P2 and P5 illustrated in FIG. 13 will be described.

Figure 13:
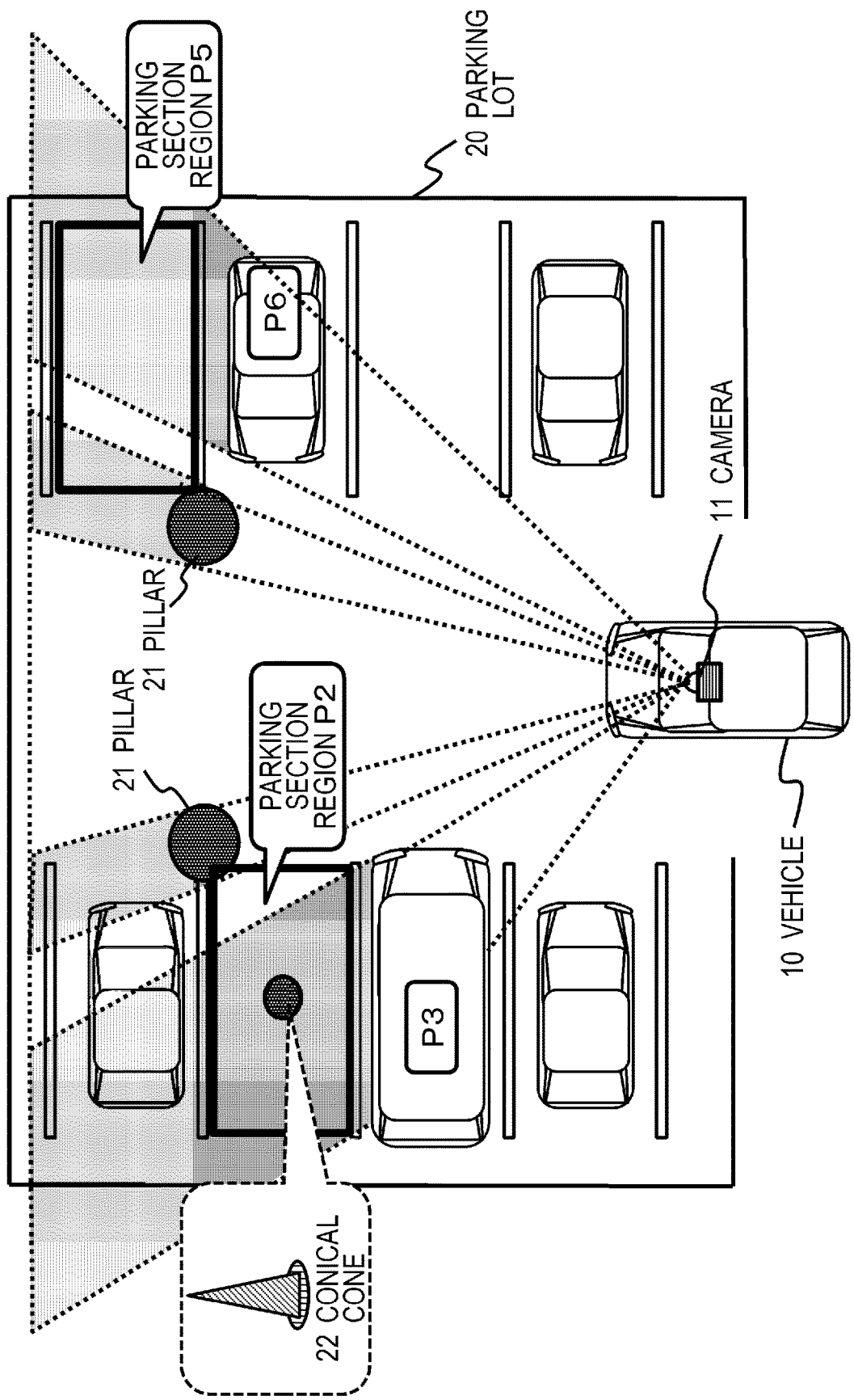
FIG. 13 is a diagram for explaining a specific example of the processing executed by the information processing device according to the present disclosure.

The parking section region P2 illustrated in FIG. 13 is a parking section region in which the parked vehicle is not detected by the camera 11 of the vehicle 10, as illustrated in FIG. 13.

Similarly, the parking section region P5 is a parking section region in which the parked vehicle is not detected by the camera 11 of the vehicle 10.

Therefore, in a case where the parking section region P2 or P5 illustrated in FIG. 13 is selected as the processing target region (Px) in step S102, the data processing unit of the information processing device executes processing for calculating a vacancy likelihood (vacancy possibility) of the processing target region (P2) or (P5) in step S106.

Specific calculation processing of the processing for calculating the vacancy likelihoods (vacancy possibility) of the parking section regions P2 and P5 illustrated in FIG. 13 will be described with reference to FIG. 14.

Figure 14:
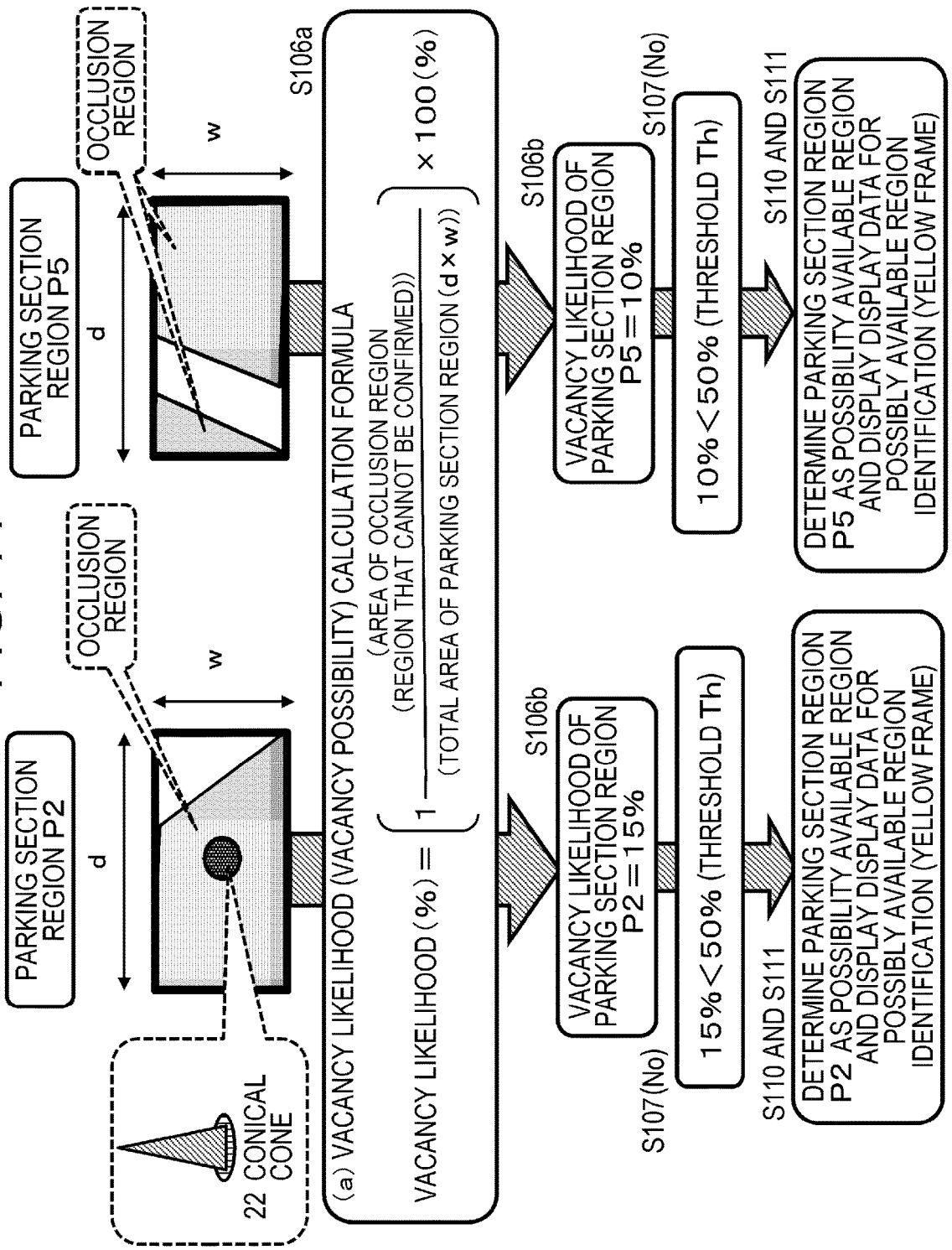
FIG. 14 is a diagram for explaining a specific example of the processing executed by the information processing device according to the present disclosure.

In FIG. 14, on the left side, a specific example of the processing for calculating the vacancy likelihood (vacancy possibility) of the parking section region P2 is illustrated, and on the right side, a specific example of the processing for calculating the vacancy likelihood (vacancy possibility) of the parking section region P5 is illustrated.

First, the processing for calculating the vacancy likelihood (vacancy possibility) of the parking section region P2 illustrated on the left side in FIG. 14 will be described.

As illustrated in a vacancy likelihood (vacancy possibility) calculation formula in FIG. 14(a), the vacancy likelihood (vacancy possibility) of each parking section region is calculated according to the following formula (1).

Vacancy likelihood (vacancy possibility)(%) = (Formula 1)

$$(1 - (\text{occlusion region area})/$$

$$(\text{total area of parking section region})) * 100(\%)$$

Note that the occlusion region is a region that cannot be confirmed in the captured image of the camera. For example, the occlusion region is a region that is not included in the captured image of the camera and is hidden by an obstacle such as a shaded portion of a forward vehicle or a pillar. A gray region of the parking section region P2 illustrated in FIG. 14 is the occlusion region, and a white portion is a confirmable region that is imaged by the camera.

The total area of the parking section region is a multiplication value of a length (d) in the front-back direction and a width (w) of a parking section: d*w.

When the vacancy likelihood (vacancy possibility) of the parking section region P2 is calculated according to (formula 1) described above, the vacancy likelihood (vacancy possibility) of the parking section region P2=15%.

On the other hand, when the vacancy likelihood (vacancy possibility) of the parking section region P5 illustrated on the right side in FIG. 14 is calculated according to (formula 1) described above, the vacancy likelihood (vacancy possibility) of the parking section region P5=10%.

(Step S107)

When the processing for calculating the vacancy likelihood (vacancy possibility) of the processing target region is completed in step S106, next, the data processing unit of the information processing device, in step S107, compares the calculated vacancy likelihood (vacancy possibility) and a predetermined threshold (Th) and determines whether or not the calculated vacancy likelihood is equal to or more than the threshold (Th).

Here, the threshold is set to 50%.

Note that the threshold=50% is an example, and the value of the threshold can be variously set.

If the calculated vacancy likelihood (vacancy possibility) is equal to or more than the threshold (Th), that is, equal to or more than 50%, the procedure proceeds to step S108.

On the other hand, in a case where the calculated vacancy likelihood (vacancy possibility) is less than the threshold (Th), that is, less than 50%, the procedure proceeds to step S110.

(Steps S108 and S109)

Processing in steps S108 and S109 is executed in a case where the vacancy likelihood (vacancy possibility) of the processing target region calculated in step S106 is equal to or more than the threshold (Th), that is, equal to or more than 50%.

Specifically, in a case where a region other than the occlusion region (region that cannot be confirmed in captured image of camera), that is, the region that can be confirmed from the captured image of the camera is equal to or more than 50% of the total area of the parking section region (processing target region) where the parked vehicle cannot be confirmed, the processing in steps S108 and S109 is executed.

In this case, the data processing unit of the information processing device determines the processing target region as the parkable region in step S108.

Moreover, in step S109, the display data for parkable region identification (green frame) is displayed on the processing target region.

(Steps S110 and S111)

On the other hand, processing in steps S110 and S111 is executed in a case where the vacancy likelihood (vacancy possibility) of the processing target region calculated in step S106 is less than the threshold (Th), that is, less than 50%.

Specifically, in a case where the region other than the occlusion region (region that cannot be confirmed in captured image of camera), that is, the region that can be confirmed from the captured image of the camera is less than 50% of the total area of the parking section region (processing target region) where the parked vehicle cannot be confirmed, the processing in steps S110 and S111 is executed.

In this case, the data processing unit of the information processing device determines the processing target region as a possibility available region in step S110.

Moreover, in step S111, the display data for possibly available region identification (yellow frame) is displayed on the processing target region.

(Step S112)

In step S112, it is determined whether or not the processing on all the parking section regions has been completed.

In a case where there is an unprocessed parking section region, the procedure returns to step S102, and the processing in step S102 and the subsequent steps is executed on the unprocessed parking section region.

In a case where it is determined in step S112 that the processing on all the parking section regions has been completed, the processing is terminated.

Next, a specific example of the processing in steps S110 and S111 will be described with reference to FIGS. 13 and 14.

The vacancy likelihoods (vacancy possibility) of the parking section regions P2 and P5 illustrated in FIG. 13 are calculated according to (formula 1) described above, that is, vacancy likelihood (vacancy possibility)(%) = (Formula 1)

$$(1 - (\text{occlusion region area})/$$

$$(\text{total area of parking section region})) * 100(\%).$$

When calculation is made according to (formula 1) above,
the vacancy likelihood (vacancy possibility) of the parking section region P2=15%, and
the vacancy likelihood (vacancy possibility) of the parking section region P5=10%.

That is, in the parking section region P2, the region other than the occlusion region (region that cannot be confirmed in captured image of camera), that is, the region that can be confirmed from the captured image of the camera is 15% of the total area (d*w) of the parking section region P2.

Furthermore, in the parking section region P5, the region other than the occlusion region (region that cannot be confirmed in captured image of camera), that is, the region that can be confirmed from the captured image of the camera is 10% of the total area (d*w) of the parking section region P5.

Since both of the vacancy likelihoods (vacancy possibility) of the parking section regions P2 and P5=15% and 10% are less than the threshold (Th)=50%, the determination in step S107 is No.

This determination processing is illustrated as step S107 (No) in FIG. 14.

In this case, as illustrated in steps S110 and S111 in the lowermost stage of FIG. 14, each of the parking section regions P2 and P5 is determined as the possibly available region, and the display data for possibly available region identification (yellow frame) is displayed on the parking section regions P2 and P5.

On the other hand, a specific example of the processing in steps S108 and S109 executed in a case where the vacancy likelihood (vacancy possibility) of the processing target region calculated in step S106 is equal to or more than the threshold (Th), that is, equal to or more than 50% will be described with reference to FIGS. 15 and 16.

Figure 15:
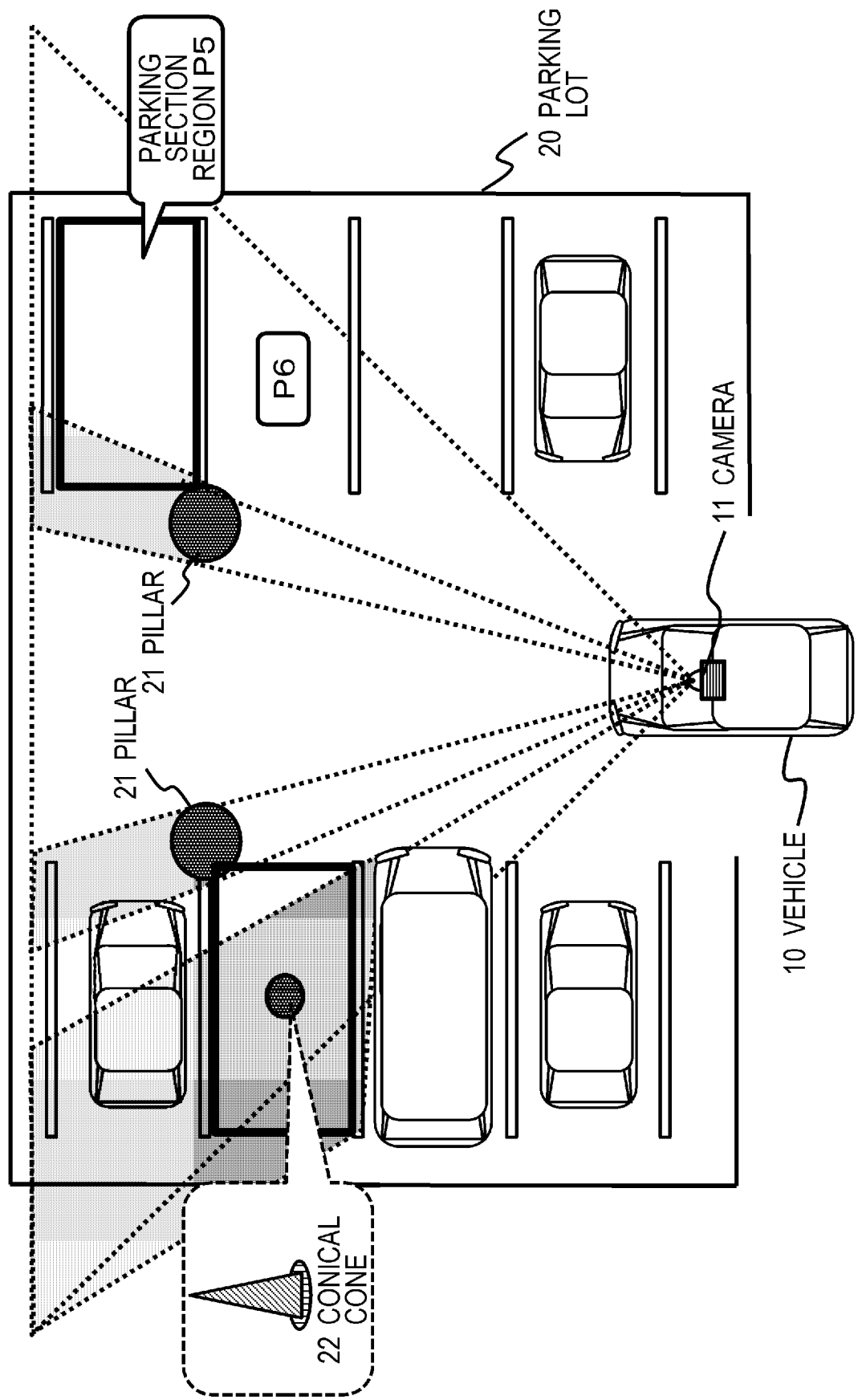
FIG. 15 is a diagram for explaining a specific example of the processing executed by the information processing device according to the present disclosure.

The parking section region P5 illustrated in FIG. 15 is a parking section region at the upper right end same as the parking section region described above with reference to FIG. 13. However, the parking section region P5 is in a state where the parked vehicle has left to the parking section region P6 on the front side thereof, and the region that can be confirmed from the camera 11 of the vehicle 10 increases.

In this state, the vacancy likelihood (vacancy possibility) of the parking section region P5 illustrated in FIG. 15 is calculated according to (formula 1) described above, that is, vacancy likelihood (vacancy possibility)(%) = (Formula 1)

{1 − (occlusion region area)/

(total area of parking section region)} * 100(%).

When calculation is made according to (formula 1) above, the vacancy likelihood (vacancy possibility) of the parking section region P5=90%.

Figure 16:
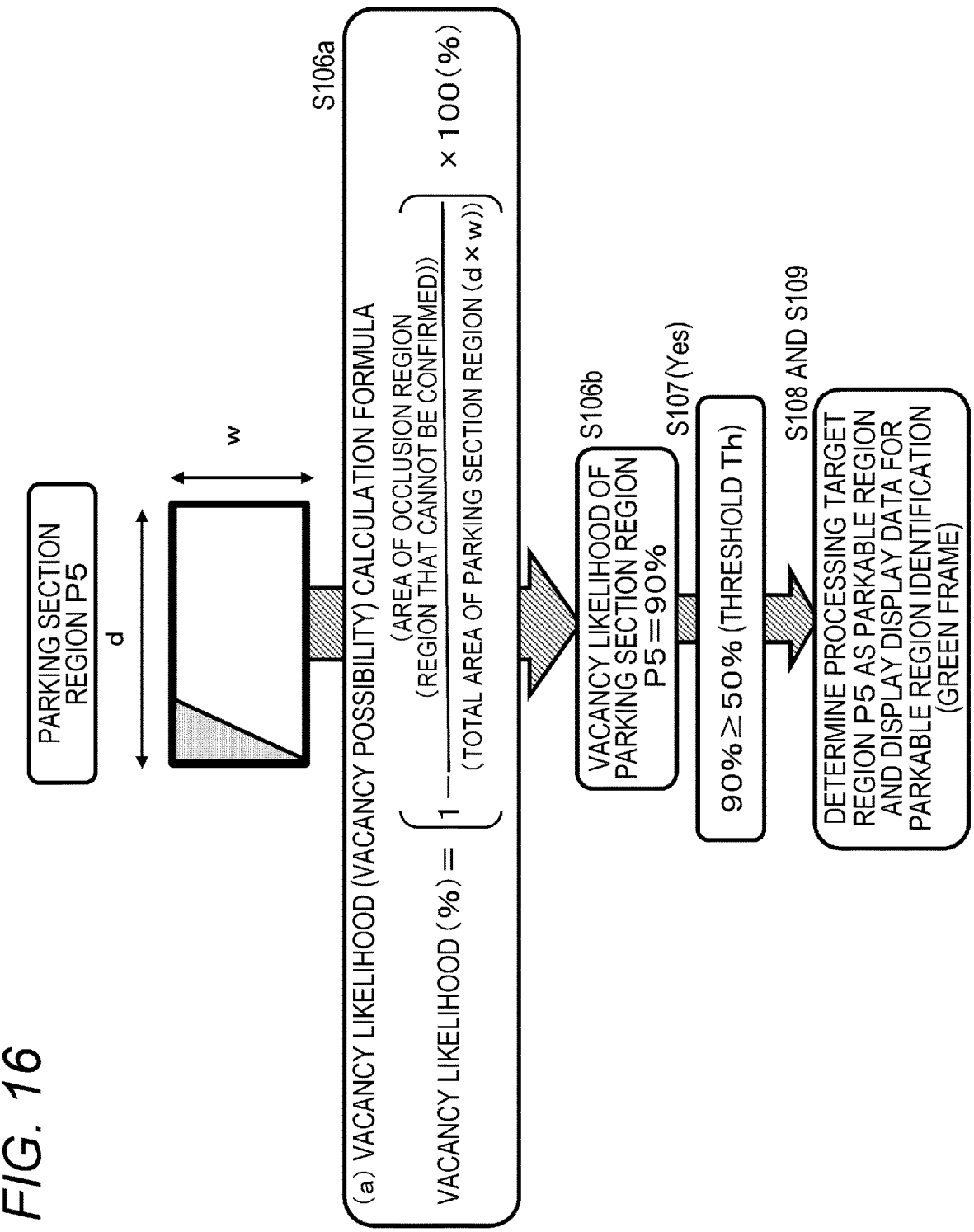
FIG. 16 is a diagram for explaining a specific example of the processing executed by the information processing device according to the present disclosure.

This vacancy likelihood (vacancy possibility) calculation processing is illustrated as steps S106a and S106b in FIG. 16.

That is, in the parking section region P5, the region other than the occlusion region (region that cannot be confirmed in captured image of camera), that is, the region that can be confirmed from the captured image of the camera is 90% of the total area (d*w) of the parking section region P5.

Since the vacancy likelihood (vacancy possibility) of the parking section region P5=90% is equal to or more than the threshold (Th)=50%, the determination in step S107 is Yes.

This determination processing is illustrated as step S107 (Yes) in FIG. 16.

In this case, as indicated in steps S108 and S109 in the lowermost stage of FIG. 16, the parking section region P5 is determined as the parkable region, and the display data for parkable region identification (green frame) is displayed on the parking section region P5.

In this way, the information processing device according to the present disclosure executes the processing according to the flowchart illustrated in FIG. 10 and executes the processing for displaying the following three types of parking possibility identification graphic data (color frame) on each parking section region.

(1) Display data for parkable region identification (green frame)
(2) Display data for unparkable region identification (red frame)
(3) Display data for possibly available region identification (yellow frame)

A specific example of processing for allocating the three types of parking possibility identification graphic data (color frame) described above will be described with reference to FIG. 17.

Figure 17:
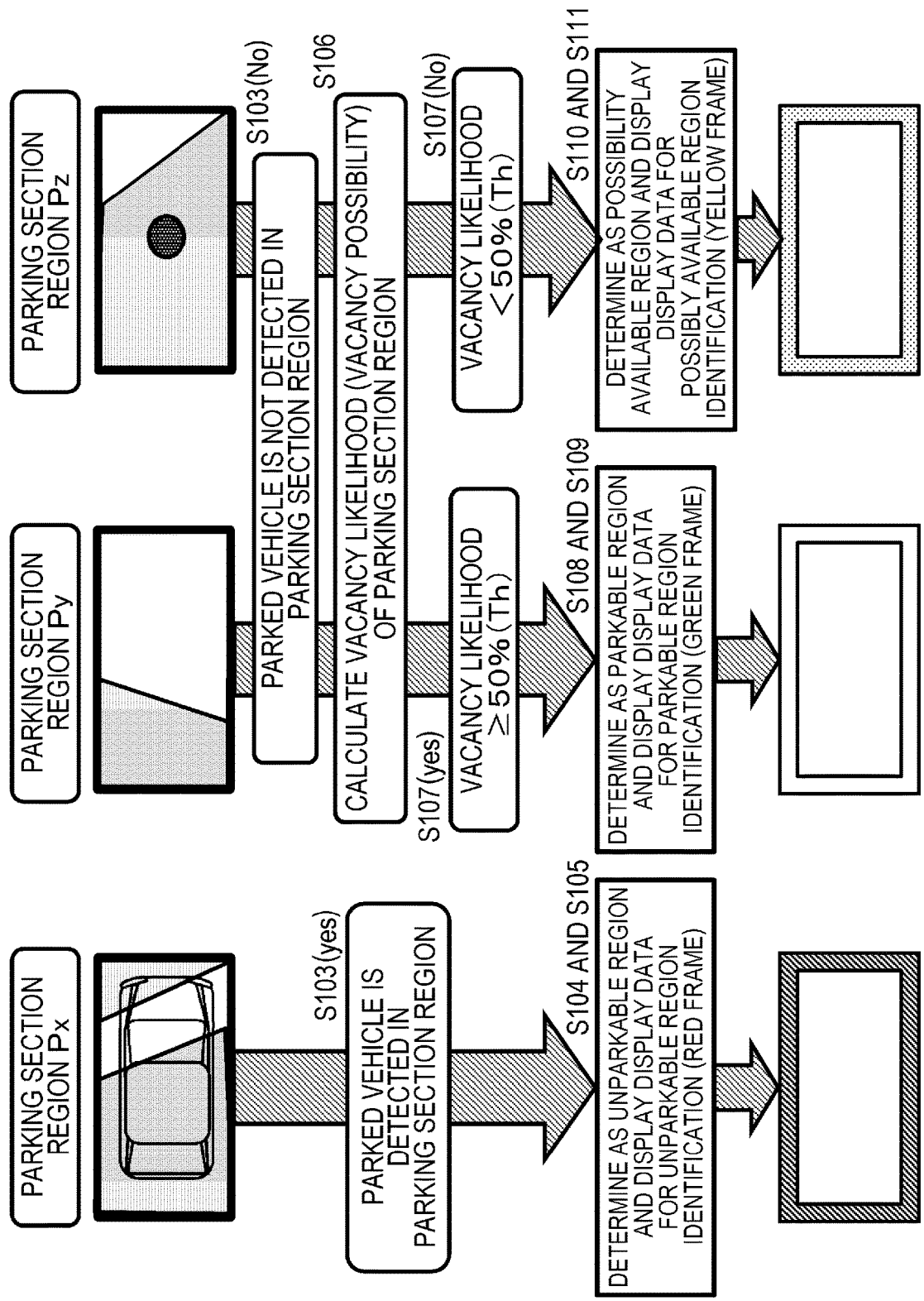
FIG. 17 is a diagram for explaining a specific example of the processing executed by the information processing device according to the present disclosure.

In FIG. 17, a specific sequence of the processing for allocating the parking possibility identification graphic data (color frame) on the three parking section regions below is illustrated from the left side.

Parking section region Px
Parking section region Py
Parking section region Pz

The parking section region Px is a parking section region where a parked vehicle is confirmed from the camera-captured image.

The parking section region Py is a parking section region where the parked vehicle is not confirmed from the camera-captured image and the vacancy likelihood (vacancy possibility) is equal to or more than the threshold.

The parking section region Pz is a parking section region where the parked vehicle is not confirmed from the camera-captured image and the vacancy likelihood (vacancy possibility) is less than the threshold.

Representative processing of each step in the flowchart in FIG. 10 described above is illustrated in FIG. 17.

As illustrated in FIG. 17, in the parking section region Px, the parked vehicle is confirmed from the camera-captured image, and determination of Yes is made in step S103.

In accordance with this determination, the parking section region Px is determined as the unparkable region in steps S104 and S105, and the processing for displaying the display data for unparkable region identification (red frame) is executed.

In the parking section region Py illustrated in the center of FIG. 17, the parked vehicle is not confirmed from the camera-captured image, and determination of No is made in step S103.

In accordance with this determination, regarding the parking section region Py, the processing for calculating the vacancy likelihood (vacancy possibility) is executed in step S106, and it is determined whether or not the calculated value is equal to or more than the threshold in step S107.

It is determined that the vacancy likelihood (vacancy possibility) of the parking section region Py is equal to or more than the threshold, and the determination result in step S107 becomes Yes.

In steps S108 and S109, the parking section region Py is determined as the parkable region, on the basis of this determination result, and the processing for displaying the display data for parkable region identification (green frame) is executed.

In the final parking section region Pz illustrated on the right end in FIG. 17, the parked vehicle is not confirmed from the camera-captured image, and the determination of No is made in step S103.

In accordance with this determination, regarding the parking section region Pz, the processing for calculating the vacancy likelihood (vacancy possibility) is executed in step S106, and it is determined whether or not the calculated value is equal to or more than the threshold in step S107.

It is determined that the vacancy likelihood (vacancy possibility) of the parking section region Pz is less than the threshold, and the determination result in step S107 becomes No.

In steps S110 and S111, the parking section region Pz is determined as the possibly available region, on the basis of the determination result, and the processing for displaying the display data for possibly available region identification (green frame) is executed.

As described above, the information processing device according to the present disclosure executes the processing for displaying the following three types of parking possibility identification graphic data (color frame) on each parking section region, according to the flowchart illustrated in FIG. 10.

(1) Display data for parkable region identification (green frame)
(2) Display data for unparkable region identification (red frame)
(3) Display data for possibly available region identification (yellow frame)

These color frames need to be displayed in accordance with a display position of each parking section region.

An example of a parameter needed for the processing for displaying the parking possibility identification graphic data (color frame) will be described with reference to FIG. 18 and the subsequent drawings.

Figure 18:
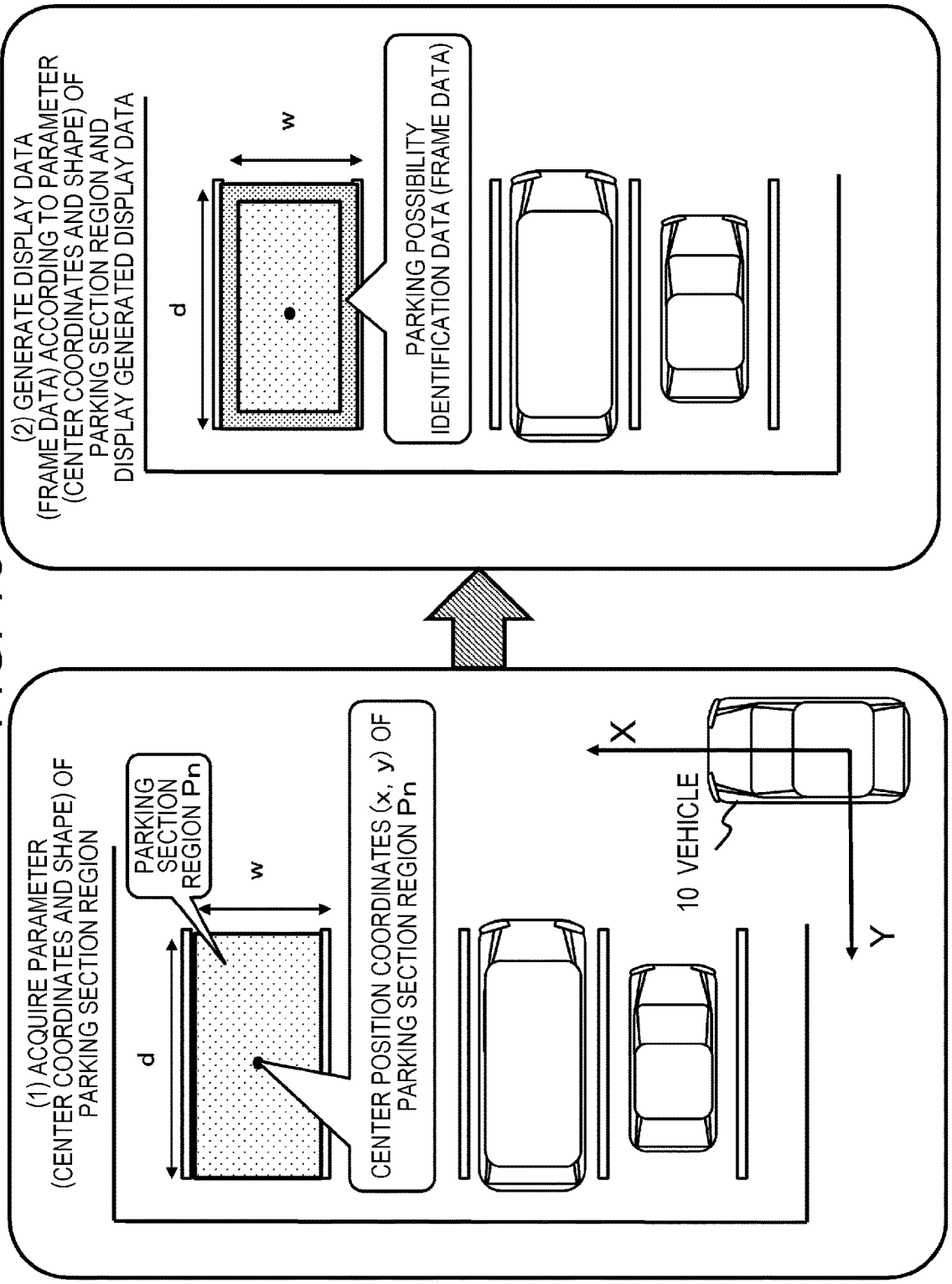
FIG. 18 is a diagram for explaining a specific example of the processing executed by the information processing device according to the present disclosure.

In FIG. 18(1), a processing example for acquiring the parameter needed for the processing for displaying the parking possibility identification graphic data (color frame) is illustrated.

The example illustrated in the drawing is a processing example for acquiring a parameter of the parking section region Pn at the uppermost stage.

As illustrated in the drawing, coordinates (x, y) of a center position of the parking section region Pn and a length (d) and a width (w) as shape data are acquired as the parameters for the processing for displaying the parking possibility identification graphic data (color frame).

Note that the origin of the XY coordinates is a fixed point in the vehicle 10, for example, a center position of a right and left rear wheel axis of the vehicle 10. The X axis is an axis in a traveling direction of the vehicle 10, and the Y axis is an axis in the leftward direction of the vehicle 10 perpendicular to the X axis. The XY coordinates having this setting are used.

The coordinates (x, y) of the center position of the parking section region Pn are acquired as position information on the XY coordinates.

The length (d) and the width (w) as the shape data are respectively a length of a side parallel to the Y axis (outline) and a length of a side parallel to the X axis (outline), among the sides (outline) forming the parking section region Pn.

First, these parameters are acquired.

Note that the setting of the XY coordinates is merely an example, and a configuration using other coordinates may be used.

In FIG. 18(2), a processing example for generating and displaying the parking possibility identification graphic data (color frame) using these parameters is illustrated.

In order to superimpose the parking possibility identification graphic data (color frame) on the image of the parking lot displayed on the display unit 12, a parking possibility identification graphic data generation unit generates the parking possibility identification graphic data (color frame) using the parameters acquired by the parameter acquisition processing illustrated in FIG. 18(1), that is, the coordinates (x, y) of the center position of the parking section region Pn and the length (d) and the width (w) as the shape data, and superimposes and displays the parking possibility identification graphic data (color frame) on the position of the parking section region Pn in the image of the parking lot displayed on the display unit 12.

Note that, although the example illustrated in FIG. 18 is an example in which the length (d) and the width (w) as the shape data of the parking section region are respectively configured as the side (outline) parallel to the Y axis and the side (outline) parallel to the X axis, setting of the parking section region is not limited to such setting.

Figure 19:
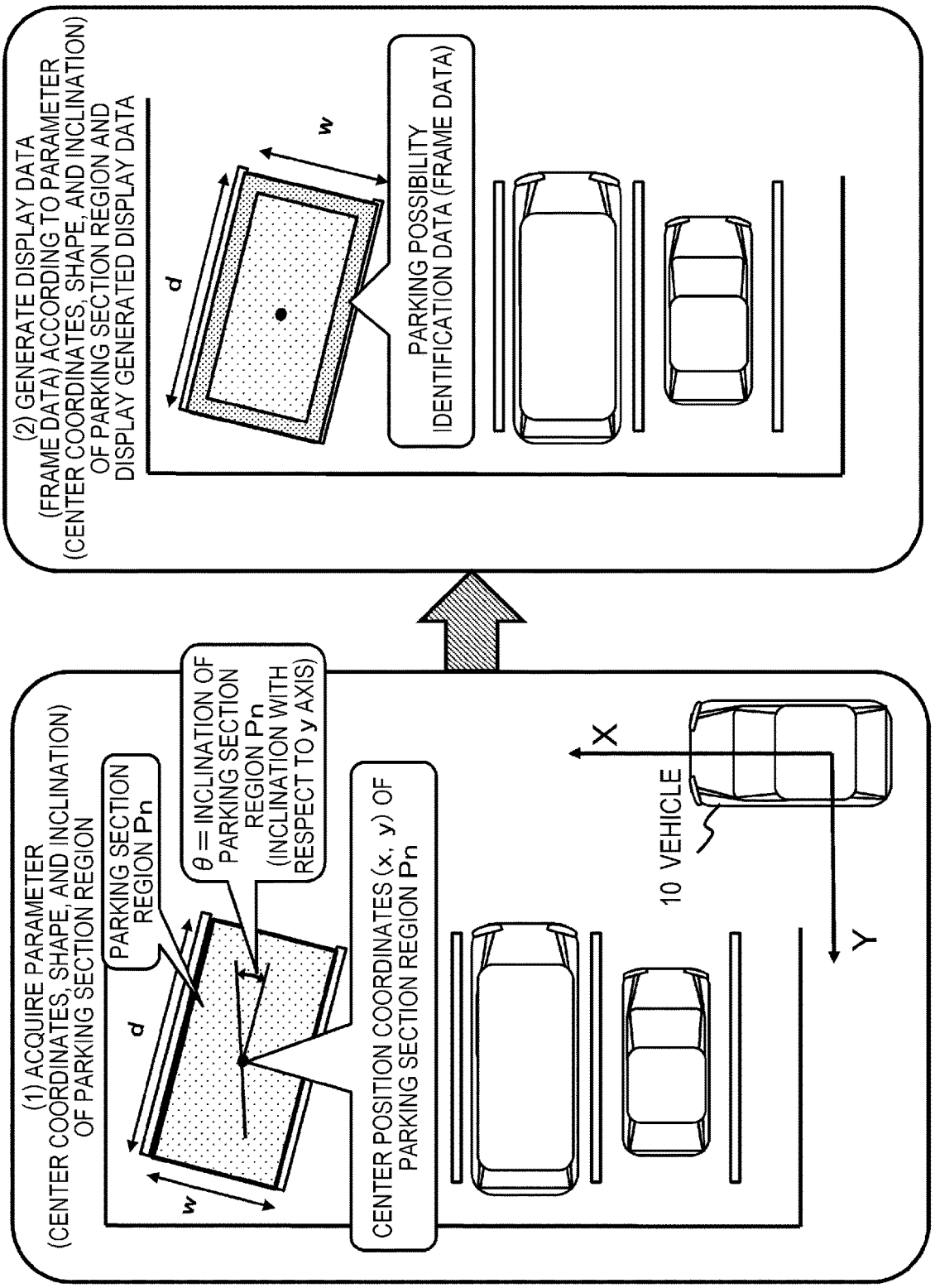
FIG. 19 is a diagram for explaining a specific example of the processing executed by the information processing device according to the present disclosure.

For example, as illustrated in FIG. 19, the length (d) and the width (w) of the parking section region may be inclined with respect to the XY axis.

In this case, as illustrated in FIG. 19(1), the coordinates (x, y) of the center position of the parking section region Pn, and the length (d) and the width (w) as the shape data, and an inclination ($\theta$) are acquired as the parameters for the processing for displaying the parking possibility identification graphic data (color frame).

The inclination ($\theta$) is an inclination with respect to the Y axis in the length direction of the parking section region Pn.

In FIG. 19(2), a processing example for generating and displaying the parking possibility identification graphic data (color frame) using these parameters is illustrated.

In order to superimpose the parking possibility identification graphic data (color frame) on the image of the parking lot displayed on the display unit 12, the parking possibility identification graphic data generation unit generates the parking possibility identification graphic data (color frame) using the parameters acquired according to the parameter acquisition processing illustrated in FIG. 19(1), that is, the coordinates (x, y) of the center position of the parking section region Pn, the length (d) and the width (w) as the shape data, and the inclination ($\theta$), and superimposes and displays the parking possibility identification graphic data (color frame) on the position of the parking section region Pn in the image of the parking lot displayed on the display unit 12.

Figure 20:
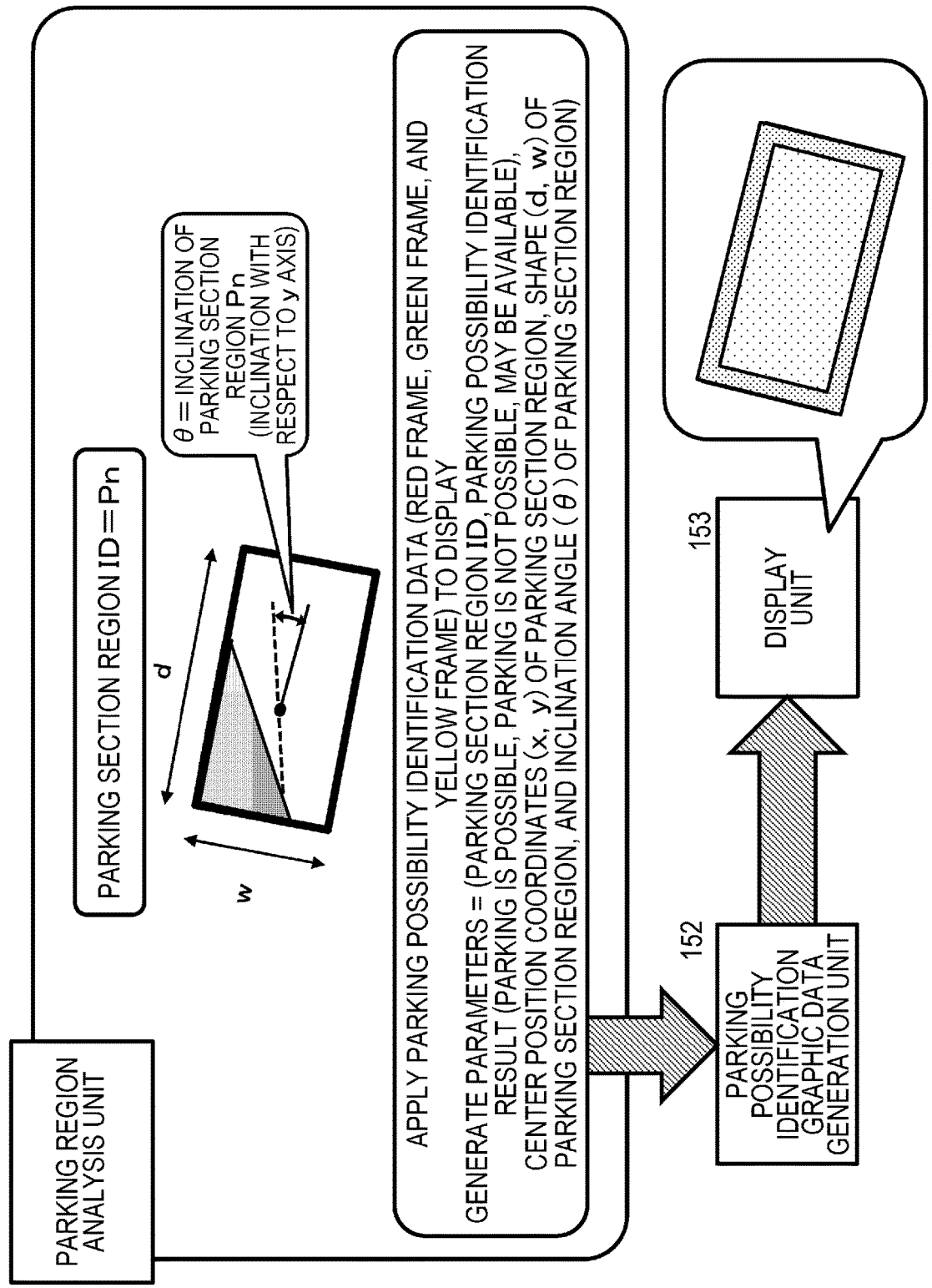
FIG. 20 is a diagram for explaining a specific example of the processing executed by the information processing device according to the present disclosure.

FIG. 20 is a diagram for explaining processing of a parking region analysis unit 151 that executes the processing for acquiring the parameter used to display the parking possibility identification graphic data (color frame) and processing of a parking possibility identification graphic data generation unit 152 that executes the processing for displaying the parking possibility identification graphic data (color frame) using the acquired parameter.

As illustrated in FIG. 20, the parking region analysis unit 151 executes the processing for acquiring the parameter used to display the parking possibility identification graphic data (color frame).

The parking region analysis unit 151 executes the processing according to the flowchart described with reference to FIG. 10 above and determines which one of (1) Parkable region
(2) Unparkable region
(3) Possibly available region
the parking section region is.

The parking region analysis unit 151 further executes the processing for acquiring the parameter used to display the parking possibility identification graphic data (color frame).

The parameter is a parameter including the following data.

(a) Parking section region ID,
(b) Parking possibility identification result (parking is possible, parking is not possible, possibly available),
(c) Center position coordinates (x, y) of parking section region,
(d) Shape (d, w) of parking section region,
(e) Inclination angle (θ) of parking section region, These parameters are output from the parking region analysis unit 151 to the parking possibility identification graphic data generation unit 152.

The parking possibility identification graphic data generation unit 152 generates the parking possibility identification graphic data (color frame), using the parameters (a) to (e) described above.

Moreover, the parking possibility identification graphic data generation unit 152 superimposes and displays the generated parking possibility identification graphic data (color frame) on a position of a single parking section region in an image of a parking lot displayed on a display unit 153.

In this way, on the display unit, an image in which any one of the following parking possibility (1) Display data for parkable region identification (green frame)
(2) Display data for unparkable region identification (red frame)
(3) Display data for possibly available region identification (yellow frame)

is superimposed on each parking section region is displayed.

The user (driver) can immediately determine whether each parking region is a parkable region, an unparkable region, or a possibly available region, on the basis of the parking possibility identification graphic data (color frame) superimposed and displayed on each parking section region.

4. (Second Embodiment) Regarding Processing Example in a Case of Parallel Parking of which Parking Section Region is not Defined Next, a processing example in a case of parallel parking of which the parking section region is not defined will be described as a second embodiment.

The embodiment (first embodiment) described above is a processing example in a case where parking processing is executed in the parking lot in which the vehicles perform double parking for parking the vehicles side by side and the parking lot in which each parking region is clearly divided by a white line or the like.

That is, in the first embodiment described above, processing has been executed for determining whether or not each parking section region of the parking lot in which each parking region is clearly divided by the white line or the like is any one of (1) Parkable region
(2) Unparkable region
(3) Possibly available region.

However, for example, on a road where parallel parking in a line on a side end of the road is possible or the like, there are many cases where there is no white line that defines an individual parking region, or the like. A vehicle traveling on the road often executes processing for finding a vacant space for one vehicle where a host vehicle can park to park the vehicle.

In the second embodiment described below, in this way, in a case of a parkable region with no white line or the like that defines the individual parking region, processing for dividing the parkable region on the basis of a vehicle that has already parked or the like is executed. Moreover, this is an embodiment for executing processing for determining which one of (1) Parkable region
(2) Unparkable region
(3) Possibly available region.

each of the generated section regions is.

Details of the second embodiment will be described with reference to FIG. 21 and the subsequent drawings.

Figure 21:
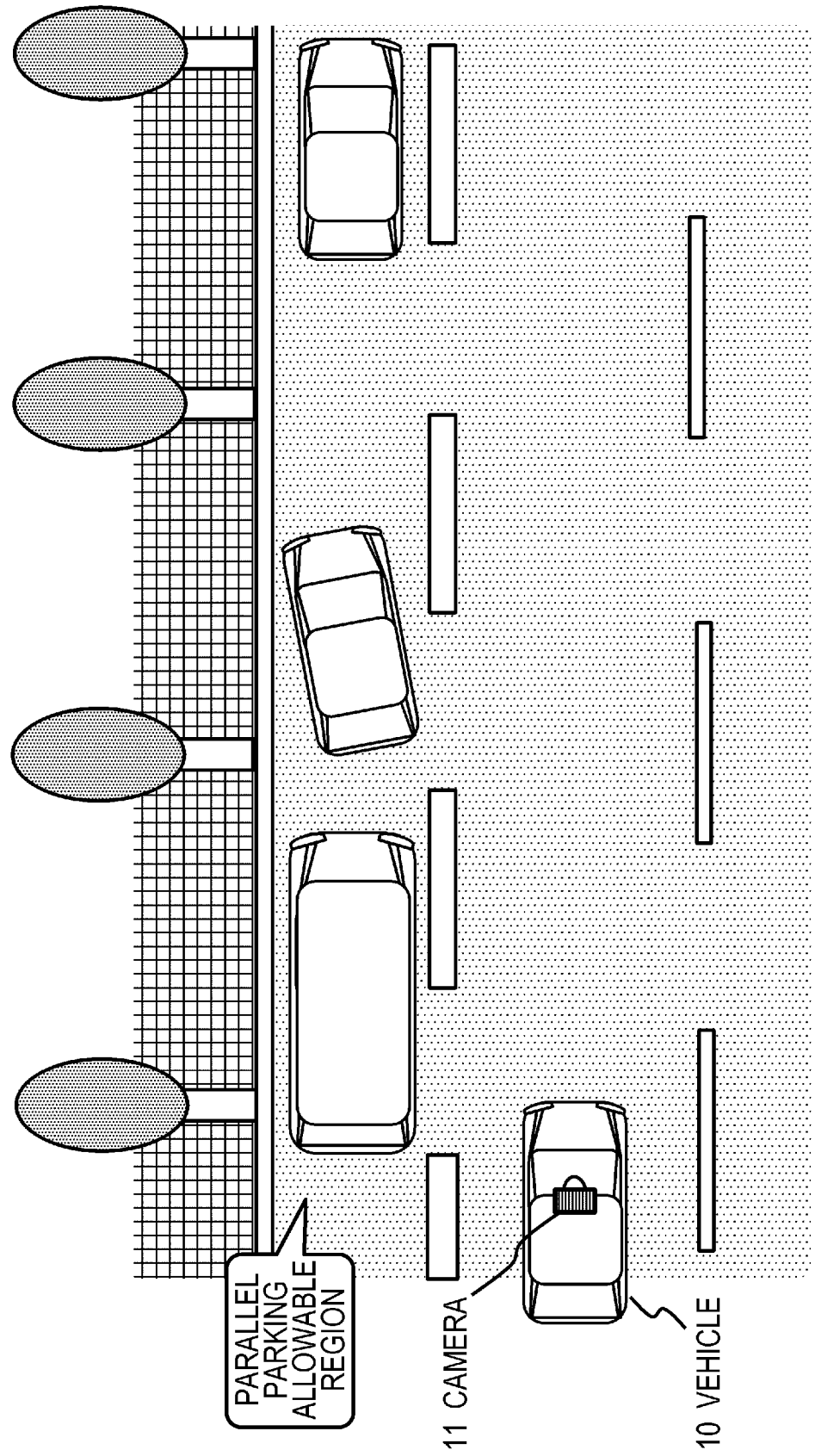
FIG. 21 is a diagram for explaining a specific example of a parking region where parallel parking can be performed and a vehicle to be parked.

FIG. 21 is a diagram illustrating a state where a vehicle 10 traveling on a road is about to park anywhere in a parallel parking zone provided on the left side of the road.

Figure 22:
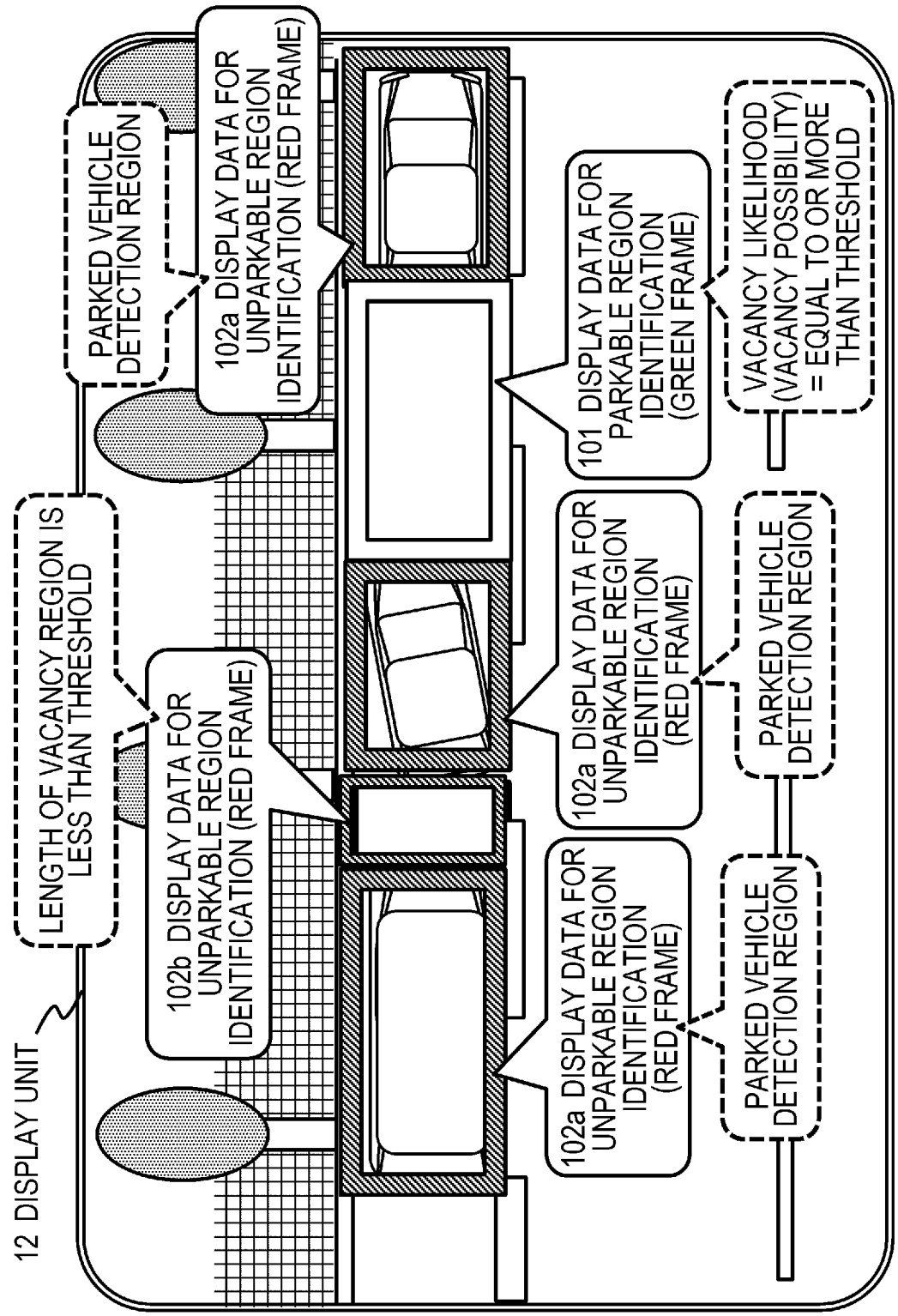
FIG. 22 is a diagram for explaining a specific example of the display data generated by the information processing device according to the present disclosure.

In the second embodiment, display data as illustrated in FIG. 22 is displayed on a display unit 12 in the vehicle 10 in such a case.

The display data illustrated in FIG. 22 is display data in which any one of three types of parking possibility identification graphic data (color frame) is superimposed and displayed on a parallel parking region imaged in a captured image of the camera 11 of the vehicle 10.

There are the following three types of parking possibility identification graphic data (color frame) to be superimposed and displayed.

(1) Display data for parkable region identification (green frame) 101
(2) Display data for unparkable region identification (red frame) 102
(3) Display data for possibly available region identification (yellow frame) 103

Note that the colors of green, red, and yellow are merely examples, and a color combination other than these may be used.

Note that, in FIG. 22, "(3) Display data for possibly available region identification (yellow frame) 103" is not illustrated.

Display conditions of the parking possibility identification graphic data (color frame) (1) to (3) described above are as follows.

"(1) The display data for parkable region identification (green frame) 101" is superimposed and displayed on a region in which a parked vehicle is not detected as an analysis result of the captured image by the camera 11 mounted on the vehicle 10 and a vacancy likelihood (vacancy possibility) is equal to or more than a prescribed threshold.

"(2) The display data for unparkable region identification (red frame) 102" is superimposed and displayed on a region in which the parked vehicle is detected as the analysis result of the captured image by the camera 11 mounted on the vehicle 10 or a region of which a length of a vacant region is insufficient for parking the vehicle.

Display data for unparkable region identification 102a illustrated in FIG. 22 is the region where the parked vehicle is detected, and display data for unparkable region identification 102b illustrated in FIG. 22 is the region of which the length of the vacant region is insufficient for parking the vehicle.

"(3) The display data for possibly available region identification (yellow frame) 103" is superimposed and displayed on a parking section region in which the parked vehicle is not detected as the analysis result of the captured image by the camera 11 mounted on the vehicle 10, the length of the vacant region is insufficient for parking the vehicle, and the vacancy likelihood (vacancy possibility) is less than the prescribed threshold.

The vacancy likelihood (vacancy possibility) is an index value indicating a possibility that a parking section region is vacant and parking is possible.

In the second embodiment, the following parking possibility identification graphic data (color frame) is displayed, according to the display conditions described above.

(1) Display data for parkable region identification (green frame) 101
(2) Display data for unparkable region identification (red frame) 102
(3) Display data for possibly available region identification (yellow frame) 103

A processing sequence according to the second embodiment will be described with reference to the flowcharts illustrated in FIGS. 23 and 24.

Figure 24:
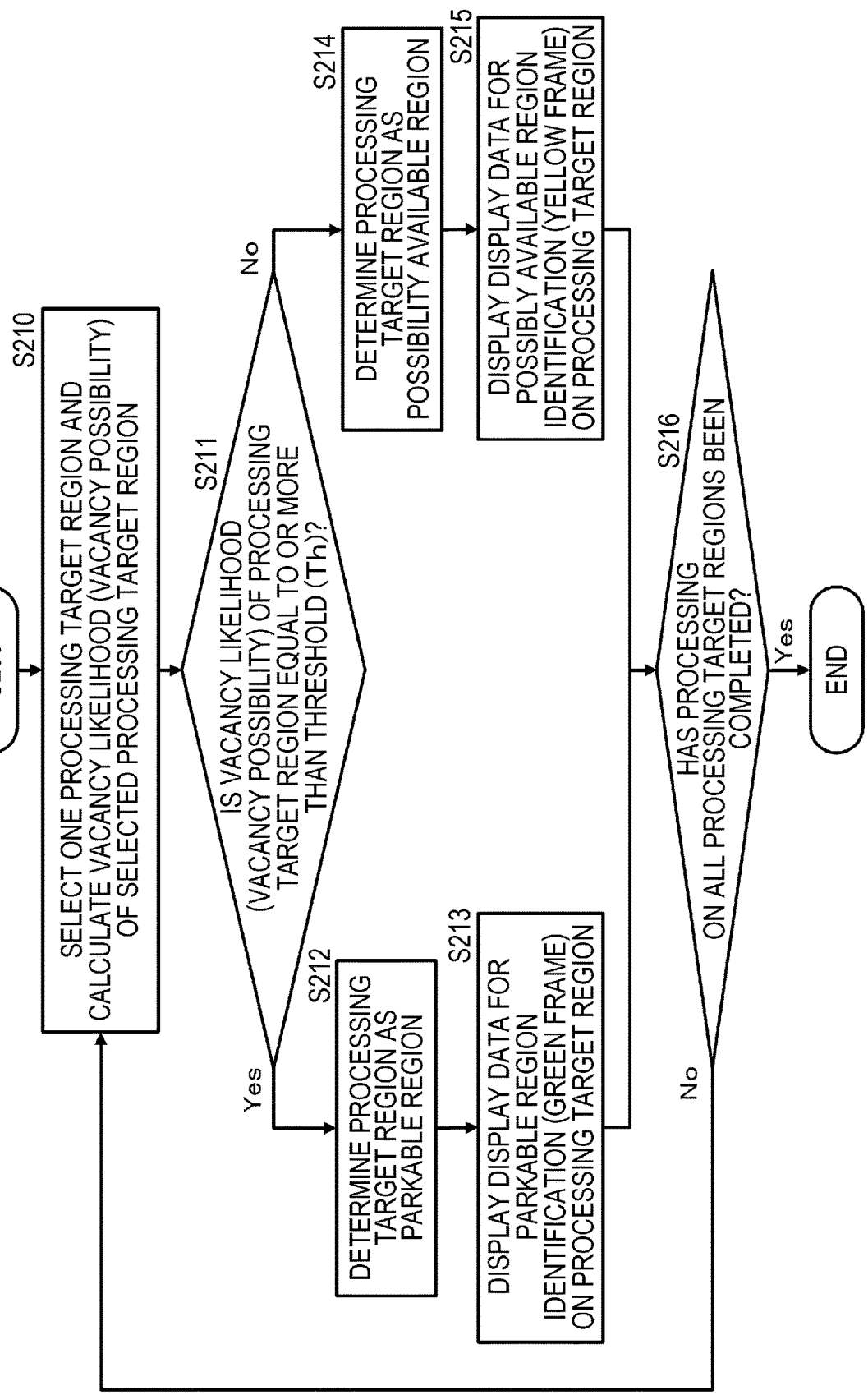
FIG. 24 is a diagram illustrating a flowchart for explaining the processing sequence of the processing executed by the information processing device according to the present disclosure.

Note that the flowcharts illustrated in FIGS. 23 and 24 are executed under control of a data processing unit of an information processing device according to the present disclosure. The information processing device according to the present disclosure includes, for example, the data processing unit that has a program execution function such as a CPU, and the data processing unit executes processing according to a flow illustrated in FIG. 10, in accordance with a program stored in a storage unit in the information processing device.

Hereinafter, processing in each step of the flowcharts illustrated in FIGS. 23 and 24 will be described.

(Step S201)

First, the data processing unit of the information processing device mounted on the vehicle 10 detects a parking allowable region, for example, a parallel parking allowable region on a road side, on the basis of sensor detection information such as a captured image of a camera, the sensor detection information and AI prediction data, or input information from outside, in step S201.

The captured image of the camera is, for example, a captured image of the camera 11 that captures an image on the front of the vehicle 10 described above with reference to FIG. 21 or captured images of all of the following four cameras (a) a forward camera 11F that captures an image on the front side of the vehicle 10,
(b) a backward camera 11B that captures an image on the rear side of the vehicle 10,
(c) a leftward camera 11L that captures an image on the left side of the vehicle 10, and
(d) a rightward camera 11R that captures an image on the right side of the vehicle 10 described above with reference to FIG. 6,
or a plurality of cameras, or a combined image (bird's-eye view) generated on the basis of the plurality of captured images.

In step S201, the parking allowable region is detected from at least one or more camera-captured images.

Alternatively, the parking allowable region may be estimated using not only the camera-captured image but also the AI prediction data.

For example, the processing for estimating the parking allowable region may be executed by using an AI predictor generated by a learning algorithm using a convolutional neural network (CNN), which is a convolutional neural network, and determining a parking allowable region in a region that is not clearly imaged by the camera.

Alternatively, the processing for detecting the parking allowable region may be executed using the input information from outside, for example, parking lot information provided from a parking lot information providing server.

In this way, in step S101, the parking allowable region is detected, on the basis of the sensor detection information such as the captured image of the camera, the sensor detection information and the AI prediction data, or the input information from outside.

(Step S202)

Next, in step S202, the data processing unit of the information processing device mounted on the vehicle 10 sets the parking allowable region detected in step S201, for example, the parallel parking allowable region, as a region of interest (ROI) to be analyzed.

Figure 25:
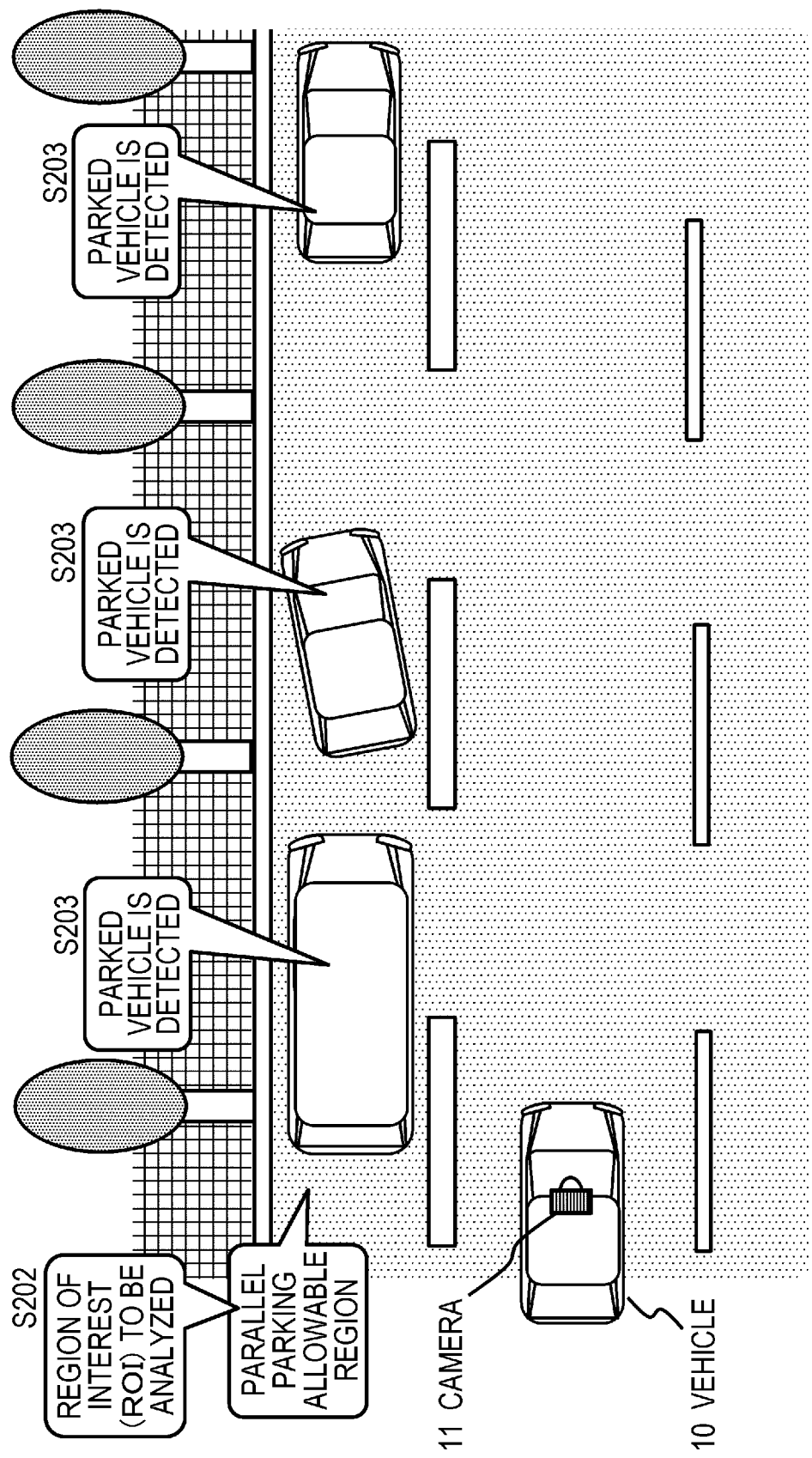
FIG. 25 is a diagram for explaining a specific example of the processing executed by the information processing device according to the present disclosure.

A specific example will be described with reference to FIG. 25. For example, as indicated in step S202 in FIG. 25, the parallel parking allowable region is set as the region of interest (ROI) to be analyzed.

(Step S203)

Next, in step S203, the data processing unit of the information processing device detects a parked vehicle in the region of interest (ROI).

A specific example will be described with reference to FIG. 25. For example, as indicated in step S203 in FIG. 25, a parked vehicle in the parallel parking allowable region that is the region of interest (ROI) is detected.

(Step S204)

Next, in step S204, the data processing unit of the information processing device determines a region where the parked vehicle is detected in the region of interest (ROI) as an unparkable region.

(Step S205)

Next, the data processing unit of the information processing device displays the display data for unparkable region identification (red frame) for the region where the parked vehicle exists, that is determined as the unparkable region in step S204.

Figure 26:
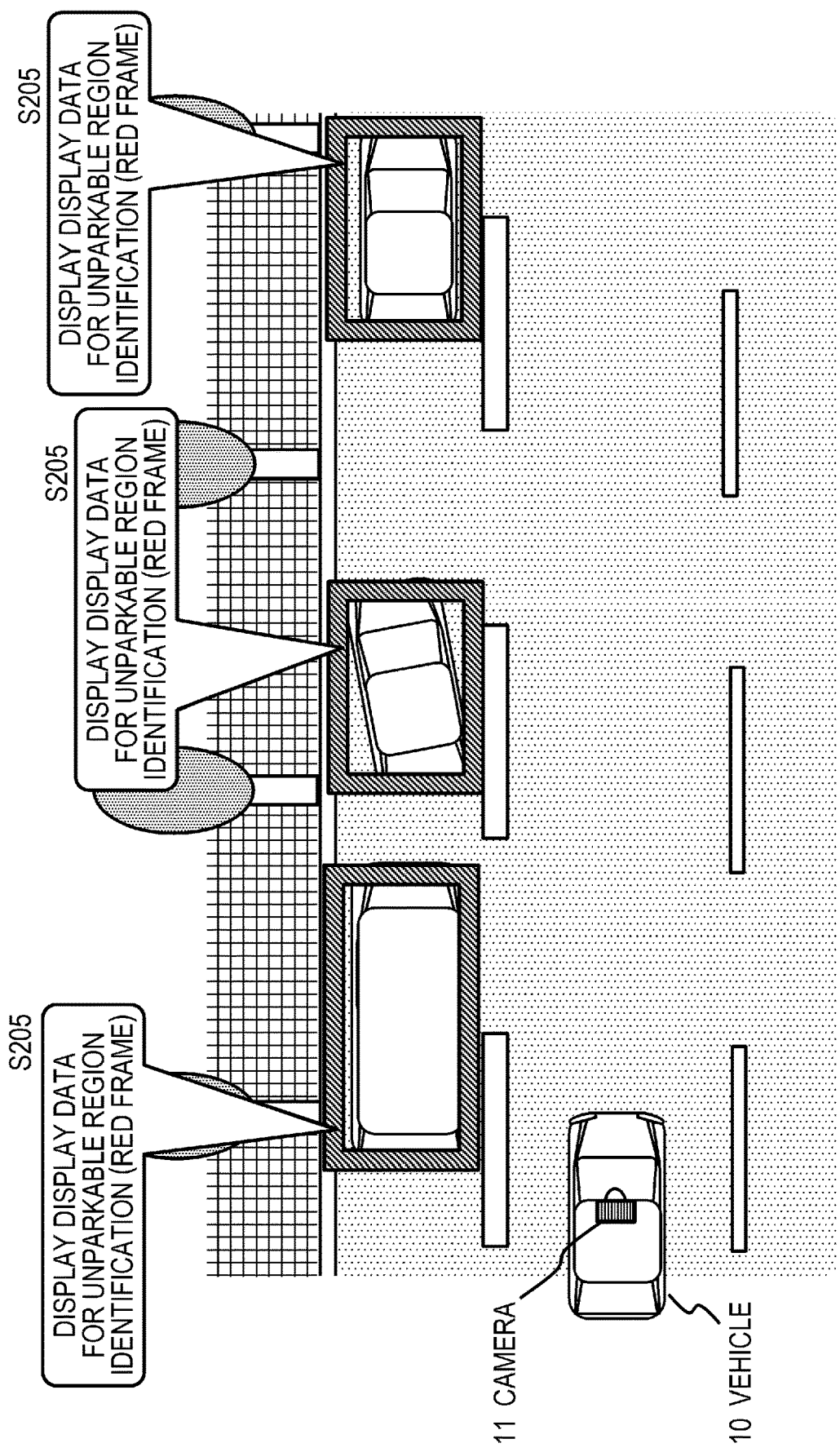
FIG. 26 is a diagram for explaining a specific example of the processing executed by the information processing device according to the present disclosure.

A specific example will be described with reference to FIG. 26. For example, as indicated in step S205 in FIG. 26, the display data for unparkable region identification (red frame) is displayed on the region where the parked vehicle is detected in the parallel parking allowable region that is the region of interest (ROI).

(Step S206)

Next, in step S206, the data processing unit of the information processing device sets a vacant region identifier (vacant region ID) to each vacant region (section region) between parked vehicles.

Figure 27:
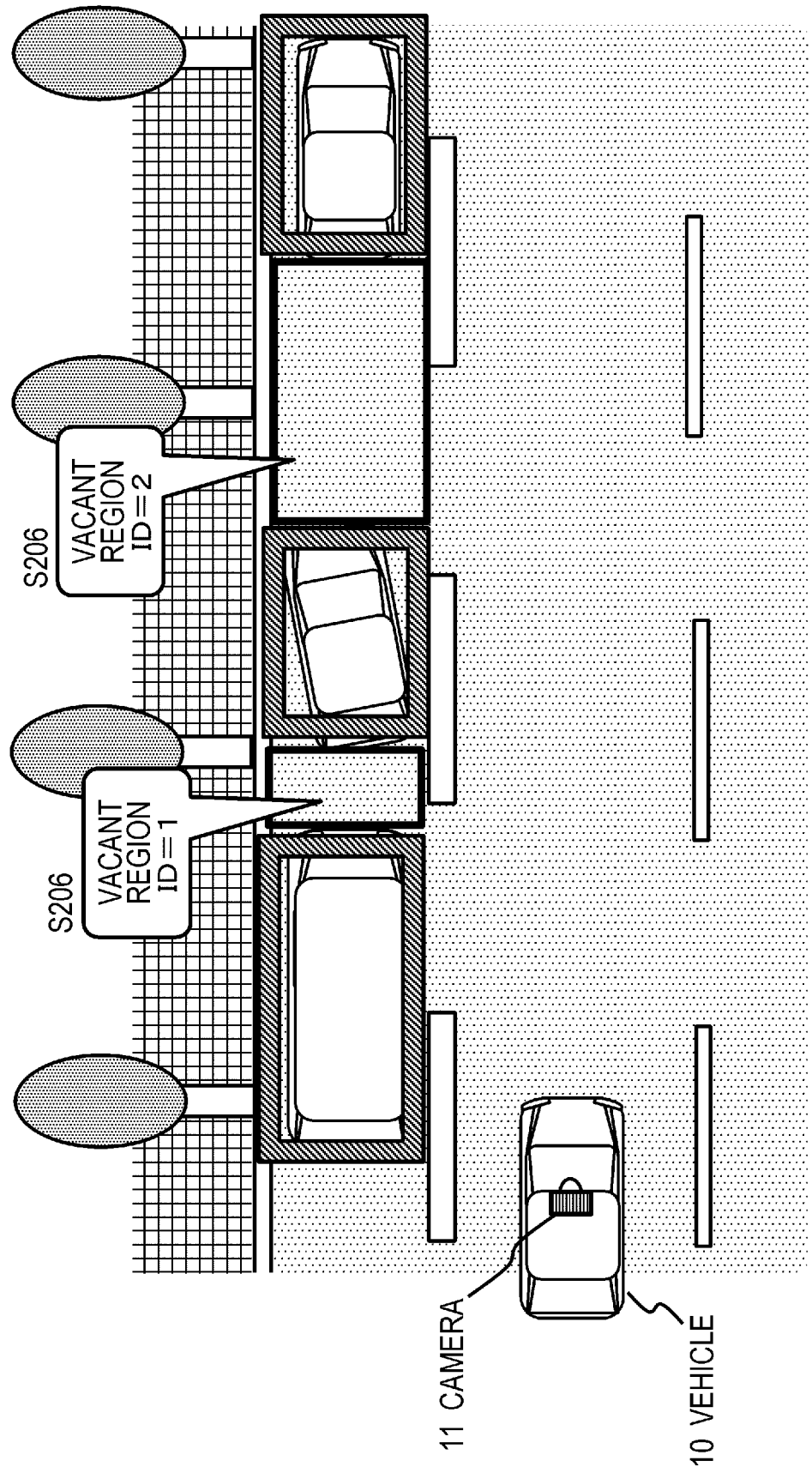
FIG. 27 is a diagram for explaining a specific example of the processing executed by the information processing device according to the present disclosure.

A specific example will be described with reference to FIG. 27. For example, as indicated in step S206 in FIG. 27, vacant region IDs=1, 2, . . . are set as the vacant region identifiers (vacant region ID) of the respective vacant regions between the parked vehicles.

(Step S207)

Next, in step S207, the data processing unit of the information processing device selects a vacant region of which a length (interval between parked vehicles on front and rear side of vacant region) is less than a threshold (vehicle parkable length) from among the vacant regions to which the vacant region identifiers (vacant region ID) are set and determines the selected region as the unparkable region.

Figure 28:
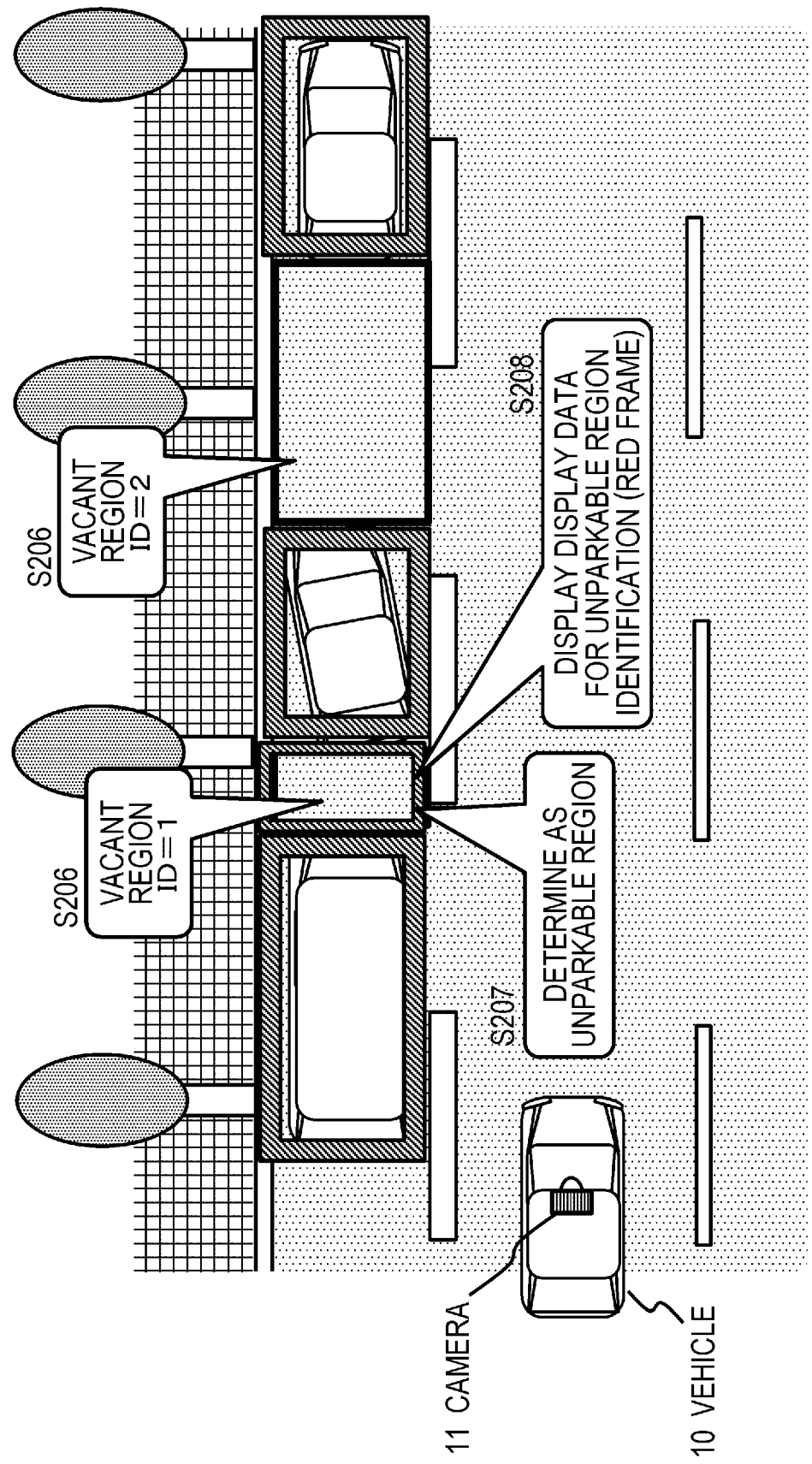
FIG. 28 is a diagram for explaining a specific example of the processing executed by the information processing device according to the present disclosure.

A specific example will be described with reference to FIG. 28. For example, as indicated in step S207 in FIG. 28, it is determined that the vacant region with the vacant region ID=1 as the vacant region of which the length of the vacant region (interval between parked vehicles before and after vacant region) is less than the threshold (vehicle parkable length), and this vacant region is determined as the unparkable region.

(Step S208)

Next, in step S208, the data processing unit of the information processing device displays the display data for unparkable region identification (red frame) on the region of which the length of the vacant region (interval between preceding and following parked vehicles) is less than the threshold (vehicle parkable length).

A specific example will be described with reference to FIG. 28. For example, as indicated in step S208 in FIG. 28, the display data for unparkable region identification (red frame) is displayed on the vacant region with the vacant region ID=1, determined as the vacant region of which the length of the vacant region (interval between parked vehicles before and after vacant region) is less than the threshold (vehicle parkable length).

(Step S209)

Next, in step S209, the data processing unit of the information processing device determines a vacant region of which the length of the vacant region (interval between preceding and following parked vehicles) is equal to or more than the threshold (vehicle parkable length) as a "processing target region", from among the vacant regions to which the identifiers (vacant region ID) are set.

A specific example will be described with reference to FIG. 29. For example, as indicated in step S209 in FIG. 29, a vacant region with the vacant region ID=2 that is a vacant region of which the length of the vacant region (interval between parked vehicles before and after vacant region) is equal to or more than the threshold (vehicle parkable length) is determined as the "processing target region".

(Step S210)

Next, in step S210, the data processing unit of the information processing device executes processing for calculating a vacancy likelihood (vacancy possibility) of the processing target region.

As described above, the vacancy likelihood (vacancy possibility) is an index value indicating a possibility that a parking region is vacant.

A specific example of the processing for calculating the vacancy likelihood (vacancy possibility) executed by the data processing unit of the information processing device according to the present disclosure will be described with reference to FIGS. 29 and 30.

The processing for calculating the vacancy likelihood (vacancy possibility) in step S210 is processing executed on the vacant region in which the parked vehicle is not detected in the processing target region and which is determined as the vacant region of which the length of the vacant region (interval between parked vehicles before and after vacant region) is equal to or more than the threshold (vehicle parkable length).

Figure 29:
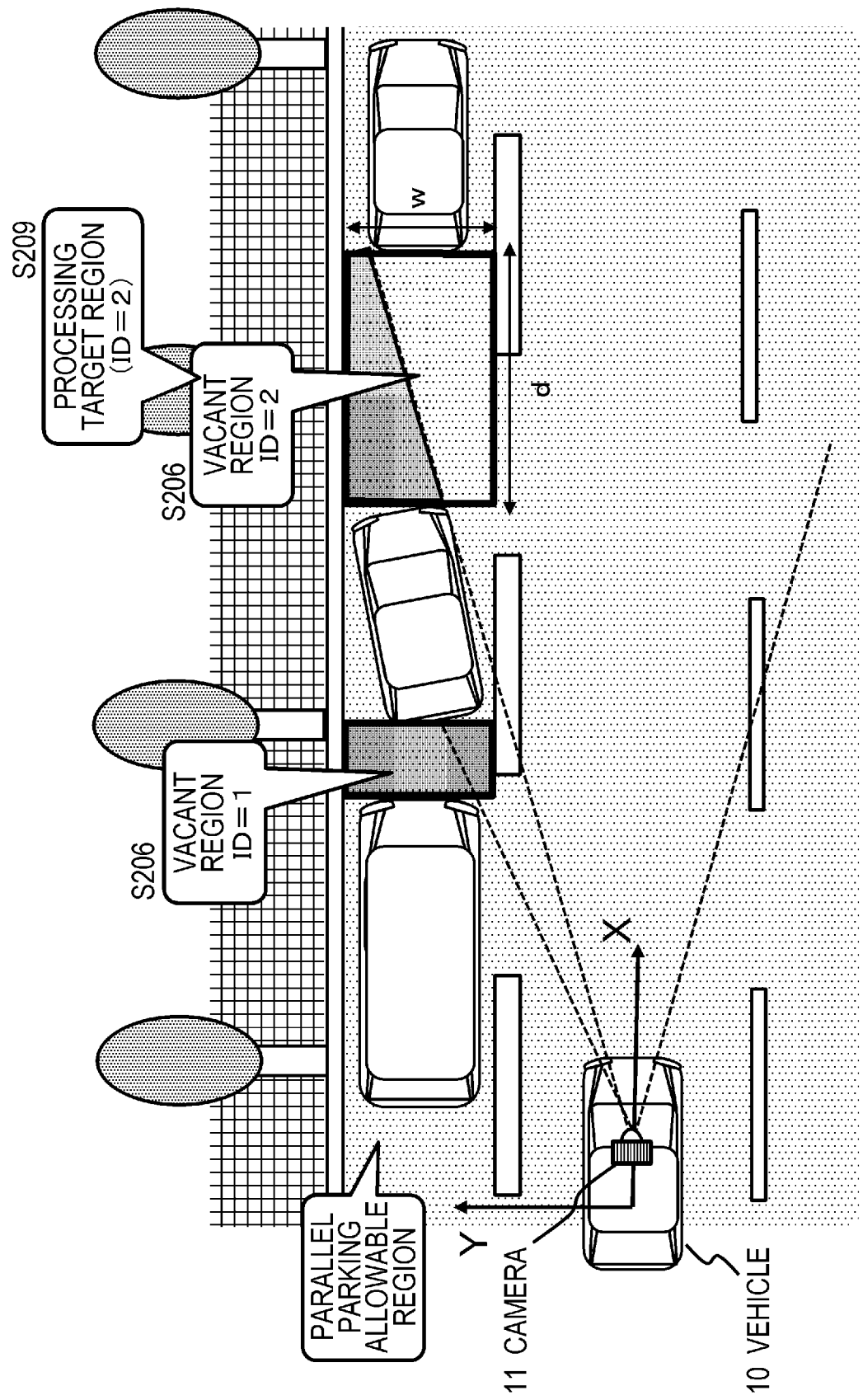
FIG. 29 is a diagram for explaining a specific example of the processing executed by the information processing device according to the present disclosure.

Specifically, for example, on the vacant region with the vacant region ID=2 illustrated in FIG. 29, the processing for calculating the vacancy likelihood (vacancy possibility) is executed.

As illustrated in FIG. 29, the vacant region with the vacant region ID=2 illustrated in FIG. 29 is a vacant region where the parked vehicle is not detected by the camera 11 of the vehicle 10, and is a vacant region determined as the vacant region of which the length of the vacant region (interval between parked vehicles before and after vacant region) is equal to or more than the threshold (vehicle parkable length).

Specific calculation processing of the processing for calculating the vacancy likelihood (vacancy possibility) of the vacant region with the vacant region ID=2 will be described with reference to FIG. 30.

Figure 30:
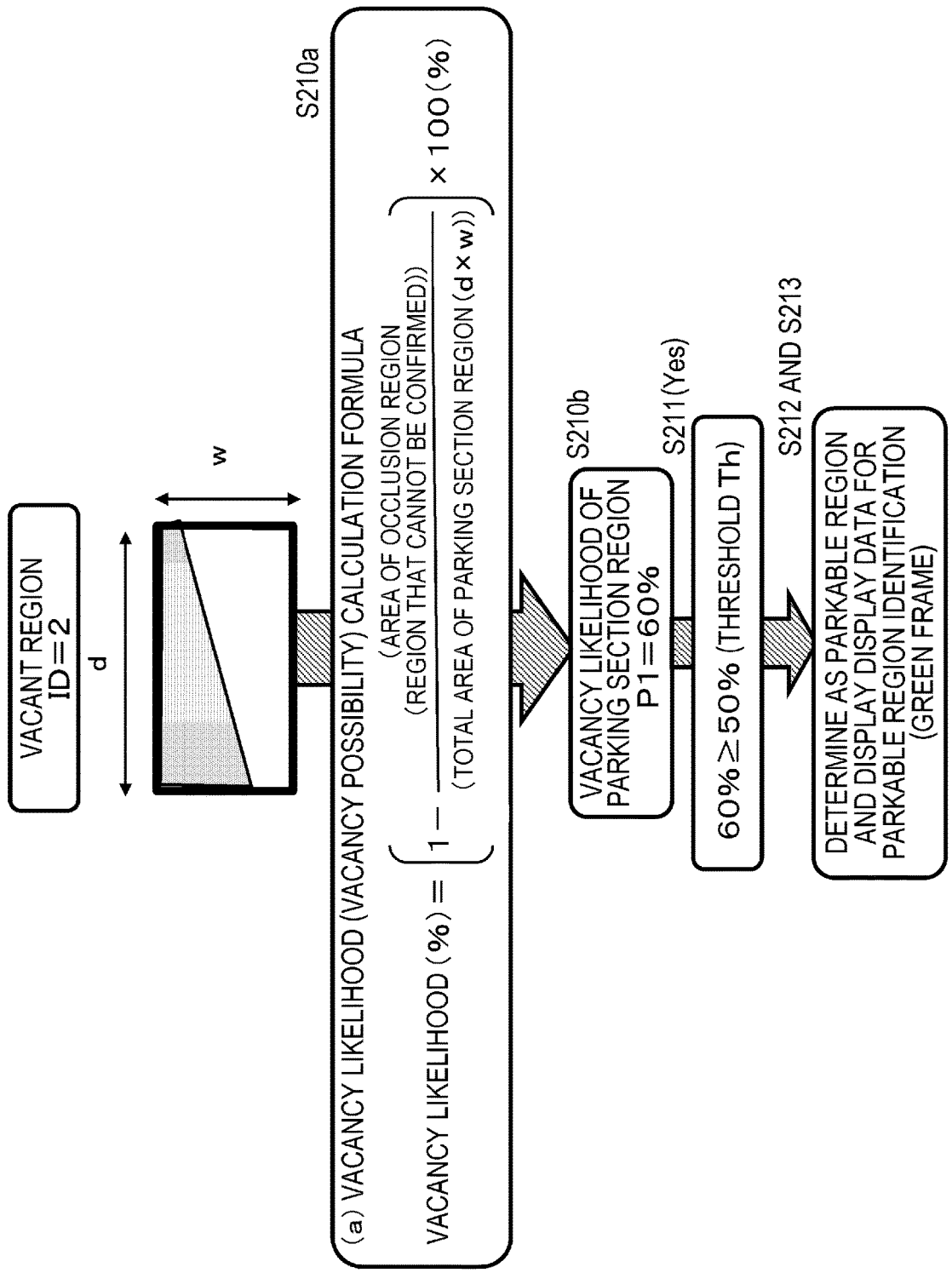
FIG. 30 is a diagram for explaining a specific example of the processing executed by the information processing device according to the present disclosure.

Step S210a in FIG. 30 is (a) vacancy likelihood (vacancy possibility) calculation formula described above.

As in the first embodiment described above, the vacancy likelihood (vacancy possibility) of each vacant region is calculated according to the following (formula 1).

$$\text{Vacancy likelihood (vacancy possibility)}(\%) = \\ \{1 - (\text{occlusion region area})/ \\ (\text{total area of parking section region})\} * 100(\%) \quad \text{(Formula 1)}$$

Note that the occlusion region is a region that cannot be confirmed in the captured image of the camera. For example, the occlusion region is a region that is not included in the captured image of the camera and is hidden by an obstacle such as a shaded portion of a forward vehicle or a pillar. A gray region with the vacant region ID=2 illustrated in FIG. 29 is the occlusion region, and a white portion is the confirmable region that is imaged by the camera.

The total area of the parking section region is a multiplication value of a length (d) in the front-back direction and a width (w) of a parking section: d*w.

When the vacancy likelihood (vacancy possibility) with the vacant region ID=2 is calculated according to the above (formula 1), as indicated in step S210b in FIG. 30, the vacancy likelihood (vacancy possibility) with the vacant region ID=2=60%.

(Step S211)

When the processing for calculating the vacancy likelihood (vacancy possibility) of the processing target region is completed in step S210, next, the data processing unit of the information processing device, in step S211, compares the calculated vacancy likelihood (vacancy possibility) and a predetermined threshold (Th) and determines whether or not the calculated vacancy likelihood is equal to or more than the threshold (Th).

Here, the threshold is set to 50%.

Note that the threshold=50% is an example, and the value of the threshold can be variously set.

If the calculated vacancy likelihood (vacancy possibility) is equal to or more than the threshold (Th), that is, equal to or more than 50%, the procedure proceeds to step S212.

On the other hand, if the calculated vacancy likelihood (vacancy possibility) is less than the threshold (Th), that is, less than 50%, the procedure proceeds to step S214.

(Steps S212 and S213)

Processing in steps S212 and S213 is executed in a case where the vacancy likelihood (vacancy possibility) of the processing target region calculated in step S210 is equal to or more than the threshold (Th), that is, equal to or more than 50%.

Specifically, in a case where a region other than the occlusion region (region that cannot be confirmed in captured image of camera), that is, the region that can be confirmed from the captured image of the camera is equal to or more than 50% of the total area of the vacant region (processing target region) where the parked vehicle cannot be confirmed, the processing in steps S212 and S213 is executed.

In this case, the data processing unit of the information processing device determines the processing target region as the parkable region in step S212.

Moreover, in step S213, the display data for parkable region identification (green frame) is displayed on the processing target region.

A specific example will be described with reference to FIG. 30.

In FIG. 30, a processing example on the vacant region with the vacant region ID=2 illustrates in FIG. 29 is illustrated.

As indicated in step S211 (Yes) in FIG. 30, furthermore, since the vacancy likelihood (vacancy possibility) of the vacant region with the vacant region ID=2=60% is equal to or more than the threshold (Th)=50%, the determination in step S211 becomes Yes.

That is, in the vacant region with the vacant region ID=2, the region other than the occlusion region (region that cannot be confirmed in captured image of camera), that is, the region that can be confirmed from the captured image of the camera is 60% of the total area (d*w) of the vacant region.

In this case, as indicated in steps S212 and S213 in the lowermost stage of FIG. 30, the vacant region with the vacant region ID=2 is determined as the parkable region, and the display data for parkable region identification (green frame) is displayed on the vacant region with the vacant region ID=2.

Figure 31:
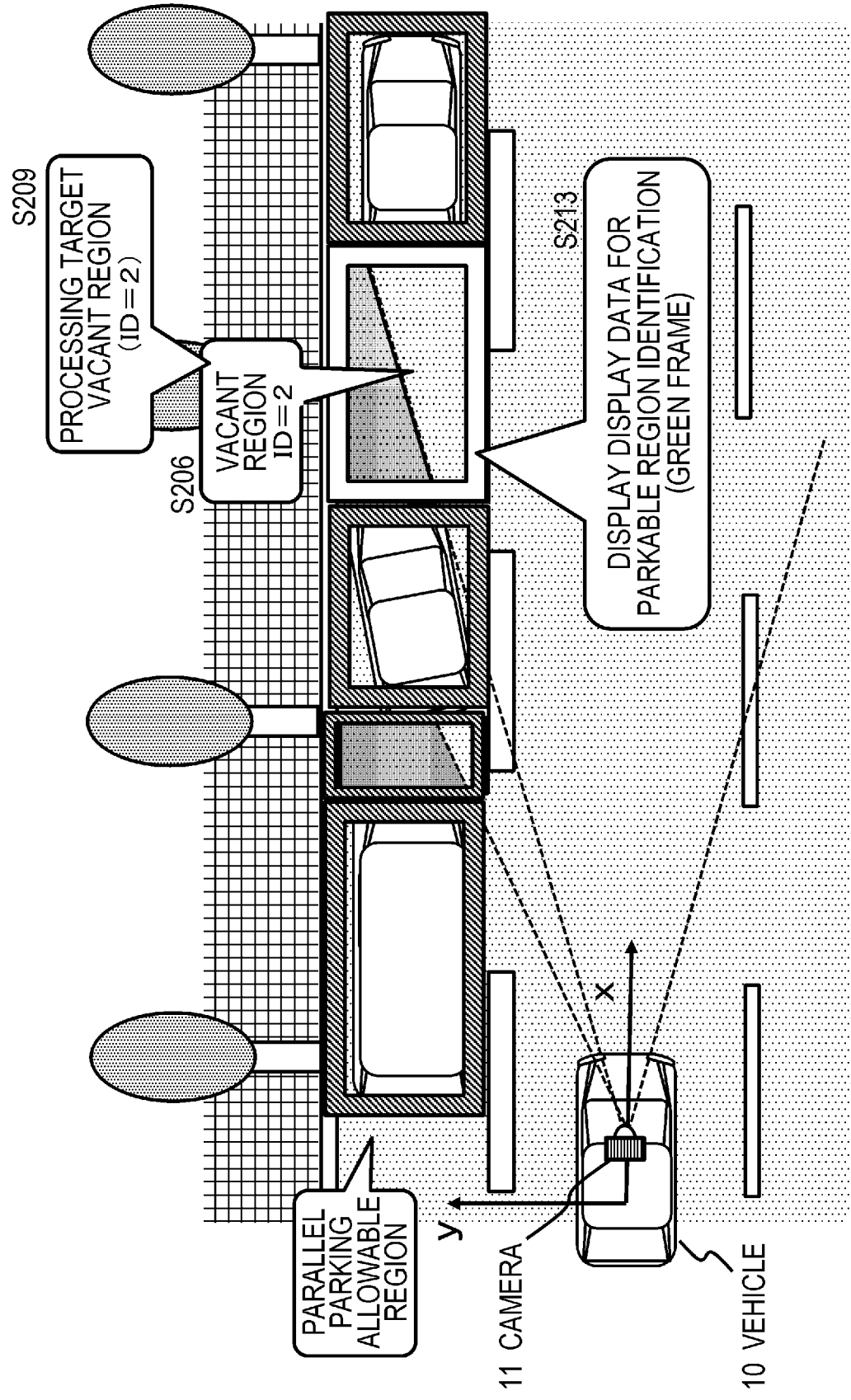
FIG. 31 is a diagram for explaining a specific example of the processing executed by the information processing device according to the present disclosure.

In FIG. 31, a specific example is illustrated in which the display data for parkable region identification (green frame) is displayed on the vacant region with the vacant region ID=2.

As illustrated in FIG. 31, the display data for parkable region identification (green frame) is displayed on the vacant region with the vacant region ID=2.

(Steps S214 and S215)

Processing in steps S214 and S215 is executed in a case where the vacancy likelihood (vacancy possibility) of the processing target region calculated in step S210 is equal to or more than the threshold (Th), that is, less than 50%.

Specifically, in a case where the region other than the occlusion region (region that cannot be confirmed in captured image of camera), that is, the region that can be confirmed from the captured image of the camera is less than 50% of the total area of the parking section region (processing target region) where the parked vehicle cannot be confirmed, the processing in steps S214 and S215 is executed.

In this case, the data processing unit of the information processing device determines the processing target region as the possibility available region in step S214.

Moreover, in step S215, the display data for possibly available region identification (yellow frame) is displayed on the processing target region.

(Step S216)

In step S216, it is determined whether or not the processing on all the processing target regions has been completed.

In a case where there is an unprocessed processing target region, the procedure returns to step S210, and the processing in step S210 and the subsequent steps is executed on the unprocessed processing target region.

In a case where it is determined in step S216 that the processing on all the processing target regions has been completed, the processing is terminated.

In this way, in the second embodiment, the information processing device according to the present disclosure executes the processing according to the flowcharts illustrated in FIGS. 23 and 24, and executes the processing for displaying the following three types of parking possibility identification graphic data (color frame) on each region of the region of interest (ROI) selected as the parkable region.

(1) Display data for parkable region identification (green frame)
(2) Display data for unparkable region identification (red frame)
(3) Display data for possibly available region identification (yellow frame)

Next, an example of a parameter needed for the processing for displaying the parking possibility identification graphic data (color frame) in the second embodiment will be described with reference to FIG. 32.

Figure 32:
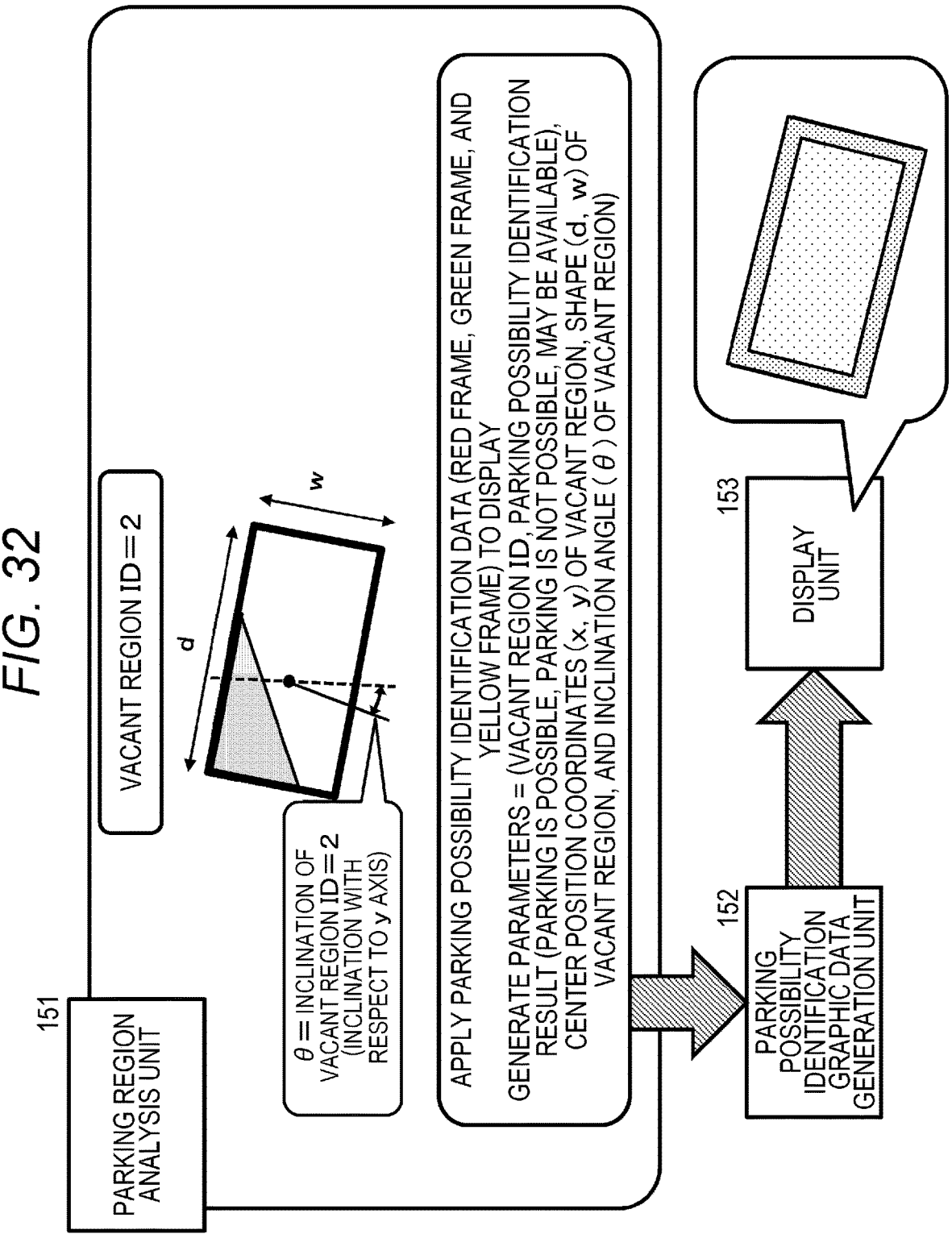
FIG. 32 is a diagram for explaining a specific example of the processing executed by the information processing device according to the present disclosure.

FIG. 32 is a diagram for explaining processing of a parking region analysis unit 151 that executes processing for acquiring a parameter used to display the parking possibility identification graphic data (color frame) and processing of a parking possibility identification graphic data generation unit 152 that executes processing for displaying the parking possibility identification graphic data (color frame) using the acquired parameter.

As illustrated in FIG. 32, the parking region analysis unit 151 executes the processing for acquiring the parameter used to display the parking possibility identification graphic data (color frame).

The parking region analysis unit 151 executes the processing according to the flowcharts described above with reference to FIGS. 23 and 24 and determines which one of (1) Parkable region
(2) Unparkable region
(3) Possibly available region, each region of the region of interest (ROI) selected as the parkable region is.

The parking region analysis unit 151 further executes the processing for acquiring the parameter used to display the parking possibility identification graphic data (color frame).

The parameter is a parameter including the following data.

(a) Vacant region ID,
(b) Parking possibility identification result (parking is possible, parking is not possible, possibly available),
(c) Center position coordinates (x, y) of vacant region,
(d) Shape (d, w) of vacant region,
(e) Inclination angle ($\theta$) of vacant region, These parameters are output from the parking region analysis unit 151 to the parking possibility identification graphic data generation unit 152.

The parking possibility identification graphic data generation unit 152 generates the parking possibility identification graphic data (color frame), using the parameters (a) to (e) described above.

Moreover, the parking possibility identification graphic data generation unit 152 superimposes and displays the generated parking possibility identification graphic data (color frame) on each region of the region of interest (ROI) selected as the parkable region displayed on the display unit 153.

In this way, on the display unit, an image in which any one of the following parking possibility (1) Display data for parkable region identification (green frame)
(2) Display data for unparkable region identification (red frame)
(3) Display data for possibly available region identification (yellow frame)

is superimposed on each region is displayed.

The user (driver) can immediately determine whether each region is a parkable region, an unparkable region, or a possibly available region, on the basis of the color of the parking possibility identification graphic data (color frame) superimposed and displayed on each region of the region of interest (ROI).

5. Regarding Display Data Update Processing

Next, display data update processing will be described.

As described above, by the processing according to the present disclosure, on the display unit 12 of the vehicle 10, the parking possibility identification graphic data (color frame), that is, any one of
  (1) Display data for parkable region identification (green frame)
  (2) Display data for unparkable region identification (red frame)
  (3) Display data for possibly available region identification (yellow frame)
  is superimposed and displayed on each region of the image of the parking region.

The parking possibility identification graphic data (color frame) is sequentially updated as the vehicle 10 travels.

When the vehicle 10 travels, an imaging range of the camera 11 mounted on the vehicle 10 changes, and for example, there is a possibility that the parked vehicle is detected in a display region of the display data for possibly available region identification (yellow frame).

In this case, the parking possibility identification graphic data (color frame) on the display region of the display data for possibly available region identification (yellow frame) can be switched to the display data for unparkable region identification (red frame).

Furthermore, since the occlusion region in the display region of the display data for possibly available region identification (yellow frame) changes when the imaging range of the camera 11 is changed, the value of the vacancy likelihood changes.

In a case where the vacancy likelihood changes and the vacancy likelihood becomes equal to or more than the threshold (Th), the parking possibility identification graphic data (color frame) on the display region of the display data for possibly available region identification (yellow frame) can be switched to the display data for parkable region identification (green frame).

A display data update processing sequence executed by the information processing device according to the present disclosure will be described with reference to the flowchart illustrated in FIG. 33.

Figure 33:
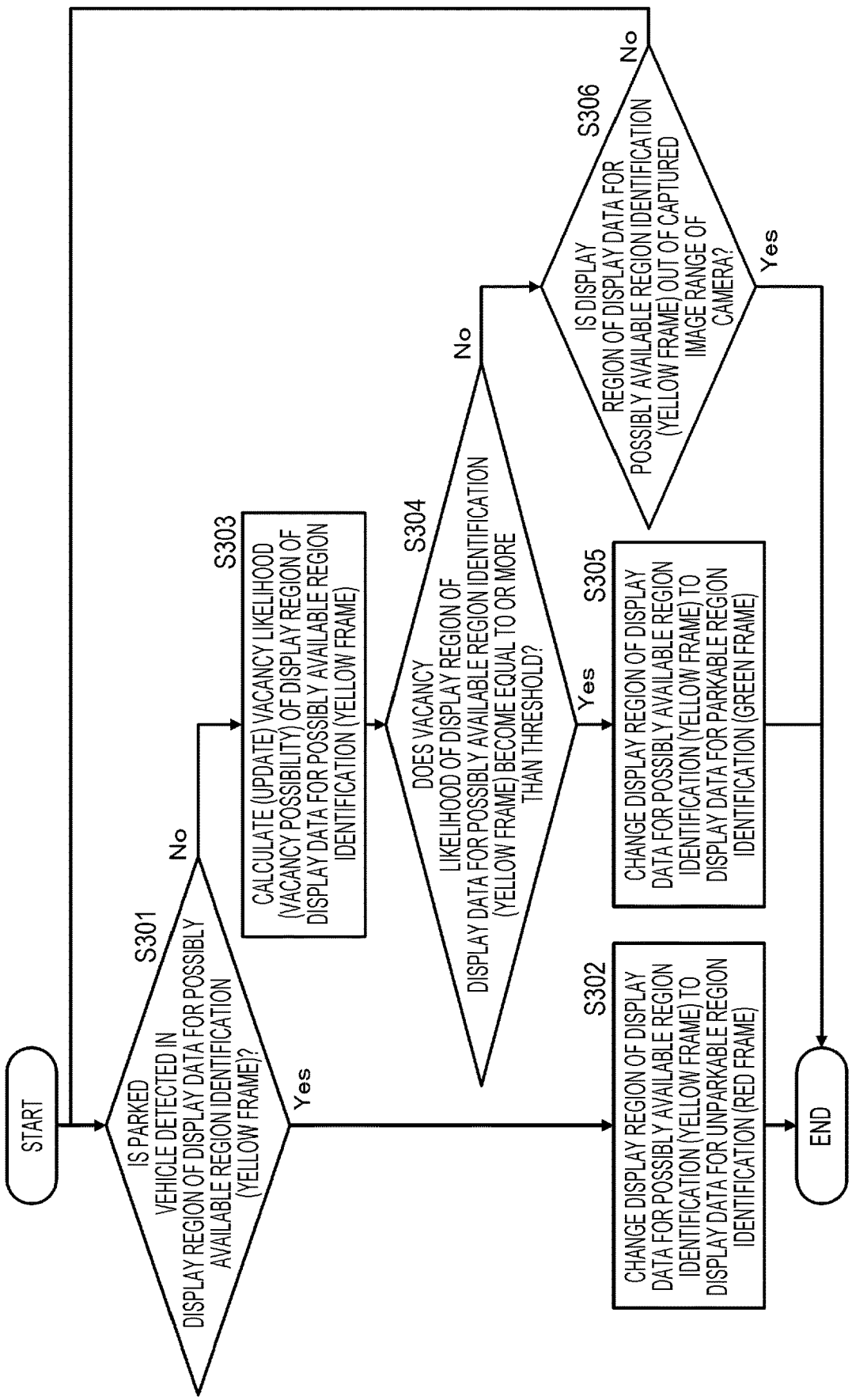
FIG. 33 is a diagram illustrating a flowchart for explaining a processing sequence of display data update processing executed by the information processing device according to the present disclosure.

Processing in each step of the flowchart illustrated in FIG. 33 will be sequentially described.

Note that, at the time when the processing according to the flowchart illustrated in FIG. 33 is started, on the display unit 12 of the vehicle 10, the following parking possibility identification graphic data (color frame), that is, any one of
  (1) Display data for parkable region identification (green frame)
  (2) Display data for unparkable region identification (red frame)
  (3) Display data for possibly available region identification (yellow frame)
  is superimposed and displayed on each region of the image of the parking region.

Furthermore, the vehicle 10 is traveling, the imaging range of the camera 11 mounted on the vehicle 10 is changed as needed, and accordingly, the captured image of the camera 11 input by the information processing device mounted on the vehicle 10 is sequentially updated.

(Step S301)

First, in step S301, the data processing unit of the information processing device mounted on the vehicle 10 analyzes the latest captured image of the camera 11 and determines whether or not a parked vehicle is detected in "the display region of the display data for possibly available region identification (yellow frame)".

In a case where it is determined that the parked vehicle is detected in "the display region of the display data for possibly available region identification (yellow frame)", the procedure proceeds to step S302.

In a case of no detection, the procedure proceeds to step S303.

(Step S302)

In a case where it is determined in step S301 that the parked vehicle is detected in "the display region of the display data for possibly available region identification (yellow frame)", the data processing unit of the information processing device executes processing in step S302.

In this case, in step S302, the data processing unit of the information processing device changes the parking possibility identification graphic data (color frame) of "the display region of the display data for possibly available region identification (yellow frame)" to the display data for unparkable region identification (red frame).

(Step S303)

On the other hand, in a case where the parked vehicle is not detected in "the display region of the display data for possibly available region identification (yellow frame)" in step S301, the data processing unit of the information processing device executes processing in step S303.

In this case, in step S303, the data processing unit of the information processing device executes processing for calculating the vacancy likelihood (vacancy possibility) of "the display region of the display data for possibly available region identification (yellow frame)".

As described above, the vacancy likelihood (vacancy possibility) is an index value indicating a possibility that the parking section region is vacant.

The vacancy likelihood (vacancy possibility) is calculated according to the following (formula 1) as described above.

$$\text{Vacancy likelihood (vacancy possibility)(\%)} = \quad \text{(Formula 1)}$$
$$(1 - (\text{occlusion region area})/$$
$$(\text{total area of parking section region})) * 100(\%)$$

Note that, as described above, the occlusion region is a region that cannot be confirmed in the captured image of the camera. This occlusion region is sequentially changed according to a change in the imaging range of the camera 11 along with traveling of the vehicle 10.

Note that the data processing unit of the information processing device sequentially executes the processing for calculating the vacancy likelihood (vacancy possibility), for "the display region of the display data for possibly available region identification (yellow frame)" and updates data of a calculated value.

(Step S304)

Next, in step S304, the data processing unit of the information processing device determines whether or not the latest vacancy likelihood (vacancy possibility) calculated value of "the display region of the display data for possibly available region identification (yellow frame)" calculated in step S303 becomes equal to or more than the threshold (Th).

Here, the threshold is set to 50%.

If the latest calculated vacancy likelihood (vacancy possibility) is equal to or more than the threshold (Th), that is, equal to or more than 50%, the procedure proceeds to step S305.

On the other hand, if the latest calculated vacancy likelihood (vacancy possibility) is less than the threshold (Th), that is, less than 50%, the procedure proceeds to step S306.

(Step S305)

The processing in step S305 is executed in a case where it is determined that the latest vacancy likelihood (vacancy possibility) calculated value of "the display region of the display data for possibly available region identification (yellow frame)" calculated in step S303 becomes equal to or more than the threshold (Th).

In this case, in step S305, the data processing unit of the information processing device changes the parking possibility identification graphic data (color frame) of "the display region of the display data for possibly available region identification (yellow frame)" to the display data for parkable region identification (green frame).

(Step S306)

The processing in step S306 is executed in a case where it is determined that the latest vacancy likelihood (vacancy possibility) calculated value of "the display region of the display data for possibly available region identification (yellow frame)" calculated in step S303 does not become equal to or more than the threshold (Th).

In this case, the data processing unit of the information processing device determines in step S306 whether or not "the display region of the display data for possibly available region identification (yellow frame)" is out of the imaging range of the camera 11 mounted on the vehicle 10.

In a case where it is determined that "the display region of the display data for possibly available region identification (yellow frame)" is out of the imaging range of the camera 11 mounted on the vehicle 10, the display data update processing on "the display region of the display data for possibly available region identification (yellow frame)" is terminated.

On the other hand, in a case where "the display region of the display data for possibly available region identification (yellow frame)" is not out of the imaging range of the camera 11 mounted on the vehicle 10, the procedure proceeds to step S301, and the processing in and subsequent to step S301 is repeated.

In this way, the information processing device according to the present disclosure executes the processing for sequentially updating the parking possibility identification graphic data (color frame) displayed on the display unit 12 of the vehicle 10, along with traveling of the vehicle 10.

That is, the latest captured image of the camera 11 is analyzed, the processing for detecting the parked vehicle and calculating the vacancy likelihood (vacancy possibility) is sequentially executed, and the processing for updating the parking possibility identification graphic data (color frame) displayed on the display unit 12 is executed, on the basis of the processing result.

6. Regarding Automated Driving Processing in a Case where Vehicle is Automated Driving Vehicle Next, automated driving processing in a case where the vehicle is an automated driving vehicle will be described.

In a case where the vehicle is an automated driving vehicle, it is possible to execute automated parking processing using automated driving, by using the parking region information described above, that is, region data of (1) Parkable region on which display data for parkable region identification (green frame) is displayed (2) Unparkable region on which display data for unparkable region identification (red frame) is displayed (3) Possible available region on which display data for possibly available region identification (yellow frame) is displayed.

An automatic driving control processing sequence executed by the information processing device according to the present disclosure will be described with reference to the flowcharts illustrated in FIGS. 34 and 35.

Figure 34:
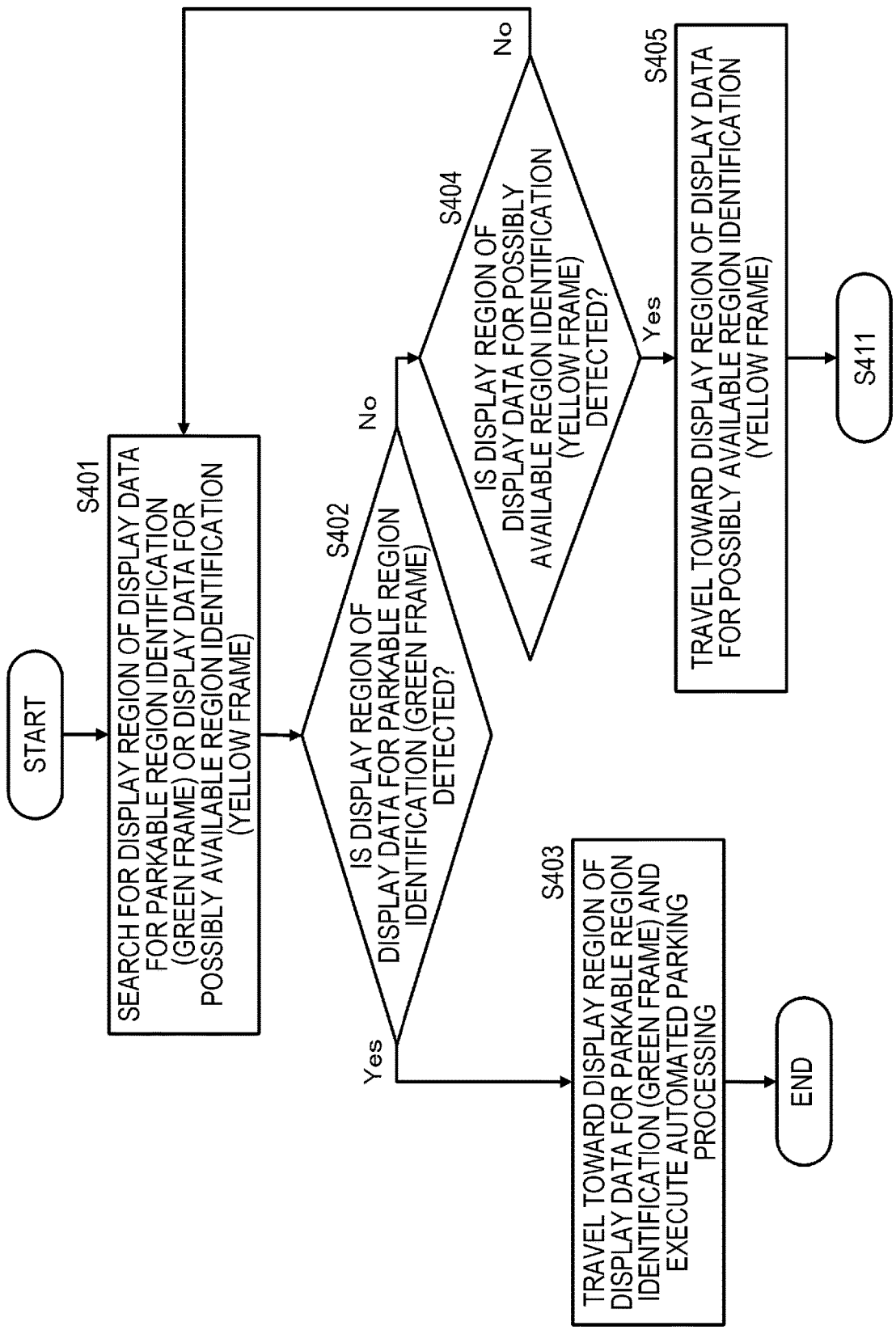
FIG. 34 is a diagram illustrating a flowchart for explaining a processing sequence of automated driving control processing executed by the information processing device according to the present disclosure.
Figure 35:
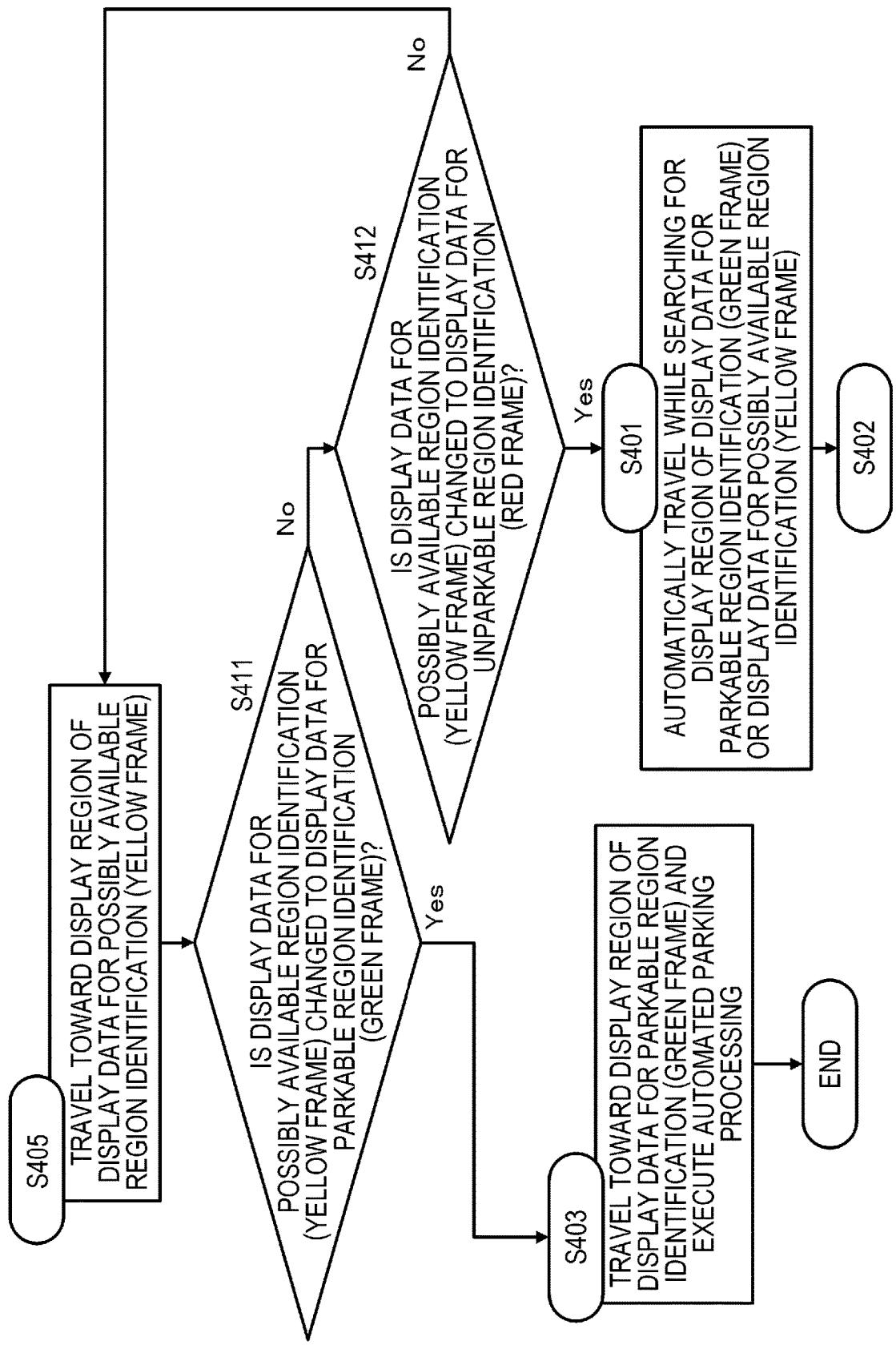
FIG. 35 is a diagram illustrating a flowchart for explaining the processing sequence of the automated driving control processing executed by the information processing device according to the present disclosure.

Processing in each step of the flowchart illustrated in FIGS. 34 and 35 will be sequentially described.

Note that, at the time when the processing according to the flowcharts illustrated in FIGS. 34 and 35 are started, on the display unit 12 of the vehicle 10, the parking possibility identification graphic data (color frame), that is, any one of (1) Display data for parkable region identification (green frame)

(2) Display data for unparkable region identification (red frame)

(3) Display data for possibly available region identification (yellow frame)

is superimposed and displayed on each region of the image of the parking region.

Furthermore, the vehicle 10 is traveling, the imaging range of the camera 11 mounted on the vehicle 10 is changed as needed, and accordingly, the captured image of the camera 11 input by the information processing device mounted on the vehicle 10 is sequentially updated.

(Step S401)

First, in step S401, the data processing unit (automated driving control unit) of the information processing device mounted on the vehicle 10 searches the parking possibility identification graphic data (color frame) displayed on the display unit, for the display region of the display data for parkable region identification (green frame) or the display data for possibly available region identification (yellow frame).

Note that, here, for easy understanding, an example for executing processing with reference to the display data of the display unit 12 will be described.

As actual processing, it is possible to execute processing by inputting region determination data indicating parking possibility data of each region unit, that is, which one of a parkable region, an unparkable region, or a possibly available region each region is, into the automated driving control unit, without referring to the display data on the display unit.

(Step S402)

Next, in step S402, the data processing unit (automated driving control unit) of the information processing device determines whether or not the display region of the display data for parkable region identification (green frame) is detected from the parking possibility identification graphic data (color frame) displayed on the display unit.

In a case where the display region of the display data for parkable region identification (green frame) is detected from the parking possibility identification graphic data (color frame) displayed on the display unit, the procedure proceeds to step S403.

On the other hand, in a case where it is determined that the display region of the display data for parkable region identification (green frame) is not detected from the parking possibility identification graphic data (color frame) displayed on the display unit, the procedure proceeds to step S404.

(Step S403)

Processing in step S403 is executed in a case where it is determined in step S402 that the display region of the display data for parkable region identification (green frame) is detected from the parking possibility identification graphic data (color frame) displayed on the display unit.

In this case, in step S403, the data processing unit (automated driving control unit) of the information processing device performs automated driving toward the display region of the display data for parkable region identification (green frame) and executes automated parking processing on this region.

(Step S404)

On the other hand, processing in step S404 is executed in a case where the display region of the display data for parkable region identification (green frame) is not detected from the parking possibility identification graphic data (color frame) displayed on the display unit in step S402.

In this case, in step S404, the data processing unit (automated driving control unit) of the information processing device determines whether or not the display region of the display data for possibly available region identification (yellow frame) is detected from the parking possibility identification graphic data (color frame) displayed on the display unit.

In a case where it is determined that the display region of the display data for possibly available region identification (yellow frame) is detected from the parking possibility identification graphic data (color frame) displayed on the display unit, the procedure proceeds to step S405.

On the other hand, in a case where the display region of the display data for possibly available region identification (yellow frame) is not detected from the parking possibility identification graphic data (color frame) displayed on the display unit, the procedure returns to step S401, and the processing in step S401 and the subsequent steps is repeated.

(Step S405)

Processing in step S405 is executed in a case where it is determined in step S404 that the display region of the display data for possibly available region identification (yellow frame) is detected from the parking possibility identification graphic data (color frame) displayed on the display unit.

In this case, in step S405, the data processing unit (automated driving control unit) of the information processing device performs automated driving toward the region of the display data for possibly available region identification (yellow frame) displayed on the display unit.

(Step S411)

Next, in step S411, the data processing unit (automated driving control unit) of the information processing device confirms whether or not the region of the display data for possibly available region identification (yellow frame) that is set as a traveling destination and is displayed on the display unit is changed to the display of the display data for parkable region identification (green frame).

In a case where it is confirmed that the region of the display data for possibly available region identification (yellow frame) that is set as the traveling destination and is displayed on the display unit is changed to the display of the display data for parkable region identification (green frame), the procedure proceeds to step S403.

In this case, in step S403, the data processing unit (automated driving control unit) of the information processing device performs automated driving toward the display region of the display data for parkable region identification (green frame) and executes the automated parking processing on this region.

On the other hand, in a case where it is confirmed that the region of the display data for possibly available region identification (yellow frame) that is set as the traveling destination and is displayed on the display unit is not changed to the display of the display data for parkable region identification (green frame), the procedure proceeds to step S412.

(Step S412)

Processing in step S412 is executed in a case where it is confirmed in step S411 that the region of the display data for possibly available region identification (yellow frame) that is set as the traveling destination and is displayed on the display unit is not changed to the display of the display data for parkable region identification (green frame).

In this case, in step S412, the data processing unit (automated driving control unit) of the information processing device confirms whether or not the region of the display data for possibly available region identification (yellow frame) that is set as the traveling destination and is displayed on the display unit is changed to the display of the display data for unparkable region identification (red frame).

In a case where it is confirmed that the region of the display data for possibly available region identification (yellow frame) that is set as the traveling destination and is displayed on the display unit is changed to the display of the display data for unparkable region identification (red frame), the procedure proceeds to step S401.

In this case, the data processing unit (automated driving control unit) of the information processing device returns to step S401, and repeats processing in step S401 and the subsequent steps.

That is, the processing for searching the parking possibility identification graphic data (color frame) displayed on the display unit, for the display region of the display data for parkable region identification (green frame) or the display data for possibly available region identification (yellow frame) is restarted, and the processing in step S401 and the subsequent steps is executed again.

On the other hand, in a case where the region of the display data for possibly available region identification (yellow frame) that is set as the traveling destination and is displayed on the display unit is not changed to the display of the display data for unparkable region identification (red frame), the procedure returns to step S405, and the processing in step S405 and the subsequent steps is repeatedly executed.

That is, while continuing traveling toward the region of the display data for possibly available region identification (yellow frame) that is set as the traveling destination and is displayed on the display unit, the processing in step S405 and the subsequent steps is repeatedly executed.

In this way, in a case where the vehicle 10 is an automated driving vehicle, it is possible to execute the automated parking processing using automated driving, by using the parking region information, that is, region data including (1) Parkable region on which display data for parkable region identification (green frame) is displayed
(2) Unparkable region on which display data for unparkable region identification (red frame) is displayed
(3) Possible available region on which display data for possibly available region identification (yellow frame) is displayed.

7. Regarding Configuration Example of Information Processing Device According to Present Disclosure Next, a configuration example of the information processing device according to the present disclosure will be described.

Figure 36:
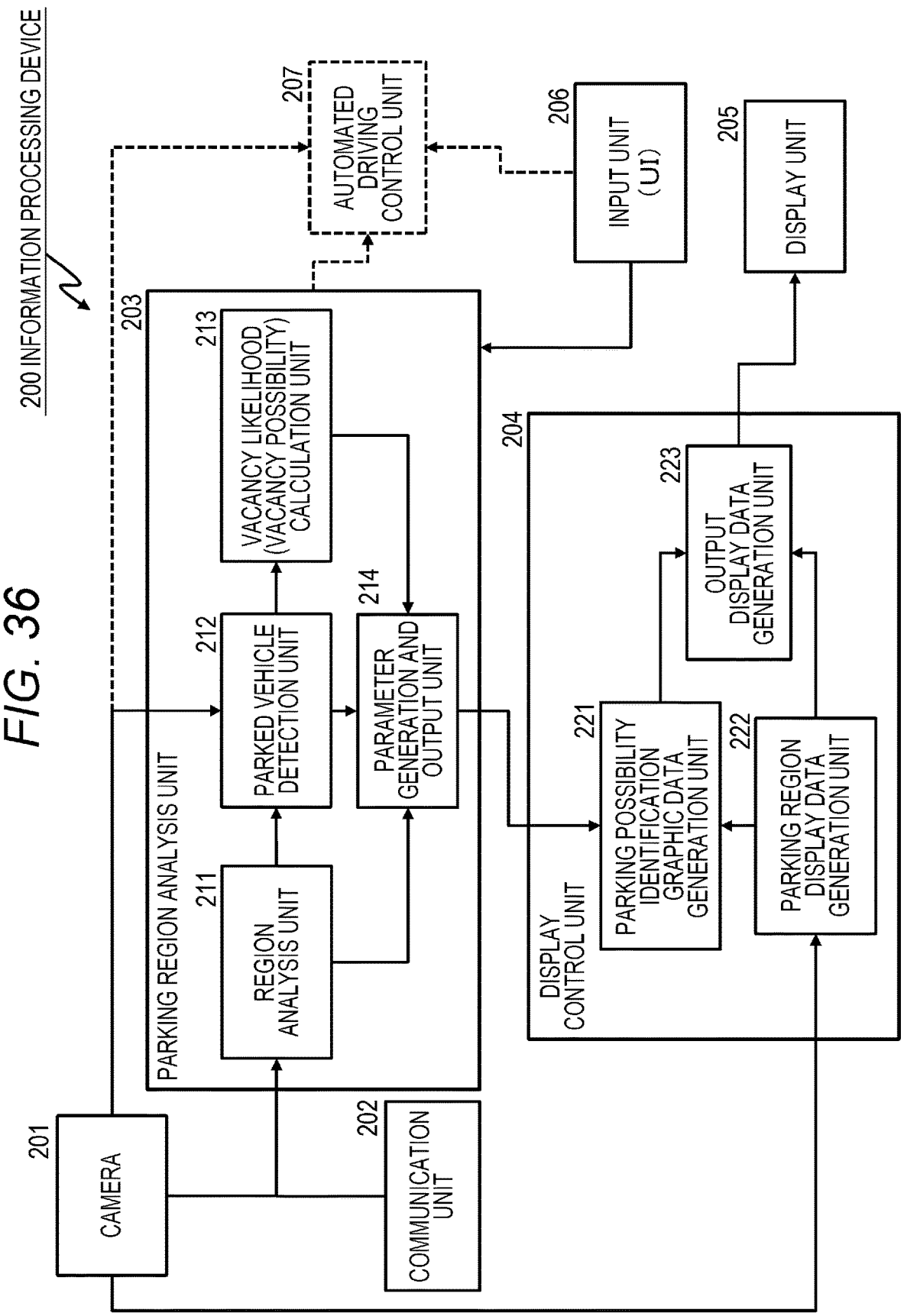
FIG. 36 is a diagram for explaining a configuration example of the information processing device according to the present disclosure.

FIG. 36 is a block diagram illustrating an example of an information processing device 200 according to the present disclosure mounted on the vehicle 10.

As illustrated in FIG. 36, the information processing device 200 includes a camera 201, a parking region analysis unit 202, a communication unit 203, a display control unit 204, a display unit 205, an input unit (UI) 206, and an automated driving control unit 207.

The parking region analysis unit 203 includes a region analysis unit 211, a parked vehicle detection unit 212, a vacancy likelihood (vacancy possibility) calculation unit 213, and a parameter generation and output unit 214.

The display control unit 204 includes a parking possibility identification graphic data generation unit 221, a parking region display data generation unit 222, and an output display data generation unit 223.

Note that the automated driving control unit 207 is not an essential component, and is a component included in a case where the vehicle is a vehicle that can perform automated driving.

The camera 201 includes, for example, a camera 11 that captures an image in a vehicle front direction described with reference to FIG. 2, a camera that captures an image in a front, back, left, and right directions of the vehicle described with reference to FIG. 6, or the like.

Note that, although not illustrated in FIG. 36, in a case of an automated driving vehicle, various sensors other than the camera are mounted. For example, in addition to the camera, sensors such as light detection and ranging (LiDAR) or a time of flight (ToF) sensor are used.

Note that the light detection and ranging (LiDAR) and the ToF sensor are, for example, a sensor that outputs light such as laser light, analyzes reflected light by an object, and measures a distance of a surrounding object.

As illustrated in the drawing, a captured image of the camera 201 is output to the region analysis unit 211 and the parked vehicle detection unit 212 of the parking region analysis unit 203, and in addition, the automated driving control unit 207.

The communication unit 202 may have a configuration that communicates with an external device, for example, a parking lot management server, a road management server, or the like, receives parking section region information from these external devices, and inputs the received information into the region analysis unit 211 of the parking region analysis unit 203.

The region analysis unit 211 of the parking region analysis unit 203 executes processing for analyzing a parking region.

For example, in the first embodiment described above, that is, in a case of the parking lot in which the parking section is clearly divided by the white line or the like, such as a double parking lot described with reference to FIG. 1 or the like described above, arrangement of each parking section region or the like is analyzed.

Furthermore, in a parkable region in which a parking section of each vehicle is not clear, such as a parallel parkable section described in the second embodiment or the like, the parkable region is set as a region of interest (ROI), and processing for detecting a vacant space from the region of interest or the like is executed.

The region analysis unit 211 of the parking region analysis unit 203 further executes the processing in step S101 in the flowchart illustrated in FIG. 10 described as the processing sequence according to the first embodiment above and the processing in step S201 in the flowchart illustrated in FIG. 23 described as the processing sequence according to the second embodiment.

That is, the processing for detecting the parking section region or the vacant region, on the basis of the sensor detection information such as the captured image of the camera 201, the sensor detection information and the AI prediction data, or the information input from outside via the communication unit 202, and setting the region identifier (ID) to the detected parking section region or vacant region.

Note that, as region estimation processing using the AI prediction data, as described above, for example, it is possible to use a configuration that uses an AI predictor generated by a learning algorithm using the convolutional neural network (CNN) that is a convolutional neural network.

The region information to which an identifier (ID) in region unit is set by the region analysis unit 211 is output to the parked vehicle detection unit 212 and the parameter generation and output unit 214.

The parked vehicle detection unit 212 detects a parked vehicle parked in each region such as each parking section region.

The parked vehicle detection information in region unit is output to the vacancy likelihood (vacancy possibility) calculation unit 213 and the parameter generation and output unit 214.

The vacancy likelihood (vacancy possibility) calculation unit 213 executes processing for calculating the vacancy likelihood (vacancy possibility), for a region where a parked vehicle is not detected.

As described above, the vacancy likelihood (vacancy possibility) of each region is calculated according to the following (formula 1).

$$\text{Vacancy likelihood (vacancy possibility)}(\%) = \qquad \text{(Formula 1)}$$
$$\big(1 - (\text{occlusion region area})/$$
$$(\text{total area of parking section region})\big) * 100(\%)$$

The occlusion region is a region that cannot be confirmed in the captured image of the camera.

The vacancy likelihood (vacancy possibility) calculation unit 213 outputs the value of the vacancy likelihood (vacancy possibility) to the parameter generation and output unit 214.

The parameter generation and output unit 214 generates a parameter needed for the processing for displaying the parking possibility identification graphic data (color frame) and outputs the parameter to the parking possibility identification graphic data generation unit 221 of the display control unit 204.

The parameters generated by the parameter generation and output unit 214 are the parameters described with reference to FIG. 18 to 20, 32, or the like above. That is, the parameter includes the following data.

(a) Parking section region ID (or vacant region ID),
(b) Parking possibility identification result (parking is possible, parking is not possible, possibly available),
(c) Center position coordinates (x, y) of parking section region (or vacant region), (d) Shape (d, w) of parking section region (or vacant region), (e) Inclination angle (θ) of parking section region (or vacant region), The parking possibility identification graphic data generation unit 221 of the display control unit 221 generates the parking possibility identification graphic data (color frame), using the parameters (a) to (e) above.

That is, the parking possibility identification graphic data (color frame) that is any one of (1) Display data for parkable region identification (green frame)

(2) Display data for unparkable region identification (red frame)

(3) Display data for possibly available region identification (yellow frame)

is generated in each region unit.

The parking possibility identification graphic data (color frame) in region unit generated by the parking possibility identification graphic data generation unit 221 of the display control unit 221 is output to the output display data generation unit 223.

The parking region display data generation unit 222 of the display control unit 221 inputs the captured image of the camera 201 and generates the display data regarding the parking lot, the parkable region, or the like.

For example, a parking lot region image based on the captured image of the camera 11 that images the front side of the vehicle 10 illustrated in FIG. 2 is generated.

Alternatively, a combined image (bird's-eye view or the like) is generated on the basis of the captured images of all the following four cameras including (a) a forward camera 11F that captures an image on the front side of the vehicle 10, (b) a backward camera 11B that captures an image on the rear side of the vehicle 10, (c) a leftward camera 11L that captures an image on the left side of the vehicle 10, and (d) a rightward camera 11R that captures an image on the right side of the vehicle 10 described with reference to FIG. 6 or the plurality of cameras.

The display data regarding the parking lot, the parkable region, or the like generated by the parking region display data generation unit 222 of the display control unit 221 is output to the output display data generation unit 223.

The output display data generation unit 223 inputs each piece of the following data.

The parking possibility identification graphic data (color frame) in region unit generated by the parking possibility identification graphic data generation unit 221

The display data regarding the parking lot, the parkable region, or the like generated by the parking region display data generation unit 222

The output display data generation unit 223 inputs these two pieces of data, generates display data in which these pieces of data are superimposed, and outputs the display data to the display unit 205.

On the display unit 205, the image in which the following parking possibility identification graphic data (color frame), that is, any one of (1) Display data for parkable region identification (green frame)

(2) Display data for unparkable region identification (red frame)

(3) Display data for possibly available region identification (yellow frame)

is superimposed on each region such as each parking section region or the parking section region is displayed.

The user (driver) can immediately determine whether each region is a parkable region, an unparkable region, or a possibly available region, on the basis of the color of the parking possibility identification graphic data (color frame) superimposed and displayed on each region of the region of interest (ROI).

The input unit (UI) 206 is a UI to be used for processing for inputting a parkable space search processing start instruction, processing for inputting target parking position selection information, or the like, by the driver who is the user, for example. The input unit (UI) 206 may have a configuration using a touch panel formed on the display unit 205.

The input information of the input unit (UI) 206 is input to the parking region analysis unit 203 and the automated driving control unit 207.

The automated driving control unit 207 executes the automated driving processing and the automated parking processing, for example, in response to a parking request input from the input unit (UI) 206.

The automated driving and the automated parking processing by the automated driving control unit 207 are executed as the processing according to the flowcharts illustrated in FIGS. 34 and 35 above.

8. Regarding Hardware Configuration Example of Information Processing Device According to Present Disclosure Next, a hardware configuration example of the information processing device according to the present disclosure will be described with reference to FIG. 37.

Figure 37:
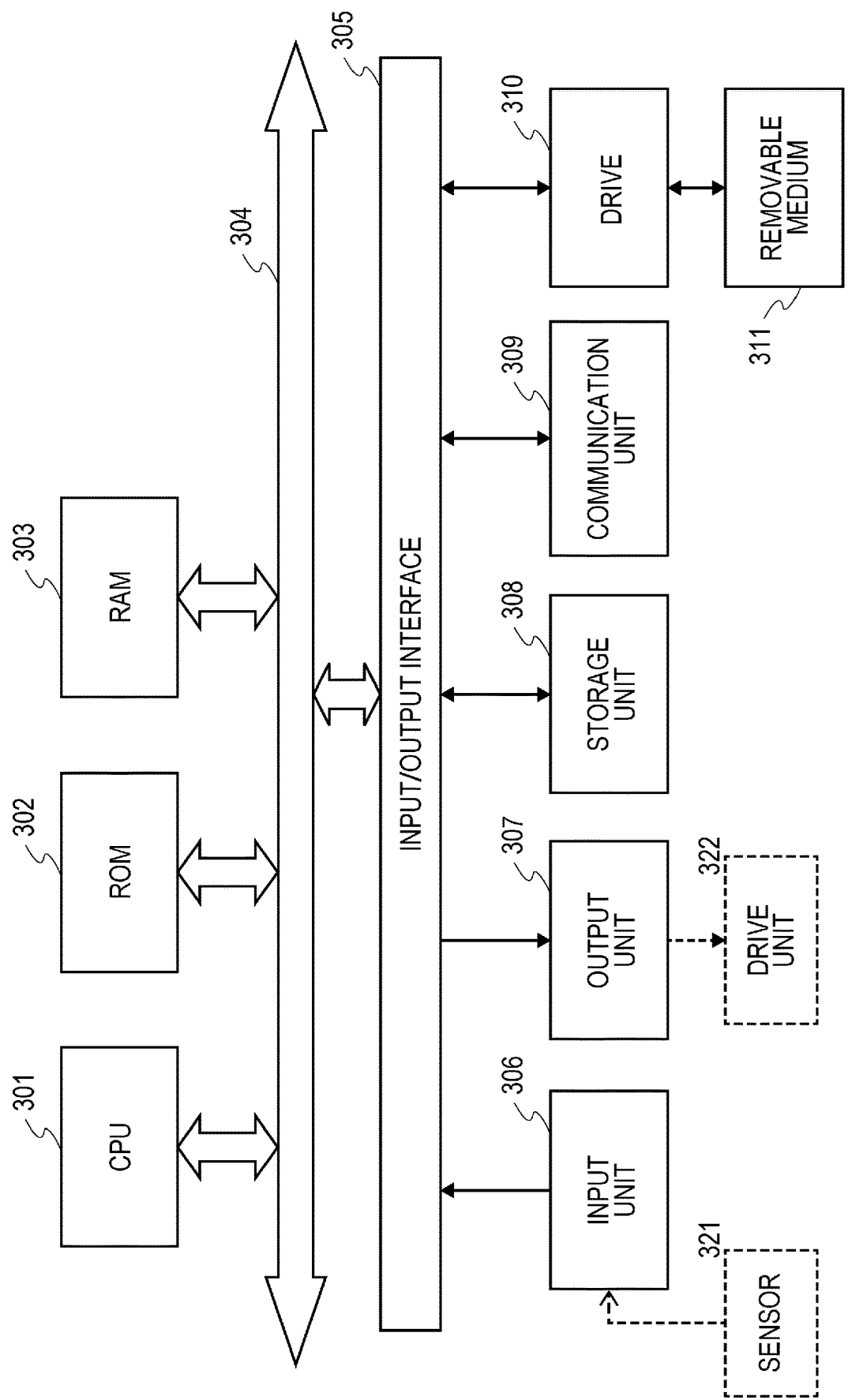
FIG. 37 is a diagram for explaining a hardware configuration example of the information processing device according to the present disclosure.

Note that the information processing device is mounted in the vehicle 10. The hardware configuration illustrated in FIG. 37 is a hardware configuration example of the information processing device in the vehicle 10.

The hardware configuration illustrated in FIG. 37 will be described.

A central processing unit (CPU) 301 functions as a data processing unit that executes various types of processing in accordance with a program stored in a read only memory (ROM) 302 or a storage unit 308. For example, processing according to the sequences described in the embodiment above is executed. A random access memory (RAM) 303 stores programs, data, or the like to be performed by the CPU 301. The CPU 301, the ROM 302, and the RAM 303 are connected to each other by a bus 304.

The CPU 301 is connected to an input/output interface 305 via the bus 304, and to the input/output interface 305, an input unit 306 that includes various switches, a touch panel, a microphone, and a status data acquisition unit of a user input unit and various sensors 321 such as a camera and LiDAR, and an output unit 307 that includes a display, a speaker, or the like are connected.

Furthermore, the output unit 307 also outputs drive information for a drive unit 322 of the vehicle.

The CPU 301 inputs commands, status data, or the like input from the input unit 306, executes various types of processing, and outputs processing results to, for example, the output unit 307.

The storage unit 308 connected to the input/output interface 305 includes, for example, a hard disk, or the like and stores programs executed by the CPU 301 and various types of data. A communication unit 309 functions as a transmission/reception unit for data communication via a network such as the Internet or a local area network, and communicates with an external device.

Furthermore, in addition to the CPU, a graphics processing unit (GPU) may be provided as a dedicated processing unit for image information or the like input from the camera.

A drive 310 connected to the input/output interface 305 drives a removable medium 311 such as a magnetic disk, an optical disk, a magneto-optical disk, or a semiconductor memory such as a memory card, and records or reads data.

9. Regarding Configuration Example of Vehicle

Next, a configuration example of a vehicle on which the information processing device according to the present disclosure is mounted will be described.

Figure 38:
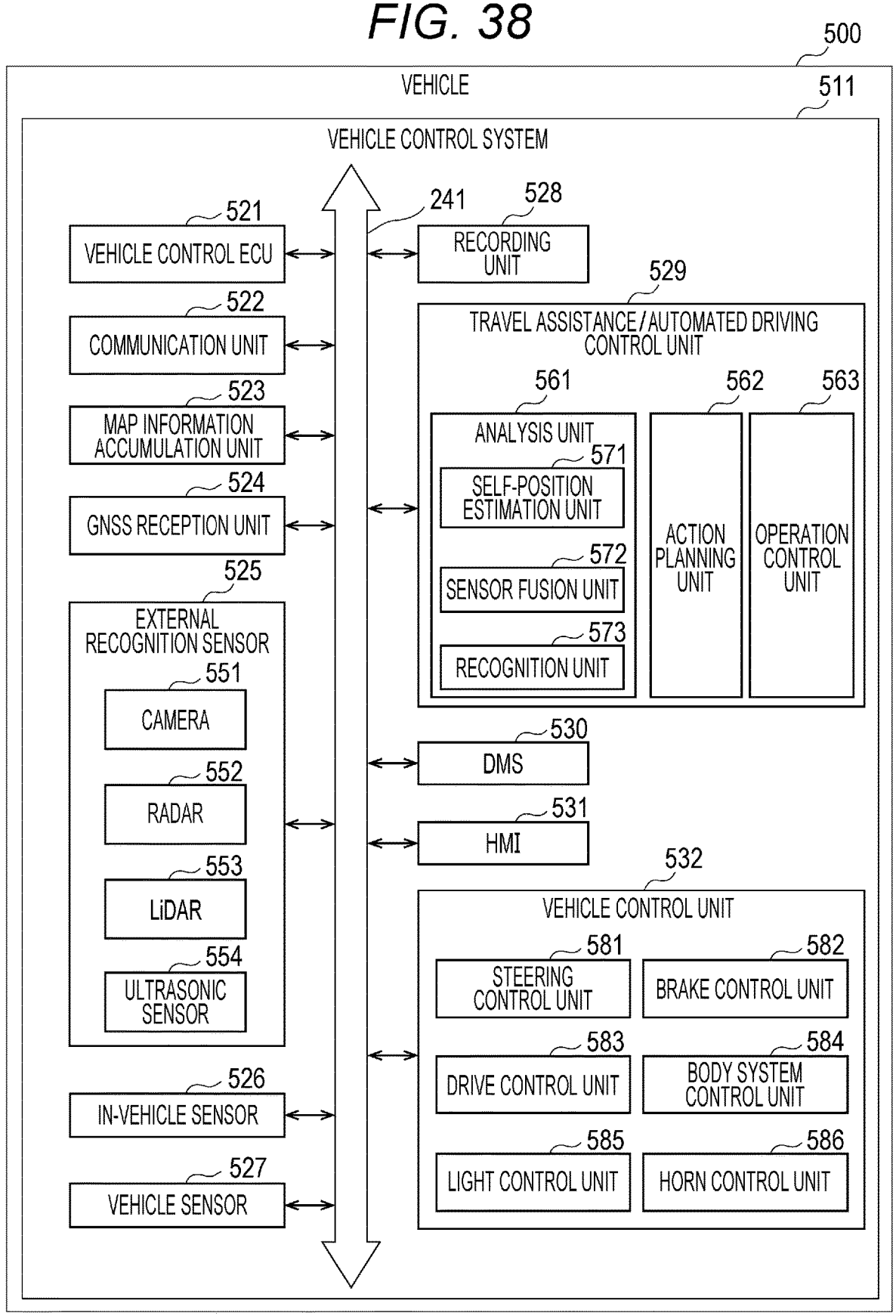
FIG. 38 is a diagram for explaining a configuration example of a vehicle mounting the information processing device according to the present disclosure.

FIG. 38 is a block diagram illustrating a configuration example of a vehicle control system 511 of a vehicle 500 (=vehicle 10) on which the information processing device according to the present disclosure is mounted.

The vehicle control system 511 is provided in the vehicle 500 and executes processing related to travel assistance and automated driving of the vehicle 500.

The vehicle control system 511 includes a vehicle control electronic control unit (ECU) 521, a communication unit 522, a map information accumulation unit 523, a global navigation satellite system (GNSS) reception unit 524, an external recognition sensor 525, an in-vehicle sensor 526, a vehicle sensor 527, a recording unit 528, a travel assistance/ automated driving control unit 529, a driver monitoring system (DMS) 530, a human machine interface (HMI) 531, and a vehicle control unit 532.

The vehicle control electronic control unit (ECU) 521, the communication unit 522, the map information accumulation unit 523, the GNSS reception unit 524, the external recognition sensor 525, the in-vehicle sensor 526, the vehicle sensor 527, the recording unit 528, the travel assistance/ automated driving control unit 529, the driver monitoring system (DMS) 530, the human machine interface (HMI) 531, and the vehicle control unit 532 are communicably connected to each other via a communication network 41. The communication network 241 includes, for example, an in-vehicle communication network, a bus, or the like that conforms to a digital bidirectional communication standard, such as a controller area network (CAN), a local interconnect network (LIN), a local area network (LAN), FlexRay (registered trademark), or Ethernet (registered trademark). The communication network 241 may be selectively used depending on the type of data to be communicated, and for example, the CAN is applied to data related to vehicle control, and the Ethernet is applied to large-capacity data. Note that units of the vehicle control system 511 may be directly connected to each other using wireless communication adapted to a relatively short-range communication, such as near field communication (NFC) or Bluetooth (registered trademark) without using the communication network 241, for example.

Note that, hereinafter, in a case where each unit of the vehicle control system 511 performs communication via the communication network 241, the description of the communication network 241 will be omitted. For example, in a case where the vehicle control electronic control unit (ECU) 521 and the communication unit 522 perform communication via the communication network 241, it is simply described that a processor and the communication unit 522 perform communication.

The vehicle control electronic control unit (ECU) 521 includes, for example, various processors such as a central processing unit (CPU) or a micro processing unit (MPU). The vehicle control electronic control unit (ECU) 521 controls the entire of partial function of the vehicle control system 511.

The communication unit 522 communicates with various devices inside and outside the vehicle, another vehicle, a server, a base station, and the like, and transmits and receives various types of data. At this time, the communication unit 522 can perform communication using a plurality of communication schemes.

Communication with the outside of the vehicle executable by the communication unit 522 will be schematically described. The communication unit 522 communicates with a server (hereinafter, referred to as an external server) or the like that exists on an external network via a base station or an access point by, for example, a wireless communication scheme such as fifth generation mobile communication system (5G), long term evolution (LTE), dedicated short range communications (DSRC), or the like. Examples of the external network with which the communication unit 522 performs communication include the Internet, a cloud network, a company-specific network, or the like. The communication method by which the communication unit 522 communicates with the external network is not particularly limited as long as it is a wireless communication method capable of performing digital bidirectional communication at a communication speed equal to or more than a predetermined speed and at a distance equal to or longer than a predetermined distance.

Furthermore, for example, the communication unit 522 can communicate with a terminal present in the vicinity of the host vehicle using a peer to peer (P2P) technology. The terminal present in the vicinity of the host vehicle is, for example, a terminal worn by a moving body moving at a relatively low speed such as a pedestrian or a bicycle, a terminal installed in a store or the like with a position fixed, or a machine type communication (MTC) terminal. Moreover, the communication unit 522 can also perform V2X communication. The V2X communication refers to, for example, communication between the host vehicle and another vehicle, such as vehicle to vehicle communication with another vehicle, vehicle to infrastructure communication with a roadside device or the like, vehicle to home communication, and vehicle to pedestrian communication with a terminal or the like carried by a pedestrian.

For example, the communication unit 522 can receive a program for updating software for controlling the operation of the vehicle control system 511 from the outside (Over The Air). The communication unit 522 can further receive map information, traffic information, the information regarding the surroundings of the vehicle 500, or the like from the outside. Furthermore, for example, the communication unit 522 can transmit information regarding the vehicle 500, information regarding the surroundings of the vehicle 500, or the like to the outside. Examples of the information regarding the vehicle 500 transmitted to the outside by the communication unit 522 include data indicating a state of the vehicle 500, a recognition result from a recognition unit 573, or the like. Moreover, for example, the communication unit 522 performs communication corresponding to a vehicle emergency call system such as an eCall.

Communication with the inside of the vehicle executable by the communication unit 522 will be schematically described. The communication unit 522 can communicate with each device in the vehicle using, for example, wireless communication. The communication unit 522 can perform wireless communication with the device in the vehicle by, for example, a communication scheme allowing digital bidirectional communication at a communication speed equal to or higher than a predetermined speed by wireless communication, such as wireless LAN, Bluetooth, NFC, or wireless USB (WUSB). The communication performed by the communication unit 522 is not limited to this, and the communication unit 522 can also communicate with each device in the vehicle using wired communication. For example, the communication unit 522 can communicate with each device in the vehicle by wired communication via a cable connected to a connection terminal (not illustrated). The communication unit 522 can communicate with each device in the vehicle by a communication scheme allowing digital bidirectional communication at a communication speed equal to or higher than a predetermined speed by wired communication, for example, a universal serial bus (USB), the high-definition multimedia interface (HDMI) (registered trademark), a mobile high-definition link (MHL), or the like.

Here, the device in the vehicle indicates, for example, a device that is not connected to the communication network 241 in the vehicle. As the in-vehicle device, for example, a mobile apparatus or a wearable device carried by an occupant such as a driver, an information device carried onto a vehicle and temporarily installed, or the like can be considered.

For example, the communication unit 522 receives an electromagnetic wave transmitted by a road traffic information communication system (vehicle information and communication system (VICS) (registered trademark)), such as a radio wave beacon, an optical beacon, or FM multiplex broadcasting.

The map information accumulation unit 523 accumulates one or both of a map acquired from the outside and a map created by the vehicle 500. For example, the map information accumulation unit 523 accumulates a three-dimensional high-precision map, a global map that is lower in precision than the high-precision map but covers a wider area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 500 from the external server or the like. The point cloud map is a map including a point cloud (point cloud data). Here, the vector map indicates a map adapted to an advanced driver assistance system (ADAS) in which traffic information such as a lane and a signal position is associated with the point cloud map.

The point cloud map and the vector map may be provided from, for example, an external server or the like, or may be created by the vehicle 500 as a map for performing matching with a local map to be described later on the basis of a sensing result by a radar 552, a LiDAR 553, or the like, and may be accumulated in the map information accumulation unit 523. Furthermore, in a case where the high-precision map is provided from the external server or the like, for example, map data of several hundred meters square regarding a planned path on which the vehicle 500 travels from now is acquired from the external server or the like in order to reduce the communication traffic.

The GNSS reception unit 524 receives a GNSS signal from a GNSS satellite and acquires position information of the vehicle 500. The received GNSS signal is supplied to the travel assistance/automated driving control unit 529. Note that the GNSS reception unit 524 may acquire the position information, for example, using a beacon, without limiting to the method using the GNSS signal.

The external recognition sensor 525 includes various sensors used to recognize a situation outside the vehicle 500, and supplies sensor data from each sensor to each unit of the vehicle control system 511. The type and number of sensors included in the external recognition sensor 525 may be determined as desired.

For example, the external recognition sensor 525 includes a camera 551, the radar 552, the light detection and ranging, laser imaging detection and ranging (LiDAR) 553, and an ultrasonic sensor 554. Without being limited to this, and the external recognition sensor 525 may include one or more types of sensors among the camera 551, the radar 552, the LiDAR 553, and the ultrasonic sensor 554. The numbers of the cameras 551, the radars 552, the LiDARs 553, and the ultrasonic sensors 554 are not particularly limited as long as the sensors can be provided in the vehicle 500. Furthermore, the external recognition sensor 525 may include sensors of other types, but not limited to sensors of the types described in this example. An example of a sensing region of each sensor included in the external recognition sensor 525 will be described later.

Note that the imaging method of the camera 551 is not particularly limited as long as it is an imaging method capable of distance measurement. For example, as the camera 551, cameras of various imaging methods such as a time of flight (ToF) camera, a stereo camera, a monocular camera, and an infrared camera can be applied as necessary. Without being limited to this, and the camera 551 may simply acquire a captured image regardless of distance measurement.

Furthermore, for example, the external recognition sensor 525 can include an environment sensor for detecting an environment for the vehicle 500. The environment sensor is a sensor for detecting an environment such as weather, climate, or brightness, and can include various sensors such as a raindrop sensor, a fog sensor, a sunshine sensor, a snow sensor, and an illuminance sensor, for example.

Moreover, for example, the external recognition sensor 525 includes a microphone used to detect a sound around the vehicle 500, a position of a sound source, or the like.

The in-vehicle sensor 526 includes various sensors for detecting information regarding the inside of the vehicle, and supplies sensor data from each sensor to each unit of the vehicle control system 511. The types and the number of various sensors included in the in-vehicle sensor 526 are not particularly limited as long as they can be practically installed in the vehicle 500.

For example, the in-vehicle sensor 526 can include one or more sensors of a camera, a radar, a seating sensor, a steering wheel sensor, a microphone, and a biological sensor. As the camera included in the in-vehicle sensor 526, for example, cameras of various imaging methods capable of measuring a distance, such as a ToF camera, a stereo camera, a monocular camera, and an infrared camera, can be used. Without being limited to this, the camera included in the in-vehicle sensor 526 may simply acquire a captured image regardless of distance measurement. The biological sensor included in the in-vehicle sensor 526 is provided in, for example, a seat, a steering wheel, or the like, and detects various types of biological information of the occupant such as the driver.

The vehicle sensor 527 includes various sensors for detecting the state of the vehicle 500, and supplies the sensor data from each sensor to each unit of the vehicle control system 511. The types and the number of various sensors included in the vehicle sensor 527 are not particularly limited as long as they can be practically installed in the vehicle 500.

For example, the vehicle sensor 527 includes a speed sensor, an acceleration sensor, an angular velocity sensor (gyro sensor), and an inertial measurement unit (IMU) in which these sensors are integrated. For example, the vehicle sensor 527 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 527 includes a rotation sensor that detects the number of rotations of an engine or a motor, an air pressure sensor that detects an air pressure of a tire, a slip rate sensor that detects a slip rate of the tire, and a wheel speed sensor that detects a rotation speed of a wheel. For example, the vehicle sensor 527 includes a battery sensor that detects a remaining amount and temperature of a battery, and an impact sensor that detects an external impact.

The recording unit 528 includes at least one of a nonvolatile storage medium or a volatile storage medium, and stores data and a program. The recording unit 528 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as the storage medium. The recording unit 528 records various programs and data used by each unit of the vehicle control system 511. For example, the recording unit 528 includes an event data recorder (EDR) and a data storage system for automated driving (DSSAD), and records information of the vehicle 500 before and after an event such as an accident and biological information acquired by the in-vehicle sensor 526.

The travel assistance/automated driving control unit 529 controls travel assistance and automated driving of the vehicle 500. For example, the travel assistance/automated driving control unit 529 includes an analysis unit 561, an action planning unit 562, and an operation control unit 563.

The analysis unit 561 executes analysis processing on the vehicle 500 and a situation around the vehicle 500. The analysis unit 561 includes a self-position estimation unit 571, a sensor fusion unit 572, and the recognition unit 573.

The self-position estimation unit 571 estimates a self-position of the vehicle 500, on the basis of the sensor data from the external recognition sensor 525 and the high-precision map accumulated in the map information accumulation unit 523. For example, the self-position estimation unit 571 generates a local map on the basis of the sensor data from the external recognition sensor 525 and performs matching the local map with the high-precision map so as to estimate the self-position of the vehicle 500. The position of the vehicle 500 is based on, for example, a center of a rear wheel pair axle.

The local map is, for example, a three-dimensional high-precision map created using a technology such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 500 is divided into grids (lattices) with a predetermined size, and an occupancy state of an object is represented in units of grids. The occupancy state of the object is represented by, for example, presence or absence or an existence probability of the object. The local map is also used for detection processing and recognition processing on the situation outside the vehicle 500 by the recognition unit 573, for example.

Note that the self-position estimation unit 571 may estimate the self-position of the vehicle 500 on the basis of the GNSS signal and the sensor data from the vehicle sensor 527.

The sensor fusion unit 572 executes sensor fusion processing for combining a plurality of different types of sensor data (for example, image data supplied from camera 551 and sensor data supplied from radar 552), to acquire new information. Methods for combining different types of sensor data include integration, fusion, association, or the like.

The recognition unit 573 executes the detection processing for detecting a situation outside the vehicle 500 and the recognition processing for recognizing a situation outside the vehicle 500.

For example, the recognition unit 573 executes the detection processing and the recognition processing on the situation outside the vehicle 500, on the basis of the information from the external recognition sensor 525, the information from the self-position estimation unit 571, the information from the sensor fusion unit 572, or the like.

Specifically, for example, the recognition unit 573 executes the detection processing, the recognition processing, or the like on the object around the vehicle 500. The object detection processing is, for example, processing for detecting presence or absence, size, shape, position, motion, or the like of an object. The object recognition processing is, for example, processing for recognizing an attribute such as a type of an object or identifying a specific object. The detection processing and the recognition processing, however, are not necessarily clearly separated and may overlap.

For example, the recognition unit 573 detects an object around the vehicle 500 by performing clustering to classify a point cloud based on the sensor data by the LIDAR 553, the radar 552, or the like for each cluster of a point cloud. As a result, the presence or absence, size, shape, and position of the object around the vehicle 500 are detected.

For example, the recognition unit 573 detects a motion of the object around the vehicle 500 by performing tracking for following a motion of the cluster of the point cloud classified by clustering. As a result, a speed and a traveling direction (movement vector) of the object around the vehicle 500 are detected.

For example, the recognition unit 573 detects or recognizes a vehicle, a person, a bicycle, an obstacle, a structure, a road, a traffic light, a traffic sign, a road sign, and the like with respect to the image data supplied from the camera 551. Furthermore, the type of the object around the vehicle 500 may be recognized by executing recognition processing such as semantic segmentation.

For example, the recognition unit 573 can execute processing for recognizing traffic rules around the vehicle 500 on the basis of the map accumulated in the map information accumulation unit 523, the estimation result of the self-position by the self-position estimation unit 571, and the recognition result of the object around the vehicle 500 by the recognition unit 573. Through this processing, the recognition unit 573 can recognize a position and state of a signal, content of traffic signs and road signs, content of traffic regulations, travelable lanes, and the like.

For example, the recognition unit 573 can execute the recognition processing on a surrounding environment of the vehicle 500. As the surrounding environment to be recognized by the recognition unit 573, a weather, a temperature, a humidity, brightness, a road surface condition, or the like are assumed.

The action planning unit 562 creates an action plan for the vehicle 500. For example, the action planning unit 562 creates the action plan by executing processing of path planning and path following.

Note that global path planning (Global path planning) is processing for planning a rough path from a start to a goal. This path planning is called track planning, and also includes processing of track generation (local path planning) that allows safe and smooth traveling near the vehicle 500, in consideration of motion characteristics of the vehicle 500 in the path planned by the path planning. The path planning may be distinguished from long-term path planning, and startup generation from short-term path planning or local path planning. A safety-first path represents a concept similar to the startup generation, the short-term path planning, or the local path planning.

The path following is processing for planning an operation for safely and accurately traveling on the path planned by the path planning within a planned time. For example, the action planning unit 562 can calculate a target speed and a target angular velocity of the vehicle 500, on the basis of a result of the path following processing.

The operation control unit 563 controls the operation of the vehicle 500 in order to achieve the action plan created by the action planning unit 562.

For example, the operation control unit 563 controls a steering control unit 581, a brake control unit 582, and a drive control unit 583 included in the vehicle control unit 532 to be described later, to control acceleration/deceleration and the direction so that the vehicle 500 travels on a track calculated by the track planning. For example, the operation control unit 563 performs cooperative control for the purpose of implementing functions of the ADAS such as collision avoidance or impact mitigation, follow-up traveling, vehicle speed maintaining traveling, collision warning of the host vehicle, or lane deviation warning of the host vehicle. For example, the operation control unit 563 performs cooperative control for the purpose of automated driving or the like in which a vehicle autonomously travels without depending on an operation of a driver.

The DMS 530 executes authentication processing on the driver, recognition processing on a state of the driver, or the like, on the basis of the sensor data from the in-vehicle sensor 526, the input data input to the HMI 531 to be described later, or the like. In this case, as the state of the driver to be recognized by the DMS 530, for example, a physical condition, an alertness, a concentration degree, a fatigue degree, a line-of-sight direction, a degree of drunkenness, a driving operation, a posture, or the like are assumed.

Note that the DMS 530 may execute processing for authenticating an occupant other than the driver, and processing for recognizing a state of the occupant. Furthermore, for example, the DMS 530 may execute processing for recognizing a situation in the vehicle, on the basis of the sensor data from the in-vehicle sensor 526. As the situation in the vehicle to be recognized, for example, a temperature, a humidity, brightness, odor, or the like are assumed.

The HMI 531 receives inputs of various types of data, instructions, or the like, and presents various types of data to the driver or the like.

The input of data by the HMI 531 will be schematically described. The HMI 531 includes an input device for a person to input data. The HMI 531 generates an input signal on the basis of the data, the instruction, or the like input with the input device, and supplies the input signal to each unit of the vehicle control system 511. The HMI 531 includes, for example, an operator such as a touch panel, a button, a switch, or a lever as the input device. Without being limited to this, the HMI 531 may further include an input device capable of inputting information by a method such as voice or gesture other than a manual operation. Moreover, the HMI 531 may use, for example, a remote control device using infrared rays or radio waves, or an external connection device such as a mobile device or a wearable device corresponding to the operation of the vehicle control system 511, as the input device.

Presentation of data by the HMI 531 will be schematically described. The HMI 531 generates visual information, auditory information, and haptic information regarding an occupant or outside of a vehicle. Furthermore, the HMI 531 performs output control for controlling output, output content, an output timing, an output method, or the like of each piece of generated information. The HMI 531 generates and outputs, for example, information indicated by an image or light of an operation screen, a state display of the vehicle 500, a warning display, a monitor image indicating a situation around the vehicle 500, or the like, as the visual information. Furthermore, the HMI 531 generates and outputs information indicated by sounds such as voice guidance, a warning sound, or a warning message, for example, as the auditory information. Moreover, the HMI 531 generates and outputs, for example, information given to a tactile sense of an occupant by force, vibration, motion, or the like as the haptic information.

As an output device with which the HMI 531 outputs the visual information, for example, a display device that presents the visual information by displaying an image by itself or a projector device that presents the visual information by projecting an image can be applied. Note that the display device may be a device that displays the visual information in the field of view of the occupant, such as a head-up display, a transmissive display, or a wearable device having an augmented reality (AR) function, for example, in addition to a display device having an ordinary display. Furthermore, the HMI 531 can use a display device included in a navigation device, an instrument panel, a camera monitoring system (CMS), an electronic mirror, a lamp, or the like provided in the vehicle 500, as the output device that outputs the visual information.

As an output device with which the HMI 531 outputs the auditory information, for example, an audio speaker, a headphone, or an earphone can be applied.

As an output device with which the HMI 531 outputs the haptic information, for example, a haptic element using a haptic technology can be applied. The haptic element is provided, for example, in a portion to be touched by the occupant of the vehicle 500, such as a steering wheel or a seat.

The vehicle control unit 532 controls each unit of the vehicle 500. The vehicle control unit 532 includes the steering control unit 581, the brake control unit 582, the drive control unit 583, a body system control unit 584, a light control unit 585, and a horn control unit 586.

The steering control unit 581 performs detection, control, or the like of a state of a steering system of the vehicle 500. The steering system includes, for example, a steering mechanism including a steering wheel or the like, an electric power steering, or the like. The steering control unit 581 includes, for example, a control unit such as an ECU that controls the steering system, an actuator that drives the steering system, or the like.

The brake control unit 582 performs detection, control, or the like of a state of a brake system of the vehicle 500. The brake system includes, for example, a brake mechanism including a brake pedal or the like, an antilock brake system (ABS), a regenerative brake mechanism, or the like. The brake control unit 582 includes, for example, a control unit such as an ECU that controls the brake system, or the like.

The drive control unit 583 performs detection, control, or the like of a state of a drive system of the vehicle 500. The drive system includes, for example, an accelerator pedal, a driving force generation device for generating a driving force such as an internal combustion engine or a driving motor, a driving force transmission mechanism for transmitting the driving force to wheels, or the like. The drive control unit 583 includes, for example, a control unit such as an ECU that controls the drive system, or the like.

The body system control unit 584 performs detection, control, or the like of a state of a body system of the vehicle 500. The body system includes, for example, a keyless entry system, a smart key system, a power window device, a power seat, an air conditioner, an airbag, a seat belt, a shift lever, or the like. The body system control unit 584 includes, for example, a control unit such as an ECU that controls the body system, or the like.

The light control unit 585 performs detection, control, or the like of states of various lights of the vehicle 500. As the lights to be controlled, for example, a headlight, a backlight, a fog light, a turn signal, a brake light, a projection light, a bumper indicator, or the like can be considered. The light control unit 585 includes a control unit such as an ECU that performs light control, or the like.

The horn control unit 586 performs detection, control, or the like of a state of a car horn of the vehicle 500. The horn control unit 586 includes, for example, a control unit such as an ECU that controls the car horn, or the like.

Figure 39:
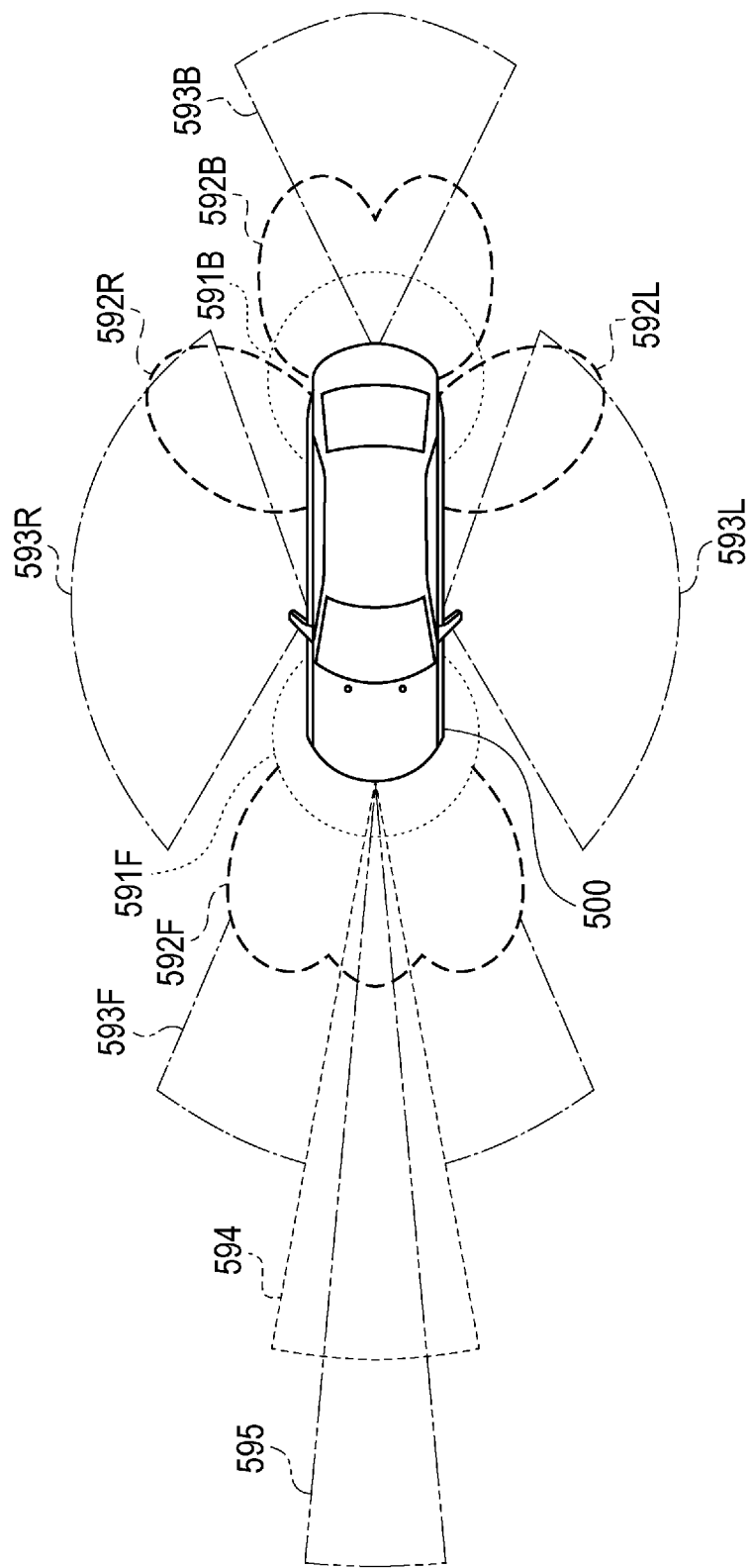
FIG. 39 is a diagram for explaining a configuration example of a sensor of the vehicle mounting the information processing device according to the present disclosure.

FIG. 39 is a diagram illustrating an example of a sensing region by the camera 551, the radar 552, the LiDAR 553, the ultrasonic sensor 554, or the like of the external recognition sensor 525 in FIG. 38. Note that FIG. 39 schematically illustrates the vehicle 500 as viewed from above, where a left end side is the front end (front) side of the vehicle 500, and a right end side is the rear end (rear) side of the vehicle 500.

Sensing regions 591F and 591B illustrate examples of the sensing region of the ultrasonic sensor 554. The sensing region 591F covers a region around the front end of the vehicle 500 by the plurality of ultrasonic sensors 554. The sensing region 591B covers a region around the rear end of the vehicle 500 by the plurality of ultrasonic sensors 554.

Sensing results in the sensing regions 591F and 591B are used, for example, for parking assistance of the vehicle 500 or the like.

Sensing regions 592F to 592B illustrate examples of the sensing region of the radar 552 for short distance or medium distance. The sensing region 592F covers a position farther than the sensing region 591F, on the front side of the vehicle 500. The sensing region 592B covers a position farther than the sensing region 591B, on the rear side of the vehicle 500. The sensing region 592L covers a region around the rear side of a left side surface of the vehicle 500. The sensing region 592R covers a region around the rear side of a right side surface of the vehicle 500.

A sensing result in the sensing region 592F is used for, for example, detection of a vehicle, a pedestrian, or the like existing on the front side of the vehicle 500, or the like. A sensing result in the sensing region 592B is used for, for example, a function for preventing a collision of the rear side of the vehicle 500, or the like. The sensing results in the sensing regions 592L and 592R are used for, for example, detection of an object in a blind spot on the sides of the vehicle 500, or the like.

Sensing regions 593F to 593B illustrate examples of the sensing regions by the camera 551. The sensing region 593F covers a position farther than the sensing region 592F, on the front side of the vehicle 500. The sensing region 593B covers a position farther than the sensing region 592B, on the rear side of the vehicle 500. The sensing region 593L covers a region around the left side surface of the vehicle 500. The sensing region 593R covers a region around the right side surface of the vehicle 500.

A sensing result in the sensing region 593F can be used for, for example, recognition of a traffic light or a traffic sign, a lane departure prevention assist system, and an automated headlight control system. A sensing result in the sensing region 593B can be used for, for example, parking assistance, a surround view system, or the like. Sensing results in the sensing regions 593L and 593R can be used for, for example, a surround view system.

A sensing region 594 illustrates an example of the sensing region of the LiDAR 553. The sensing region 594 covers a position farther than the sensing region 593F, on the front side of the vehicle 500. On the other hand, the sensing region 594 has a narrower range in a left-right direction than the sensing region 593F.

A sensing result in the sensing region 594 is used for, for example, detection of an object such as a neighboring vehicle.

A sensing region 595 illustrates an example of the sensing region of the long-distance radar 552.

The sensing region 595 covers a position farther than the sensing region 594, on the front side of the vehicle 500. On the other hand, the sensing region 595 has a narrower range in the left-right direction than the sensing region 594.

A sensing result in the sensing region 595 is used, for example, for adaptive cruise control (ACC), emergency braking, collision avoidance, or the like.

Note that the respective sensing regions of the sensors: the camera 551; the radar 552; the LiDAR 553; and the ultrasonic sensor 554, included in the external recognition sensor 525 may have various configurations other than those in FIG. 39. Specifically, the ultrasonic sensor 554 may also perform sensing on the sides of the vehicle 500, or the LiDAR 553 may perform sensing on the rear side of the vehicle 500. Furthermore, an installation position of each sensor is not limited to each example described above. Furthermore, the number of sensors may be one or plural.

10. Summary of Configuration of Present Disclosure

As described above, the embodiments of the present disclosure have been described in detail with reference to a particular embodiment. However, it is obvious that those skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be considered.

Note that the technology disclosed herein can have the following configurations.

(1) An information processing device including:
a parking region analysis unit that analyzes a captured image of a camera mounted on a vehicle and analyzes whether or not the vehicle is able to be parked in section region unit; and
a display control unit that generates parking possibility identification graphic data in section region unit, on the basis of an analysis result of the parking region analysis unit and superimposes and displays the parking possibility identification graphic data on the captured image of the camera or a combined image generated on the basis of the captured image, in which
the parking region analysis unit
calculates a ratio of an occlusion region that is not able to be confirmed from the captured image of the camera with respect to a total section region area, for a section region where a parked vehicle is not detected from the captured image of the camera and
executes determination processing for determining which one of a parkable region or a possibly available region the section region is according to a value of the calculated ratio, and
the display control unit
superimposes and displays graphic data different between the parkable region and the possibly available region, according to a result of the determination processing.

(2) The information processing device according to (1), in which
the display control unit generates
parking possibility identification graphic data including
(a) display data for parkable region identification,
(b) display data for unparkable region identification, and
(c) display data for possibly available region identification
as the parking possibility identification graphic data in section region unit and superimposes and displays any one of the pieces (a) to (c) of the parking possibility identification graphic data on each section region of a parking region image.

(3) The information processing device according to (1) or (2), in which
the parking region analysis unit
determines a section region where the parked vehicle is detected from the captured image of the camera as an unparkable region,
calculates a vacancy likelihood indicating a vacancy possibility of the section region, on the basis of the ratio of the occlusion region with respect to the total section region area, for the section region where the parked vehicle is not detected from the captured image of the camera,
determines the section region as a parkable region if the calculated vacancy likelihood is equal to or more than a prescribed threshold, and
determines that the section region is a possibly available region if the calculated vacancy likelihood is less than the prescribed threshold, and
the display control unit
superimposes and displays any one of the pieces (a) to (c) of the parking possibility identification graphic data on each section region according to a determination result in each section region unit by the parking region analysis unit.

(4) The information processing device according to (3), in which
the parking region analysis unit
calculates the vacancy likelihood indicating the vacancy possibility of the section region where the parked vehicle is not detected from the captured image of the camera, according to (formula 1)

$$\text{vacancy likelihood(vacancy possibility) (\%)} = (1 - (\text{occlusion region area})/(\text{total section region area}))*100(\%) \quad \text{(formula 1)},$$

however, the occlusion region is the region that is not able to be confirmed from the captured image of the camera.

(5) The information processing device according to any one of (1) to (4), in which
the display control unit
generates, as the parking possibility identification graphic data in the section region unit, the following parking possibility identification graphic data (a) to (c),
(a) display data for parkable region identification,
(b) display data for unparkable region identification, and
(c) display data for possibly available region identification,
as graphic data with different colors.

(6) The information processing device according to any one of (1) to (5), in which
the display control unit
generates frame-shaped graphic data indicating an outer shape of a section region,
as the parking possibility identification graphic data in the section region unit.

(7) The information processing device according to any one of (1) to (6), in which
the parking region analysis unit
detects a parking section region clearly indicated in a parking allowable region, from the captured image of the camera and
analyzes whether or not a vehicle is able to be parked in the detected parking section region unit.

(8) The information processing device according to any one of (1) to (7), in which
the parking region analysis unit
detects the parking allowable region from the captured image of the camera,
detects the parked vehicle from the detected parking allowable region,
divides a parking region of the detected parked vehicle and a vacant space and sets a section region, and
analyzes whether or not the vehicle is able to be parked in the set section region unit.

(9) The information processing device according to (8), in which
the parking region analysis unit
detects a parallel parking region on a road side as the parking allowable region.

(10) The information processing device according to any one of (1) to (9), in which
the parking region analysis unit
estimates a section region to be a unit used to analyze whether or not the vehicle is able to be parked, using AI prediction data.

(11) The information processing device according to (10), in which
the AI prediction data includes data generated using an AI predictor generated by a learning algorithm using a convolutional neural network (CNN).

(12) The information processing device according to any one of (1) to (11), in which
the parking region analysis unit
determines a section region to be a unit used to analyze whether or not a vehicle is able to park, using received information from an external device.

(13) The information processing device according to any one of (1) to (12), in which
the display control unit
generates a parking region image including a bird's-eye view in which the parking region is observed from above, on the basis of the captured image of the camera and superimposes and displays the parking possibility identification graphic data on each section region of the generated parking region image including the bird's-eye view.

(14) The information processing device according to any one of (1) to (13), in which
the parking region analysis unit
sequentially inputs the captured image of the camera that changes along with traveling of the vehicle, repeatedly executes processing for analyzing whether or not the vehicle is able to be parked in section region unit, on the basis of a latest input image, and sequentially updates analyzed data, and
the display control unit
executes processing for sequentially updating the parking possibility identification graphic data in the section region unit, on the basis of a latest analysis result of the parking region analysis unit.

(15) The information processing device according to (14), in which
regarding a section region determined as a possibly available region,
in a case where the parked vehicle is detected from the latest captured image of the camera,
the parking region analysis unit
changes the section region to an unparkable region.

(16) The information processing device according to (14) or (15), in which
regarding a section region determined as a possibly available region,
in a case where the vacancy likelihood calculated on the basis of the latest captured image of the camera is equal to or more than the prescribed threshold,
the parking region analysis unit
changes the section region to a parkable region.

(17) The information processing device according to any one of (1) to (16), including:
an automated driving control unit, in which
the automated driving control unit performs automated driving so as to park in a region determined as the parkable region by the parking region analysis unit.

(18) The information processing device according to (17), in which
in a case where there is no region determined as a parkable region by the parking region analysis unit,
the automated driving control unit
travels toward the possibly available region, and in a case where the possibly available region is changed to the parkable region, performs automated driving so as to park in the parkable region.

(19) An information processing method executed by an information processing device, including:
a parking region analysis step for analyzing a captured image of a camera mounted on a vehicle and analyzing whether or not the vehicle is able to be parked in section region unit,
by a parking region analysis unit; and
a display control step for generating parking possibility identification graphic data in section region unit, on the basis of an analysis result of the parking region analysis unit and superimposing and displaying the data on the captured image of the camera or a combined image generated on the basis of the captured image,
by a display control unit, in which
the parking region analysis unit, in the parking region analysis step,
calculates a ratio of an occlusion region that is not able to be confirmed from the captured image of the camera with respect to a total section region area, for a section region where a parked vehicle is not detected from the captured image of the camera, and
executes determination processing for determining which one of a parkable region or a possibly available region the section region is according to a value of the calculated ratio, and
the display control unit, in the display control step,
superimposes and displays graphic data different between the parkable region and the possibly available region, according to a result of the determination processing.

(20) A program for causing an information processing device to execute information processing including:
for causing a parking region analysis unit to execute a parking region analysis step for analyzing a captured image of a camera mounted on a vehicle and analyzing whether or not the vehicle is able to be parked in section region unit; and
causing a display control unit to execute a display control step for generating parking possibility identification graphic data in section region unit, on the basis of an analysis result of the parking region analysis unit and superimposing and displaying the data on the captured image of the camera or a combined image generated on the basis of the captured image, in which
the parking region analysis unit, in the parking region analysis step,
executes processing for calculating a ratio of an occlusion region that is not able to be confirmed from the captured image of the camera with respect to a total section region area, for a section region where a parked vehicle is not detected from the captured image of the camera, and
executes determination processing for determining which one of a parkable region or a possibly available region the section region is, according to a value of the calculated ratio, and
the display control unit, in the display control step,
superimposes and displays graphic data different for the parkable region and the possibly available region, according to a result of the determination processing.

(21) An information processing device including:
a parking region analysis unit that
analyzes a captured image captured by a camera mounted on a vehicle,
specifies a section region in which a parked vehicle is not detected from the captured image,
calculates a ratio of an area of an occlusion region that is not able to be confirmed from the captured image, with respect to an area of the section region, and
determines which one of a parkable region or a possibly available region the section region is, according to the ratio.

(22) An information processing method including:
analyzing a captured image captured by a camera mounted on a vehicle;
specifying a section region in which a parked vehicle is not detected from the captured image;

calculating a ratio of an area of an occlusion region that is not able to be confirmed from the captured image, with respect to an area of the section region; and determining which one of a parkable region or a possibly available region the section region is, according to the ratio.

Furthermore, a series of processing described herein can be executed by hardware, software, or a configuration obtained by combining hardware and software. In a case where processing by software is executed, a program in which a processing sequence is recorded can be installed and performed in a memory in a computer incorporated in dedicated hardware, or the program can be installed and performed in a general-purpose computer capable of executing various types of processing. For example, the program can be recorded in advance in a recording medium. In addition to being installed in a computer from the recording medium, a program can be received via a network such as a local area network (LAN) or the Internet and installed in a recording medium such as an internal hard disk or the like.

Note that the various types of processing herein may be executed not only in a chronological order in accordance with the description, but may also be executed in parallel or individually depending on processing capability of an apparatus that executes the processing or depending on the necessity. Furthermore, a system herein described is a logical set configuration of a plurality of devices, there is a case where devices of each configuration are housed in the same housing. However, the system is not limited to a system in which devices of each configuration are in the same housing.

INDUSTRIAL APPLICABILITY

As described above, according to the configuration of the embodiment of the present disclosure, a configuration is implemented that determines the parkable region or the possibly available region, according to the ratio of the occlusion region in the parking section region and executes different identification display processing according to the determination result.

Specifically, for example, a parking region analysis unit that analyzes a camera-captured image and analyzes whether or not the vehicle can park in section region unit, and a display control unit that generates parking possibility identification graphic data in section region unit on the basis of the analysis result and superimposes and displays the data on the camera-captured image are included. The parking region analysis unit calculates the ratio of the occlusion region with respect to the total section region area, for the section region where the parked vehicle is not detected from the camera-captured image and determines which one of the parkable region or the possibly available region the section region is, according to the value of the calculated ratio, and the display control unit superimposes and displays different graphic data for each region.

With this configuration, a configuration is implemented that determines the parkable region or the possibly available region, according to the ratio of the occlusion region in the parking section region and executes different identification display processing according to the determination result.

REFERENCE SIGNS LIST

10 Vehicle
11 Camera
12 Display unit
20 Parking lot
21 Pillar
22 Conical cone
23, 24 Parking region
101 Display data for parkable region identification
102 Display data for unparkable region identification
103 Display data for possibly available region identification
151 Parking region analysis unit
152 Parking possibility identification graphic data generation unit
153 Display unit
200 Information processing device
201 Camera
202 Parking region analysis unit
203 Communication unit
204 Display control unit
205 Display unit
206 Input unit (UI)
207 Automated driving control unit
211 Region analysis unit
212 Parked vehicle detection unit
213 Vacancy likelihood (vacancy possibility) calculation unit
214 Parameter generation and output unit
221 Parking possibility identification graphic data generation unit
222 Parking region display data generation unit
223 Output display data generation unit
301 CPU
302 ROM
303 RAM
304 Bus
305 Input/output interface
306 Input unit
307 Output unit
308 Storage unit
309 Communication unit
310 Drive
311 Removable medium
321 Sensor
322 Drive unit

The invention claimed is:

1. An information processing device comprising:
a memory storing a program, and
at least one processor configured to execute the program to perform operations comprising:
analyzing a captured image of a camera mounted on a vehicle and analyzing whether or not the vehicle is able to be parked in a parking section region;
generating parking possibility identification graphic data, on a basis of analyzing the captured image, and superimposing and displaying parking possibility identification graphic data on the captured image or a combined image generated on a basis of the captured image;
calculating a ratio of an occlusion region that is not able to be confirmed from the captured image with respect to a total section region area, for a section region where a parked vehicle is not detected from the captured image;
executing determination processing for determining which one of a parkable region or a possibly available region the section region is according to a value of the calculated ratio; and
superimposing and displaying graphic data differently between the parkable region and the possibly available region, according to a result of the determination processing.

2. The information processing device according to claim 1, wherein the operations further comprise:
generating the parking possibility identification graphic data to include
(a) display data for parkable region identification,
(b) display data for unparkable region identification, and
(c) display data for possibly available region identification; and superimposing and displaying any one of pieces (a) to (c) of the parking possibility identification graphic data on each section region of a parking region image.

3. The information processing device according to claim 2, wherein the operations further comprise:
determining a section region where the parked vehicle is detected from the captured image as an unparkable region;
calculating a vacancy likelihood indicating a vacancy possibility of the section region, on a basis of the ratio of the occlusion region with respect to an entire area of the section region, for the section region where the parked vehicle is not detected from the captured image;
determining the section region as a parkable region if the calculated vacancy likelihood is equal to or more than a prescribed threshold;
determining that the section region is a possibly available region if the calculated vacancy likelihood is less than the prescribed threshold; and
superimposing and displaying any one of the pieces (a) to (c) of the parking possibility identification graphic data on each section region.

4. The information processing device according to claim 3, wherein the operations further comprise:
calculating the vacancy likelihood indicating the vacancy possibility of the section region where the parked vehicle is not detected from the captured image of the camera, according to (formula 1)

$$\text{vacancy likelihood(vacancy possibility) (\%)} = (1 - (\text{occlusion region area})/(\text{total section region area}))*100(\%) \quad \text{(formula 1)},$$

wherein the occlusion region area is the region that is not able to be confirmed from the captured image.

5. The information processing device according to claim 1, wherein the operations further comprise:
generating, as the parking possibility identification graphic data, the parking possibility identification graphic data, as follows:
(a) display data for parkable region identification,
(b) display data for unparkable region identification, and
(c) display data for possibly available region identification, as graphic data with different colors.

6. The information processing device according to claim 1, wherein the operations further comprise:
generating frame-shaped graphic data indicating an outer shape of a section region, as the parking possibility identification graphic data.

7. The information processing device according to claim 1, wherein the operations further comprise:
detecting a section region clearly indicated in a parking allowable region, from the captured image; and
analyzing whether or not a vehicle is able to be parked in the detected section region.

8. The information processing device according to claim 1, wherein the operations further comprise:
detecting a parking allowable region from the captured image;
detecting the parked vehicle from the detected parking allowable region;
dividing a parking region of the detected parked vehicle and a vacant space and setting a set section region; and
analyzing whether or not the vehicle is able to be parked in the set section region.

9. The information processing device according to claim 8, wherein the operations further comprise:
detecting a parallel parking region on a road side as the parking allowable region.

10. The information processing device according to claim 1, wherein the operations further comprise:
estimating the section region using AI prediction data.

11. The information processing device according to claim 10, wherein the AI prediction data includes data generated using an AI predictor generated by a learning algorithm using a convolutional neural network (CNN).

12. The information processing device according to claim 1, wherein the operations further comprise:
determining the section region using received information from an external device.

13. The information processing device according to claim 1, wherein the operations further comprise:
generating a parking region image including a bird's-eye view in which the parking region is observed from above, on a basis of the captured image, and superimposing and displaying the parking possibility identification graphic data on each section region of the generated parking region image including the bird's-eye view.

14. The information processing device according to claim 1, wherein the operations further comprise:
sequentially inputting the captured image that changes along with traveling of the vehicle;
repeatedly executing processing for analyzing whether or not the vehicle is able to be parked in a section region, on a basis of a latest input image, and sequentially updating analyzed data; and
executing processing for sequentially updating the parking possibility identification graphic data, on a basis of a latest analysis result.

15. The information processing device according to claim 14, wherein regarding a section region determined as a possibly available region, in a case where the parked vehicle is detected from the latest captured image, changing the section region to an unparkable region.

16. The information processing device according to claim 14, wherein regarding a section region determined as a possibly available region, in a case where a vacancy likelihood calculated on a basis of the latest captured image of the camera is equal to or more than a prescribed threshold, changing the section region to a parkable region.

17. The information processing device according to claim 1, wherein the operations further comprise:
performing automated driving so as to park in a region determined as the parkable region.

18. The information processing device according to claim 17, wherein in a case where there is no region determined as the parkable region, travelling toward a possibly available region, and in a case where the possibly available region is changed to the parkable region, performing automated driving so as to park in the parkable region.

19. An information processing method executed by an information processing device, comprising:
analyzing a captured image of a camera mounted on a vehicle and analyzing whether or not the vehicle is able to be parked in a parking section region;

generating parking possibility identification graphic data, on a basis of analyzing the captured image, and superimposing and displaying the data on the captured image or a combined image generated on a basis of the captured image;

calculating a ratio of an occlusion region that is not able to be confirmed from the captured image with respect to a total section region area, for a section region where a parked vehicle is not detected from the captured image;

executing determination processing for determining which one of a parkable region or a possibly available region the section region is according to a value of the calculated ratio; and superimposing and displaying graphic data different between the parkable region and the possibly available region, according to a result of the determination processing.

20. A non-transitory computer readable medium storing a program, the program being executable by at least one processor to perform operations comprising:

analyzing a captured image of a camera mounted on a vehicle and analyzing whether or not the vehicle is able to be parked in a parking section region;

generating parking possibility identification graphic data, on a basis of analyzing the capture image, and superimposing and displaying the data on the captured image or a combined image generated on a basis of the captured image;

executing processing for calculating a ratio of an occlusion region that is not able to be confirmed from the captured image of the camera with respect to a total section region area, for a section region where a parked vehicle is not detected from the captured image;

executing determination processing for determining which one of a parkable region or a possibly available region the section region is according to a value of the calculated ratio; and executing processing for superimposing and displaying graphic data different between the parkable region and the possibly available region, according to a result of the determination processing.

* * * * *